(12) United States Patent
Zhang et al.

(10) Patent No.: US 12,277,011 B2
(45) Date of Patent: Apr. 15, 2025

(54) DISPLAY METHOD AND RELATED APPARATUS

(71) Applicant: HUAWEI TECHNOLOGIES CO., LTD., Guangdong (CN)

(72) Inventors: Yuxi Zhang, Shanghai (CN); Zhongbiao Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 18/041,547

(22) PCT Filed: Jun. 6, 2022

(86) PCT No.: PCT/CN2022/097177
§ 371 (c)(1),
(2) Date: Feb. 14, 2023

(87) PCT Pub. No.: WO2022/257889
PCT Pub. Date: Dec. 15, 2022

(65) Prior Publication Data
US 2024/0012451 A1   Jan. 11, 2024

(30) Foreign Application Priority Data

Jun. 9, 2021 (CN) ......................... 202110642450.0
Aug. 11, 2021 (CN) ......................... 202110920022.X

(51) Int. Cl.
*G06F 1/16* (2006.01)
(52) U.S. Cl.
CPC .......... *G06F 1/1652* (2013.01); *G06F 1/1618* (2013.01); *G06F 1/1677* (2013.01); *G06F 1/1686* (2013.01)

(58) Field of Classification Search
CPC .... G06F 1/1652; G06F 1/1618; G06F 1/1677; G06F 1/1686; G06F 1/1694;
(Continued)

(56) References Cited

U.S. PATENT DOCUMENTS

2013/0300850 A1* 11/2013 Millikan ............... G01J 3/0229
348/77
2020/0264826 A1* 8/2020 Kwon ................... G06F 21/629
(Continued)

FOREIGN PATENT DOCUMENTS

CN          102750094 A     10/2012
CN          107864332 A     3/2018
(Continued)

*Primary Examiner* — Brent D Castiaux

(57) ABSTRACT

This disclosure discloses a display method performed by an electronic device which includes a first screen, a foldable screen, and a first camera. The foldable screen may be folded into a second screen and a third screen. Orientations of the first screen and the second screen are opposite. The method includes: when it is determined that the electronic device is in a first preset posture, displaying a first user interface on the first screen, where the first user interface includes an image captured by the first camera; when it is determined that the electronic device is in a second preset posture, displaying a second user interface on the second screen, where the second user interface includes an image captured by the second camera. In this way, in a specific posture of the electronic device, a corresponding camera and display are automatically started for real-time preview, thereby avoiding complex user operations.

17 Claims, 60 Drawing Sheets

(58) Field of Classification Search
CPC ............... G06F 1/1641; G06F 3/04842; G06F 3/04845; G06F 3/04883; G06F 2203/04803; G06F 2203/04806; G06F 2203/04808; H04M 1/0268; H04M 1/0214; H04M 1/0243; H04M 1/72448; H04M 1/0264; H04M 2250/52
See application file for complete search history.

(56) References Cited

U.S. PATENT DOCUMENTS

| | | |
|---|---|---|
| 2021/0058503 A1 | 2/2021 | Lee et al. |
| 2021/0105389 A1* | 4/2021 | Ko ..................... G06F 3/04845 |
| 2022/0150345 A1 | 5/2022 | Woo et al. |

FOREIGN PATENT DOCUMENTS

| | | |
|---|---|---|
| CN | 110278298 A | 9/2019 |
| CN | 111263005 A | 6/2020 |
| CN | 211791607 U | 10/2020 |
| KR | 101803739 B1 | 12/2017 |
| KR | 20210064616 A | 6/2021 |
| WO | 2021025534 A1 | 2/2021 |

\* cited by examiner

Forward semi-folded form

Forward folded form

First holder state α ∈ [f2, f3]

Fourth holder state α ∈ [f8, f9]

Image 1

Screen C

Sixth holder state α1 ∈ [f13, f14]

Sixth holder state α1 ∈ [f13, f14]

DISPLAY METHOD AND RELATED APPARATUS

CROSS-REFERENCE TO RELATED APPLICATIONS

This application is a National Stage of International Application No. PCT/CN2022/097177 filed on Jun. 6, 2022, which claims priority to Chinese Patent Application No. 202110920022.X filed on Aug. 11, 2021, and Chinese Patent Application No. 202110642450.0 filed on Jun. 9, 2021. All of the aforementioned applications are hereby incorporated by reference in their entireties.

TECHNICAL FIELD

This disclosure relates to the field of electronic technologies, and in particular, to a display method and a related apparatus.

BACKGROUND

With development of electronic technologies, a display configured for an electronic device is increasingly large, and the display can provide richer information for a user, thereby bringing better use experience. For example, a foldable screen with a relatively large size is configured on a front of a mobile phone. When the foldable screen is in a hided form, the foldable screen may be folded into at least two screens, the electronic device may perform display on either of the screens, and the user may control displayed content on the screen by using a touch operation or a button. When the foldable screen is in an unfolded form, the electronic device may perform full-screen display on the foldable screen, and the user may control displayed content on the entire foldable screen by using a touch operation or a button.

Currently, interaction operations between the user and the foldable screen are complex, resulting in poor user experience.

SUMMARY

This disclosure provides a display method, so that in a specific posture of a foldable electronic device, a corresponding camera and display are automatically started for real-time preview, thereby avoiding complex user operations and effectively improving user experience.

According to a first aspect, this disclosure provides a display method, applied to an electronic device. The electronic device includes a first screen, a foldable screen, and a first camera, the foldable screen may be folded into a second screen and a third screen along a folding edge, orientations of the first screen and the second screen are opposite, the orientation of the first screen is consistent with a shooting direction of the first camera, and the orientation of the second screen is consistent with a shooting direction of a second camera. The method includes: determining, based on a detected first included angle between the second screen and the third screen, that the electronic device is in a first preset posture; displaying, by the electronic device, a first user interface on the first screen based on the first preset posture of the electronic device, where a first preview display area of the first user interface is used to display an image captured by the first camera, and in the first preset posture, the first included angle does not include 0° and 180°; determining, based on the detected first included angle, that the electronic device is in a second preset posture; and displaying, by the electronic device, a second user interface on the second screen based on the second preset posture of the electronic device, where the second preview display area of the second user interface is used to display an image captured by the second camera, and in the second preset posture, the first included angle does not include 0° and 180°.

In this embodiment of this disclosure, when the electronic device detects that the electronic device is in the first preset posture, the electronic device may start the first camera corresponding to the first preset posture to capture an image, and display the captured image on the first screen corresponding to the first preset posture. When the electronic device detects that the electronic device is in the second preset posture, the electronic device may start the second camera corresponding to the second preset posture to capture an image, and display the captured image on the second screen corresponding to the second preset posture. It should be noted that, when the electronic device is in the first preset posture, it may be convenient for a user to view displayed content on the first screen; and when the electronic device is in the second preset posture, it may be convenient for the user to view displayed content on the second screen. In this way, after the user places the electronic device in a preset posture, the user may start, with hands free, a camera corresponding to the preset posture to perform shooting, and perform real-time preview by using a display corresponding to the preset posture, thereby avoiding complex user operations and effectively improving user experience.

In an implementation, the method further includes: determining, based on the detected first included angle, that the electronic device is in a third preset posture; and performing split-screen display on the second screen and the third screen based on the third preset posture of the electronic device, where displayed content on the second screen includes a third preview display area, the third preview display area is used to display the image captured by the second camera, and in the third preset posture, the first included angle does not include 0° and 180°.

In this embodiment of this disclosure, when the electronic device detects that the electronic device is in the third preset posture, the electronic device may start the second camera corresponding to the third preset posture to capture an image, and display the captured image on the second screen corresponding to the third preset posture, and may further display, on the third screen, an interface element associated with the image captured by the second camera. It should be noted that, when the electronic device is in the third preset posture, it may be convenient for the user to view displayed content on the second screen and the third screen. In this way, after the user places the electronic device in the preset posture, the user may start, with hands free, the second camera corresponding to the preset posture to perform shooting, perform real-time preview by using the second screen corresponding to the preset posture, and view, by using the third screen, the interface element associated with the image captured by the second camera, thereby avoiding complex user operations and effectively improving user experience.

In an implementation, the displaying, by the electronic device, a first user interface on the first screen based on the first preset posture of the electronic device includes: when it is detected that the electronic device is in the first preset posture and the electronic device meets a first preset condition, starting, by the electronic device, the first camera to capture an image, and displaying the first user interface on the first screen. The first preset posture includes that the first included angle is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

In this embodiment of this disclosure, after the user places the electronic device in the first preset posture and enables the electronic device to meet the first preset condition, the user may start, with hands free, the first camera corresponding to the first preset posture to perform shooting, and perform real-time preview by using the first screen corresponding to the first preset posture, thereby avoiding complex user operations and effectively improving user experience.

In an implementation, the displaying, by the electronic device, a second user interface on the second screen based on the second preset posture of the electronic device includes: when it is detected that the electronic device is in the second preset posture and the electronic device meets a second preset condition, starting, by the electronic device, the second camera to capture an image, and displaying the second user interface on the second screen. The second preset posture includes that the first included angle is within a second preset range, and the second preset condition includes one or more of the following: a pause time of the first included angle at a current included angle value reaches a first preset time; when the second screen is in an on state, the electronic device does not receive, within a second preset time, an input operation performed on the second screen; a face or a face of a preset user is detected in an image captured by a camera corresponding to the second screen; and a second preset gesture is detected in the image captured by the camera corresponding to the second screen.

In this embodiment of this disclosure, after the user places the electronic device in the second preset posture and enables the electronic device to meet the second preset condition, the user may start, with hands free, the second camera corresponding to the second preset posture to perform shooting, and perform real-time preview by using the second screen corresponding to the second preset posture, thereby avoiding complex user operations and effectively improving user experience.

In an implementation, the performing, by the electronic device, split-screen display on the second screen and the third screen based on the third preset posture of the electronic device includes: when it is detected that the electronic device is in the third preset posture and the electronic device meets a third preset condition, starting, by the electronic device, the second camera to capture an image, and performing split-screen display on the second screen and the third screen. The third preset posture includes that the first included angle is within a third preset range, and the third preset condition includes one or more of the following: a pause time of the first included angle at a current included angle value reaches a first preset time; when the second screen and/or the third screen are/is in an on state, the electronic device does not receive, within a second preset time, an input operation performed on the second screen or the third screen; a face or a face of a preset user is detected in an image captured by a camera corresponding to the second screen; and a third preset gesture is detected in the image captured by the camera corresponding to the second screen.

In this embodiment of this disclosure, after the user places the electronic device in the third preset posture and enables the electronic device to meet the third preset condition, the user may start, with hands free, the second camera corresponding to the third preset posture to perform shooting, perform real-time preview by using the second screen corresponding to the third preset posture, and view, by using the third screen, the interface element associated with the image captured by the second camera, thereby avoiding complex user operations and effectively improving user experience.

In an implementation, the first preset posture further includes: a second included angle between the third screen and a horizontal plane is within a fourth preset range, an included angle between an orientation of the third screen and a Z-axis of a geographic coordinate system is less than 90°, and an angle within the first preset range is greater than 0° and less than 120°. Alternatively, the first preset posture further includes: a second included angle is within a fourth preset range, an included angle between an orientation of the third screen and a Z axis of a geographic coordinate system is greater than 90°, and an angle within the first preset range is greater than 180° and less than 300°. Alternatively, the first preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the first preset range is greater than 0° and less than 180°.

In this embodiment of this disclosure, the first preset posture is effectively set, so that no additional holder apparatus needs to be installed for the electronic device, and the user does not need to hold the electronic device. Therefore, the user can view the displayed content on the first screen more conveniently.

In an implementation, the first preset posture further includes: a second included angle between the third screen and a horizontal plane is within a fourth preset range, an included angle between an orientation of the third screen and a Z axis of a geographic coordinate system is less than 90°, and an angle within the first preset range is less than 120°. The displaying a first user interface on the first screen includes: displaying the first user interface rotated by 180° on the first screen.

In an implementation, the first preset posture includes a first holder state and a fifth holder state, and the starting, by the electronic device, the first camera to capture an image, and displaying a first user interface on the first screen when it is detected that the electronic device is in the first preset posture and the electronic device meets a first preset condition includes: when it is detected that the electronic device is in the first holder state and the electronic device meets the first preset condition, starting, by the electronic device, the first camera to capture an image, and displaying the first user interface on the first screen. After the displaying a first user interface on the first screen, the method further includes: when it is detected that the electronic device switches from the first holder state to the fifth holder state, displaying, by the electronic device, the first user interface rotated by 180° on the first screen.

In this embodiment of this disclosure, a display direction of a user interface corresponding to the first screen may be adaptively adjusted with a physical posture of the electronic device, to facilitate viewing by the user, thereby effectively improving user experience.

In an implementation, before the displaying a first user interface on the first screen, the method further includes: recognizing, by the electronic device, a first area in which a preset local feature is located in the image captured by the first camera, where the first preview display area is used to display an enlarged image of an image in the first area.

In this embodiment of this disclosure, after the user places the electronic device in the first preset posture and enables the electronic device to meet the first preset condition, the user may start, with hands free, the first camera corresponding to the first preset posture to perform shooting, and preview, in real time by using the first screen, details of the preset local feature in the image captured by the first camera.

In an implementation, after the displaying a first user interface on the first screen, the method further includes: receiving a first input operation of the user; and in response to the first input operation, displaying, by the electronic device, one or more of the following interface elements on the first user interface: a makeup control, a shooting control, a camera switching control, a light compensation control, an album control, and a display box. The makeup control is configured to add a preset makeup effect to a face in the image displayed in the first preview display area; the shooting control is configured to trigger the electronic device to store the image displayed in the first preview display area; the camera switching control is configured to switch between cameras for image capturing; the light compensation control is configured to supplement ambient light; the album control is configured to trigger the electronic device to display a user interface of an album application; and the display box is configured to display an enlarged image of the preset local feature in the image captured by the first camera.

In this embodiment of this disclosure, after the user places the electronic device in the first preset posture and enables the electronic device to meet the first preset condition, the user may start, with hands free, the first camera corresponding to the first preset posture to perform shooting, and display, on the first screen, only the image captured by the first camera. Then, another related interface element, for example, the shooting control, is displayed on the first screen only after the first input operation of the user is received.

In an implementation, the first camera is an ultraviolet camera, and the image captured by the first camera is used to highlight an area to which sunscreen is applied.

In this embodiment of this disclosure, after the user places the electronic device in the first preset posture and enables the electronic device to meet the first preset condition, the user may start, with hands free, the first camera corresponding to the first preset posture to perform shooting, and preview application of the sunscreen in real time by using the first screen.

In an implementation, based on the first preset posture of the electronic device, when the electronic device displays the first user interface on the first screen, the method further includes: controlling, by the electronic device, the second screen and the third screen to be turned off.

In this embodiment of this disclosure, when controlling the first screen to be turned on, the electronic device controls the second screen and the third screen to be turned off. In this way, energy consumption can be effectively reduced.

In an implementation, the second preset posture further includes: a second included angle between the third screen and a horizontal plane is within a fourth preset range, an included angle between an orientation of the third screen and a Z-axis of a geographic coordinate system is less than 90°, and an angle within the second preset range is greater than 60° and less than 180°. Alternatively, the second preset posture further includes: a second included angle is within a fourth preset range, an included angle between an orientation of the third screen and a Z axis of a geographic coordinate system is greater than 90°, and an angle within the second preset range is greater than 240° and less than 360°. Alternatively, the second preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the second preset range is greater than 180° and less than 360°.

In this embodiment of this disclosure, the second preset posture is effectively set, so that no additional holder apparatus needs to be installed for the electronic device, and the user does not need to hold the electronic device. Therefore, the user can view the displayed content on the second screen more conveniently.

In an implementation, in the first preset posture and the second preset posture, the first included angle does not include 0° and 180°.

In an implementation, when the electronic device displays the second user interface on the second screen based on the second preset posture of the electronic device, the method further includes: controlling, by the electronic device, the first screen to be turned off.

In this embodiment of this disclosure, when controlling the second screen and the third screen to be turned on, the electronic device controls the first screen to be turned off. In this way, energy consumption can be effectively reduced.

In an implementation, the third preset posture further includes: a second included angle between the third screen and a horizontal plane is within a fourth preset range, an included angle between an orientation of the third screen and a Z axis of a geographic coordinate system is less than 90°, and an angle within the third preset range is greater than 60° and less than 180°.

In this embodiment of this disclosure, the third preset posture is effectively set, so that no additional holder apparatus needs to be installed for the electronic device, and the user does not need to hold the electronic device. Therefore, the user can view displayed content on the second screen and the third screen more conveniently.

In an implementation, displayed content on the third screen includes an enlarged image of a preset local feature in the image captured by the second camera.

In this embodiment of this disclosure, when previewing, on the second screen in real time, the image captured by the second camera, the user may further preview, on the third screen in real time, details of the preset local feature in the image captured by the second camera.

In an implementation, the performing split-screen display on the second screen and the third screen includes: displaying a third user interface on the second screen and the third screen in a split-screen manner. The displayed content on the second screen includes the third preview display area of the third user interface and zero, one, or more interface elements on the third user interface other than the third preview display area, and displayed content on the third screen includes one or more interface elements on the third user interface other than the displayed content on the second screen. The third user interface further includes one or more of the following interface elements: a makeup control, a shooting control, a camera switching control, a light compensation control, an album control, and a display box. The makeup control is configured to add a preset makeup effect to a face in the image in the third preview display area of the third user interface; the shooting control is configured to trigger the electronic device to store the image in the third preview display area of the third user interface; the camera switching control is configured to switch between cameras for image capturing; the light compensation control is configured to supplement ambient light; the album control is configured to trigger the electronic device to display a user interface of an album application; and the display box is configured to display an enlarged image of a preset local feature in the image captured by the second camera.

In this embodiment of this disclosure, after the user places the electronic device in the third preset posture and enables the electronic device to meet the third preset condition, the user may start, with hands free, the second camera corresponding to the third preset posture to perform shooting, perform real-time preview by using the second screen corresponding to the third preset posture, and control a shooting parameter of the second camera and a display effect of a preview image on the second screen by using the interface element displayed on the third screen, thereby effectively improving user experience.

According to a second aspect, this disclosure provides a display method, applied to an electronic device. The electronic device includes a first screen, a foldable screen, and a first camera, the foldable screen may be folded into a second screen and a third screen along a folding edge, orientations of the first screen and the second screen are opposite, and the orientation of the first screen is consistent with a shooting direction of the first camera. The method includes:

when it is detected that the electronic device is in a first preset posture and the electronic device meets a first preset condition, starting, by the electronic device, the first camera to capture an image, and displaying a first user interface on the first screen, where a first preview display area of the first user interface is used to display the image captured by the first camera. The first preset posture includes that a first included angle between the second screen and the third screen is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

It should be noted that, when the electronic device is in the first preset posture, it may be convenient for a user to view displayed content on the first screen. In this embodiment of this disclosure, after the user places the electronic device in the first preset posture and enables the electronic device to meet the first preset condition, the user may start, with hands free, the first camera corresponding to the first preset posture to perform shooting, and perform real-time preview by using the first screen corresponding to the first preset posture, thereby avoiding complex user operations and effectively improving user experience.

In this embodiment of this disclosure, the camera corresponding to the first screen and the first camera may be a same camera, or may be different cameras. Optionally, the camera corresponding to the first screen is a low-power-consumption camera.

In an implementation, the electronic device further includes a second camera, and the orientation of the second screen is consistent with a shooting direction of the second camera. When the foldable screen is folded into the second screen and the third screen along the folding edge, the third screen and the second camera are located on different sides of the folding edge, and the method further includes: when it is detected that the electronic device is in a second preset posture and the electronic device meets a second preset condition, starting, by the electronic device, the second camera to capture an image, and displaying a second user interface on the second screen, where a second preview display area of the second user interface is used to display the image captured by the second camera. The second preset posture includes that the first included angle is within a second preset range, and the second preset condition includes one or more of the following: the pause time of the first included angle at the current included angle value reaches the first preset time; When the second screen is in an on state, the electronic device does not receive, within the second preset time, an input operation performed on the second screen; a face or a face of the preset user is detected in an image captured by a camera corresponding to the second screen; and a second preset gesture is detected in the image captured by the camera corresponding to the second screen.

It should be noted that, when the electronic device is in the second preset posture, it may be convenient for the user to view displayed content on the second screen. In this embodiment of this disclosure, after the user places the electronic device in the second preset posture and enables the electronic device to meet the second preset condition, the user may start, with hands free, the second camera corresponding to the second preset posture to perform shooting, and perform real-time preview by using the second screen corresponding to the second preset posture, thereby avoiding complex user operations and effectively improving user experience.

In this embodiment of this disclosure, the camera corresponding to the second screen and the second camera may be a same camera, or may be different cameras. Optionally, the camera corresponding to the second screen is a low-power-consumption camera.

In an implementation, the electronic device further includes a second camera, and the orientation of the second screen is consistent with a shooting direction of the second camera. When the foldable screen is folded into the second screen and the third screen along the folding edge, the third screen and the second camera are located on different sides of the folding edge, and the method further includes: when it is detected that the electronic device is in a third preset posture and the electronic device meets a third preset condition, starting, by the electronic device, the second camera to capture an image, and performing split-screen display on the second screen and the third screen, where displayed content on the second screen includes a third preview display area, and the third preview display area is used to display the image captured by the second camera. The third preset posture includes that the first included angle is within a third preset range, and the third preset condition includes one or more of the following: the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; and a third preset gesture is detected in the image captured by the camera corresponding to the second screen.

It should be noted that, when the electronic device is in the third preset posture, it may be convenient for the user to view displayed content on the second screen and the third screen. In this embodiment of this disclosure, after the user places the electronic device in the third preset posture and enables the electronic device to meet the third preset condition, the user may start, with hands free, the second camera corresponding to the third preset posture to perform shooting, performs real-time preview by using the second screen corresponding to the third preset posture, and view, by using the third screen, an interface element associated with the image captured by the second camera, thereby avoiding complex user operations and effectively improving user experience.

In an implementation, the first preset posture further includes: a second included angle between the third screen and a horizontal plane is within a fourth preset range, an included angle between an orientation of the third screen and a Z-axis of a geographic coordinate system is less than 90°, and an angle within the first preset range is greater than 0° and less than 120°. Alternatively, the first preset posture further includes: a second included angle is within a fourth preset range, an included angle between an orientation of the third screen and a Z axis of a geographic coordinate system is greater than 90°, and an angle within the first preset range is greater than 180° and less than 300°. Alternatively, the first preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the first preset range is greater than 0° and less than 180°.

In this embodiment of this disclosure, the first preset posture is effectively set, so that no additional holder apparatus needs to be installed for the electronic device, and the user does not need to hold the electronic device. Therefore, the user can view the displayed content on the first screen more conveniently.

In an implementation, the first preset posture further includes: a second included angle between the third screen and a horizontal plane is within a fourth preset range, an included angle between an orientation of the third screen and a Z axis of a geographic coordinate system is less than 90°, and an angle within the first preset range is less than 120°, The displaying a first user interface on the first screen includes: displaying the first user interface rotated by 180° on the first screen.

In this embodiment of this disclosure, a display direction of a user interface corresponding to the first screen may be adaptively adjusted with a physical posture of the electronic device, to facilitate viewing by the user, thereby effectively improving user experience.

In an implementation, before the displaying a first user interface on the first screen, the method further includes: recognizing, by the electronic device, a first area in which a preset local feature is located in the image captured by the first camera, where the first preview display area is used to display an enlarged image of an image in the first area.

In this embodiment of this disclosure, after the user places the electronic device in the first preset posture and enables the electronic device to meet the first preset condition, the user may start, with hands free, the first camera corresponding to the first preset posture to perform shooting, and preview, in real time by using the first screen, details of the preset local feature in the image captured by the first camera.

In an implementation, after the displaying a first user interface on the first screen, the method further includes: receiving a first input operation of the user; and in response to the first input operation, displaying, by the electronic device, one or more of the following interface elements on the first user interface: a makeup control, a shooting control, a camera switching control, a light compensation control, an album control, and a display box. The makeup control is configured to add a preset makeup effect to a face in the image displayed in the first preview display area; the shooting control is configured to trigger the electronic device to store the image displayed in the first preview display area; the camera switching control is configured to switch between cameras for image capturing; the light compensation control is configured to supplement ambient light; the album control is configured to trigger the electronic device to display a user interface of an album application; and the display box is configured to display an enlarged image of the preset local feature in the image captured by the first camera.

In this embodiment of this disclosure, after the user places the electronic device in the first preset posture and enables the electronic device to meet the first preset condition, the user may start, with hands free, the first camera corresponding to the first preset posture to perform shooting, and display, on the first screen, only the image captured by the first camera. Then, another related interface element, for example, the shooting control, is displayed on the first screen only after the first input operation of the user is received.

In an implementation, the first camera is an ultraviolet camera, and the image captured by the first camera is used to highlight an area to which sunscreen is applied.

In this embodiment of this disclosure, after the user places the electronic device in the first preset posture and enables the electronic device to meet the first preset condition, the user may start, with hands free, the first camera corresponding to the first preset posture to perform shooting, and preview application of the sunscreen in real time by using the first screen.

In an implementation, when it is detected that the electronic device is in the first preset posture and the electronic device meets the first preset condition, the method further includes: controlling, by the electronic device, the second screen and the third screen to be turned off.

In this embodiment of this disclosure, when controlling the first screen to be turned on, the electronic device controls the second screen and the third screen to be turned off. In this way, energy consumption can be effectively reduced.

In an implementation, the second preset posture further includes: a second included angle between the third screen and a horizontal plane is within a fourth preset range, an included angle between an orientation of the third screen and a Z-axis of a geographic coordinate system is less than 90°, and an angle within the second preset range is greater than 60° and less than 180°. Alternatively, the second preset posture further includes: a second included angle is within a fourth preset range, an included angle between an orientation of the third screen and a Z axis of a geographic coordinate system is greater than 90°, and an angle within the second preset range is greater than 240° and less than 360°. Alternatively, the second preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the second preset range is greater than 180° and less than 360°.

In this embodiment of this disclosure, the second preset posture is effectively set, so that no additional holder apparatus needs to be installed for the electronic device, and the user does not need to hold the electronic device. Therefore, the user can view the displayed content on the second screen more conveniently.

In an implementation, in the first preset posture and the second preset posture, the first included angle does not include 0° and 180°.

In an implementation, when it is detected that the electronic device is in the second preset posture and the electronic device meets the second preset condition, the method further includes: controlling, by the electronic device, the first screen to be turned off.

In this embodiment of this disclosure, when controlling the second screen and the third screen to be turned on, the electronic device controls the first screen to be turned off. In this way, energy consumption can be effectively reduced.

In an implementation, the third preset posture further includes: a second included angle between the third screen and a horizontal plane is within a fourth preset range, an included angle between an orientation of the third screen and a Z axis of a geographic coordinate system is less than 90°, and an angle within the third preset range is greater than 60° and less than 180°.

In this embodiment of this disclosure, the third preset posture is effectively set, so that no additional holder apparatus needs to be installed for the electronic device, and the user does not need to hold the electronic device. Therefore, the user can view displayed content on the second screen and the third screen more conveniently.

In an implementation, displayed content on the third screen includes an enlarged image of a preset local feature in the image captured by the second camera.

In this embodiment of this disclosure, when previewing, on the second screen in real time, the image captured by the second camera, the user may further preview, on the third screen in real time, details of the preset local feature in the image captured by the second camera.

In an implementation, the performing split-screen display on the second screen and the third screen includes: displaying a third user interface on the second screen and the third screen in a split-screen manner. The displayed content on the second screen includes the third preview display area of the third user interface and zero, one, or more interface elements on the third user interface other than the third preview display area, and displayed content on the third screen includes one or more interface elements on the third user interface other than the displayed content on the second screen. The third user interface further includes one or more of the following interface elements: a makeup control, a shooting control, a camera switching control, a light compensation control, an album control, and a display box. The makeup control is configured to add a preset makeup effect to a face in the image in the third preview display area of the third user interface; the shooting control is configured to trigger the electronic device to store the image in the third preview display area of the third user interface; the camera switching control is configured to switch between cameras for image capturing; the light compensation control is configured to supplement ambient light; the album control is configured to trigger the electronic device to display a user interface of an album application; and the display box is configured to display an enlarged image of a preset local feature in the image captured by the second camera.

In this embodiment of this disclosure, after the user places the electronic device in the third preset posture and enables the electronic device to meet the third preset condition, the user may start, with hands free, the second camera corresponding to the third preset posture to perform shooting, perform real-time preview by using the second screen corresponding to the third preset posture, and control a shooting parameter of the second camera and a display effect of a preview image on the second screen by using the interface element displayed on the third screen, thereby effectively improving user experience.

According to a third aspect, this disclosure provides an electronic device. The electronic device includes a first screen, a foldable screen, and a first camera, the foldable screen may be folded into a second screen and a third screen along a folding edge, orientations of the first screen and the second screen are opposite, the orientation of the first screen is consistent with a shooting direction of the first camera, and the orientation of the second screen is consistent with a shooting direction of a second camera. The electronic device may include a plurality of function modules or units, configured to correspondingly perform the display method provided in the first aspect.

For example, a detection unit and a display unit are included.

The detection unit is configured to determine, based on a detected first included angle between the second screen and the third screen, that the electronic device is in a first preset posture.

The display unit is configured to display a first user interface on the first screen based on the first preset posture of the electronic device, where a first preview display area of the first user interface is used to display an image captured by the first camera, and in the first preset posture, the first included angle does not include 0° and 180°.

The detection unit is further configured to determine, based on the detected first included angle, that the electronic device is in a second preset posture.

The display unit is further configured to display a second user interface on the second screen based on the second preset posture of the electronic device, where a second preview display area of the second user interface is used to display an image captured by the second camera, and in the second preset posture, the first included angle does not include 0° and 180°.

In an implementation, the detection unit is further configured to determine, based on the detected first included angle, that the electronic device is in a third preset posture; and the display unit is further configured to perform split-screen display on the second screen and the third screen based on the third preset posture of the electronic device, where displayed content on the second screen includes a third preview display area, the third preview display area is used to display the image captured by the second camera, and in the third preset posture, the first included angle does not include 0° and 180°.

In an implementation, displaying the first user interface on the first screen based on the first preset posture of the electronic device includes: when it is detected that the electronic device is in the first preset posture and the electronic device meets a first preset condition, starting the first camera to capture an image, and displaying the first user interface on the first screen. The first preset posture includes that the first included angle is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

In an implementation, displaying the second user interface on the second screen based on the second preset posture of the electronic device includes: when it is detected that the electronic device is in the second preset posture and the electronic device meets a second preset condition, starting the second camera to capture an image, and displaying the second user interface on the second screen. The second preset posture includes that the first included angle is within a second preset range, and the second preset condition includes one or more of the following: a pause time of the first included angle at a current included angle value reaches a first preset time; when the second screen is in an on state, the electronic device does not receive, within a second preset time, an input operation performed on the second screen; a face or a face of a preset user is detected in an image captured by a camera corresponding to the second screen; and a second preset gesture is detected in the image captured by the camera corresponding to the second screen.

In an implementation, performing split-screen display on the second screen and the third screen based on the third preset posture of the electronic device includes: when it is detected that the electronic device is in the third preset posture and the electronic device meets a third preset condition, starting the second camera to capture an image, and performing split-screen display on the second screen and the third screen. The third preset posture includes that the first included angle is within a third preset range, and the third preset condition includes one or more of the following: a pause time of the first included angle at a current included angle value reaches a first preset time; when the second screen and/or the third screen are/is in an on state, the electronic device does not receive, within a second preset time, an input operation performed on the second screen or the third screen; a face or a face of a preset user is detected in an image captured by a camera corresponding to the second screen; and a third preset gesture is detected in the image captured by the camera corresponding to the second screen.

According to a fourth aspect, this disclosure provides an electronic device. The electronic device includes a first screen, a foldable screen, and a first camera, the foldable screen may be folded into a second screen and a third screen along a folding edge, orientations of the first screen and the second screen are opposite, and the orientation of the first screen is consistent with a shooting direction of the first camera. The electronic device may include a plurality of function modules or units, configured to correspondingly perform the display method provided in the second aspect.

For example, a display unit is included.

The display unit is configured to: when it is detected that the electronic device is in a first preset posture and the electronic device meets a first preset condition, start the first camera to capture an image, and display a first user interface on the first screen, where a first preview display area of the first user interface is used to display the image captured by the first camera. The first preset posture includes that a first included angle between the second screen and the third screen is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

In this embodiment of this disclosure, the camera corresponding to the first screen and the first camera may be a same camera, or may be different cameras. Optionally, the camera corresponding to the first screen is a low-power-consumption camera.

In an implementation, the electronic device further includes a second camera, the orientation of the second screen is consistent with a shooting direction of the second camera, and when the foldable screen is folded into the second screen and the third screen along the folding edge, the third screen and the second camera are located on different sides of the folding edge. The display unit is further configured to: when it is detected that the electronic device is in a second preset posture and the electronic device meets a second preset condition, start the second camera to capture an image, and display a second user interface on the second screen, where a second preview display area of the second user interface is used to display the image captured by the second camera. The second preset posture includes that a first included angle is within a second preset range, and the second preset condition includes one or more of the following: the pause time of the first included angle at the current included angle value reaches the first preset time; when the second screen is in an on state, the electronic device does not receive, within the second preset time, an input operation performed on the second screen; a face or a face of the preset user is detected in an image captured by a camera corresponding to the second screen; and a second preset gesture is detected in the image captured by the camera corresponding to the second screen.

In this embodiment of this disclosure, the camera corresponding to the second screen and the second camera may be a same camera, or may be different cameras. Optionally, the camera corresponding to the second screen is a low-power-consumption camera.

In an implementation, the electronic device further includes a second camera, the orientation of the second screen is consistent with a shooting direction of the second camera, and when the foldable screen is folded into the second screen and the third screen along the folding edge, the third screen and the second camera are located on different sides of the folding edge. The display unit is further configured to: when it is detected that the electronic device is in a third preset posture and the electronic device meets a third preset condition, start the second camera to capture an image, and perform split-screen display on the second screen and the third screen, where displayed content on the second screen includes a third preview display area, and the third preview display area is used to display the image captured by the second camera. The third preset posture includes that the first included angle is within a third preset range, and the third preset condition includes one or more of the following: the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; and a third preset gesture is detected in the image captured by the camera corresponding to the second screen.

In an implementation, the first preset posture further includes: a second included angle between the third screen and a horizontal plane is within a fourth preset range, an included angle between an orientation of the third screen and a Z-axis of a geographic coordinate system is less than 90°, and an angle within the first preset range is greater than 0° and less than 120°. Alternatively, the first preset posture further includes: a second included angle is within a fourth preset range, an included angle between an orientation of the third screen and a Z axis of a geographic coordinate system is greater than 90°, and an angle within the first preset range is greater than 180° and less than 300°. Alternatively, the first preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the first preset range is greater than 0° and less than 180°.

In an implementation, the first preset posture further includes: a second included angle between the third screen and a horizontal plane is within a fourth preset range, an included angle between an orientation of the third screen and a Z axis of a geographic coordinate system is less than 90°, and an angle within the first preset range is less than 120°. That the display unit displays a first user interface on the first screen includes: The display unit displays the first user interface rotated by 180° on the first screen.

In an implementation, the electronic device further includes a recognition unit. Before the display unit displays the first user interface on the first screen, the recognition unit is configured to recognize a first area in which a preset local feature is located in the image captured by the first camera, where the first preview display area is used to display an enlarged image of an image in the first area.

In an implementation, the electronic device further includes a receiving unit. After the display unit displays the first user interface on the first screen, the receiving unit is configured to receive a first input operation of the user, and the display unit is further configured to: in response to the first input operation, display one or more of the following interface elements on the first user interface: a makeup control, a shooting control, a camera switching control, a light compensation control, an album control, and a display box. The makeup control is configured to add a preset makeup effect to a face in the image displayed in the first preview display area; the shooting control is configured to trigger the electronic device to store the image displayed in the first preview display area; the camera switching control is configured to switch between cameras for image capturing; the light compensation control is configured to supplement ambient light; the album control is configured to trigger the electronic device to display a user interface of an album application; and the display box is configured to display an enlarged image of the preset local feature in the image captured by the first camera.

In an implementation, the first camera is an ultraviolet camera, and the image captured by the first camera is used to highlight an area to which sunscreen is applied.

In an implementation, the display unit is further configured to: when it is detected that the electronic device is in the first preset posture and the electronic device meets the first preset condition, control the second screen and the third screen to be turned off.

In an implementation, the second preset posture further includes: a second included angle between the third screen and a horizontal plane is within a fourth preset range, an included angle between an orientation of the third screen and a Z-axis of a geographic coordinate system is less than 90°, and an angle within the second preset range is greater than 60° and less than 180°. Alternatively, the second preset posture further includes: a second included angle is within a fourth preset range, an included angle between an orientation of the third screen and a Z axis of a geographic coordinate system is greater than 90°, and an angle within the second preset range is greater than 240° and less than 360°. Alternatively, the second preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the second preset range is greater than 180° and less than 360°.

In an implementation, in the first preset posture and the second preset posture, the first included angle does not include 0° and 180°.

In an implementation, the display unit is further configured to: when it is detected that the electronic device is in the second preset posture and the electronic device meets the second preset condition, control the first screen to be turned off.

In an implementation, the third preset posture further includes: a second included angle between the third screen and a horizontal plane is within a fourth preset range, an included angle between an orientation of the third screen and a Z axis of a geographic coordinate system is less than 90°, and an angle within the third preset range is greater than 60° and less than 180°.

In an implementation, displayed content on the third screen includes an enlarged image of a preset local feature in the image captured by the second camera.

In an implementation, that the display unit performs split-screen display on the second screen and the third screen includes: The display unit displays a third user interface on the second screen and the third screen in a split-screen manner. The displayed content on the second screen includes the third preview display area of the third user interface and zero, one, or ore interface elements on the third user interface other than the third preview display area, and displayed content on the third screen includes one or more interface elements on the third user interface other than the displayed content on the second screen. The third user interface further includes one or more of the following interface elements: a makeup control, a shooting control, a camera switching control, a light compensation control, an album control, and a display box. The makeup control is configured to add a preset makeup effect to a face in the image in the third preview display area of the third user interface; the shooting control is configured to trigger the electronic device to store the image in the third preview display area of the third user interface; the camera switching control is configured to switch between cameras for image capturing; the light compensation control is configured to supplement ambient light; the album control is configured to trigger the electronic device to display a user interface of an album application; and the display box is configured to display an enlarged image of a preset local feature in the image captured by the second camera.

According to a fifth aspect, this disclosure provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the display method in any possible implementation of any one of the foregoing aspects.

According to a sixth aspect, an embodiment of this disclosure provides a computer storage medium, including computer instructions. When the computer instructions are run on an electronic device, the electronic device is enabled to perform the display method in any possible implementation of any one of the foregoing aspects.

According to a seventh aspect, an embodiment of this disclosure provides a computer program product. When the computer program product is run on a computer, the computer is enabled to perform the display method in any possible implementation of any one of the foregoing aspects.

DESCRIPTION OF EMBODIMENTS

Figure 1A:
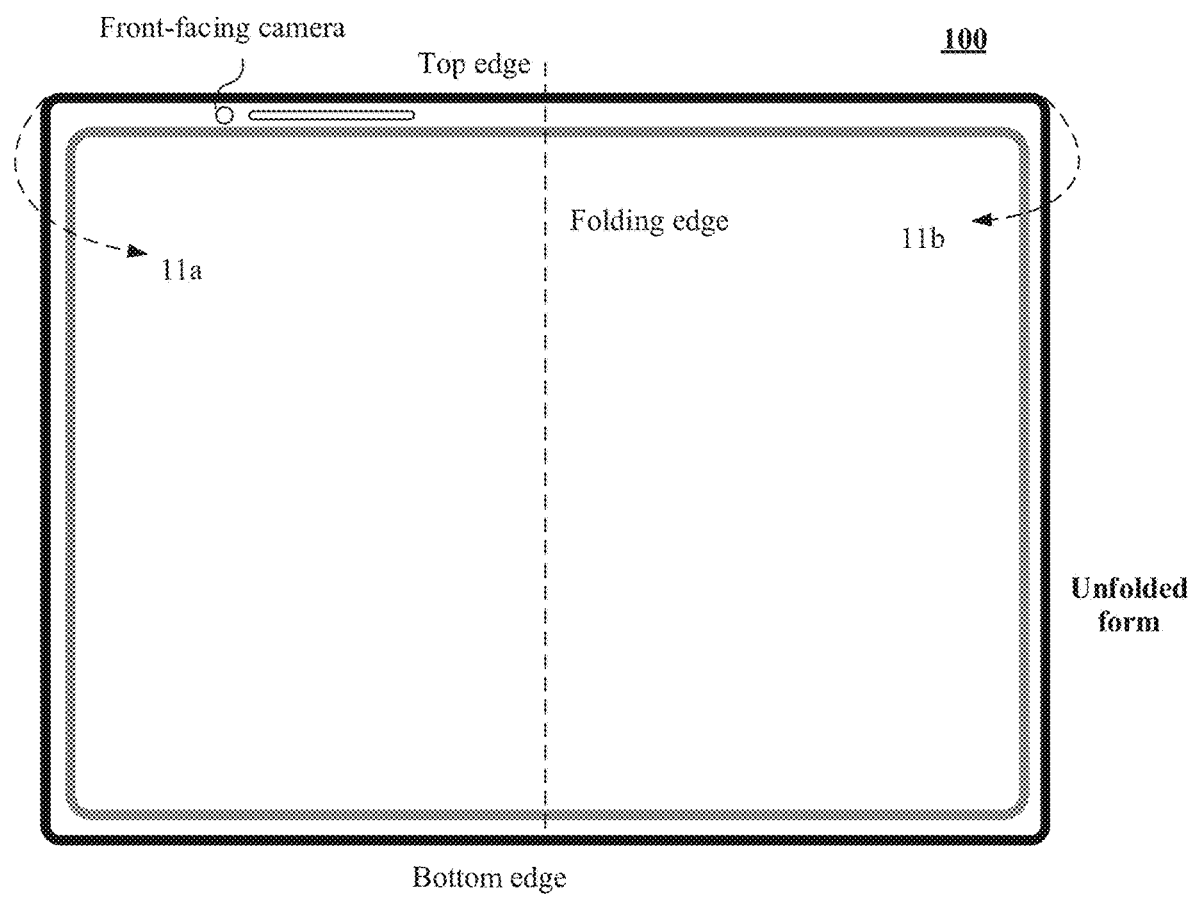
FIG. 1A to FIG. 1F are schematic diagrams of product forms of a vertically folded electronic device according to an embodiment of this disclosure.
Figure 1B:
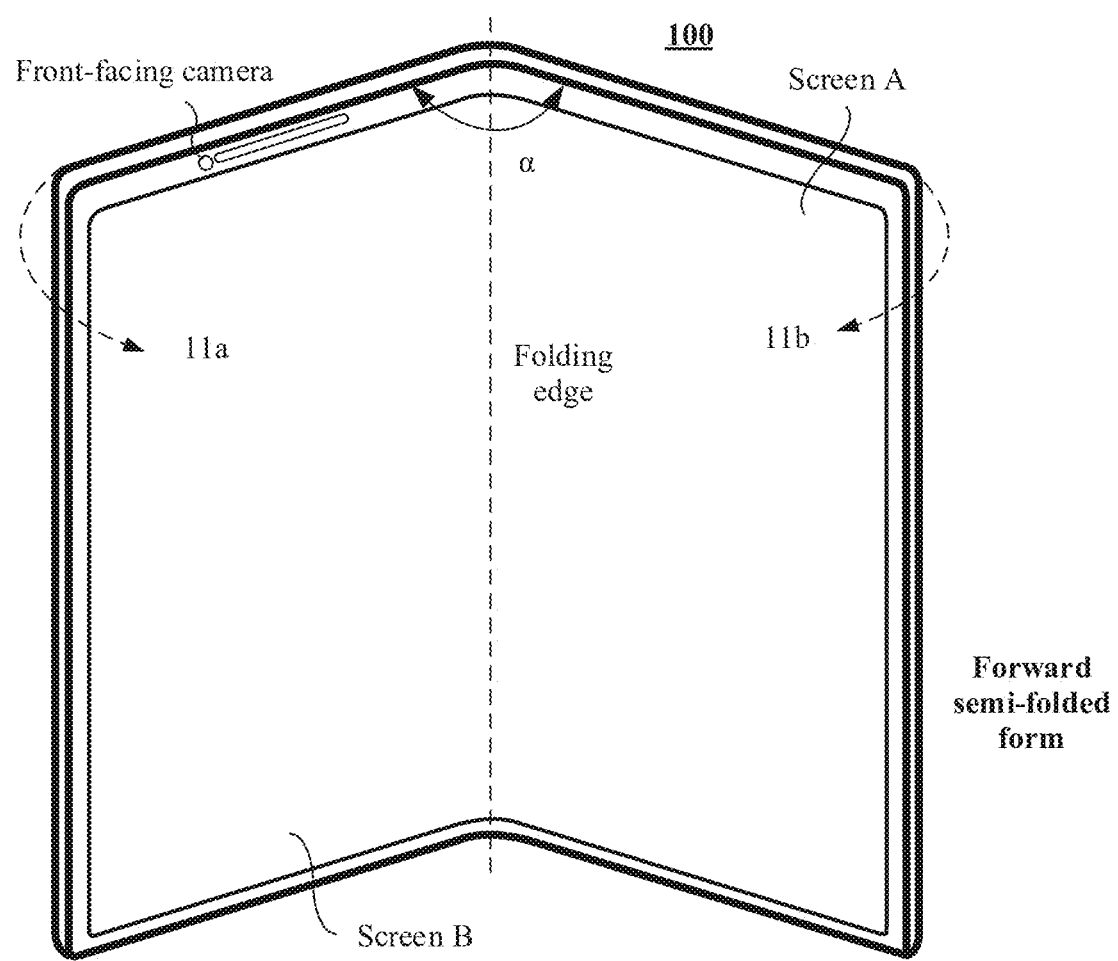
Figure 1C:
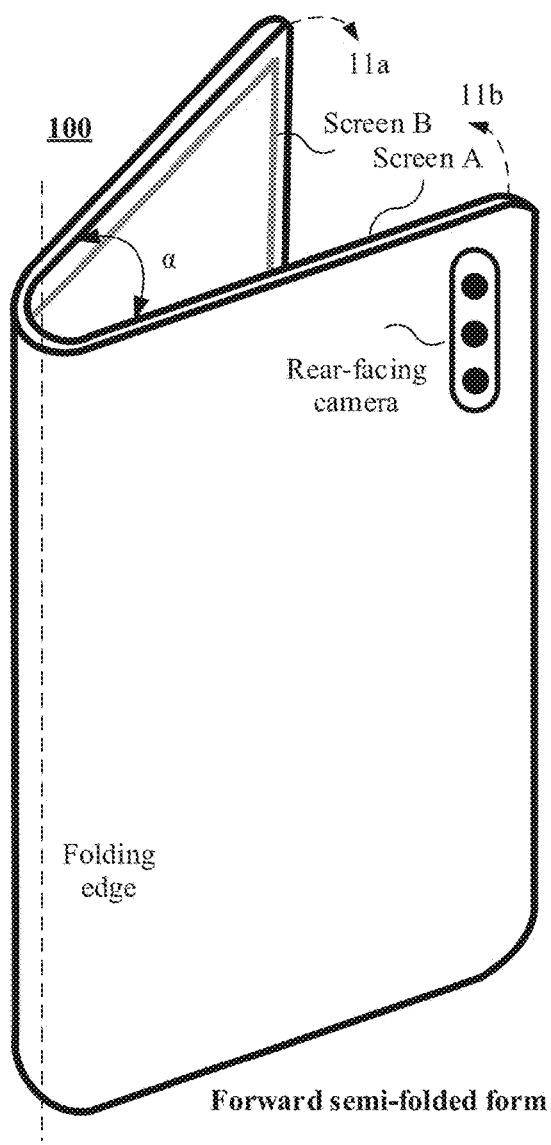

The following clearly describes technical solutions in embodiments of this disclosure in detail with reference to the accompanying drawings. In descriptions of embodiments of this disclosure, "/" indicates "or" unless otherwise stated. For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this disclosure, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more.

The term "user interface (user interface, UI)" in embodiments of this disclosure is a medium interface for interaction and information exchange between an application or an operating system and a user. The user interface implements conversion between an internal form of information and a form acceptable to the user. The user interface is source code written in a specific computer language, for example, Java or an extensible markup language (extensible markup language, XML). Interface source code is parsed and rendered on an electronic device, and is finally presented as content that can be recognized by the user. The user interface is usually in a representation form of a graphical user interface (graphical user interface, GUI), which refers to a user interface related to a computer operation and displayed in a graphical manner. The user interface may be a visual interface element displayed on a display of the electronic device, such as a text, an icon, a button, a menu, a tab, a text box, a dialog box, a status bar, a navigation bar, or a widget.

Embodiments of this disclosure provide a display method for a foldable screen. The method may be applied to an electronic device 100 having a vertically foldable screen or a horizontally foldable screen. The foldable screen of the electronic device 100 may be folded into at least two screens such as a screen A and a screen B along a folding edge. Based on a folding degree, the foldable screen may present a plurality of forms. In embodiments of this disclosure, the foldable screen of the electronic device 100 may present an unfolded form, a forward semi-folded form, or a forward folded form. Optionally, the foldable screen of the electronic device 100 may alternatively present a reverse semi-folded form or a reverse folded form.

The following describes various forms of the electronic device 100 configured with the vertically foldable screen.

For example, FIG. 1A to FIG. 1F are schematic diagrams of product forms of the electronic device 100 having the vertically foldable screen according to an embodiment of this disclosure, A Balding edge of the vertically foldable screen is perpendicular to a top edge line (for ease of description, the top edge line is referred to as a top edge for short) and a bottom edge line (for ease of description, the bottom edge line is referred to as a bottom edge for short) of the electronic device 100.

Figure 1D:
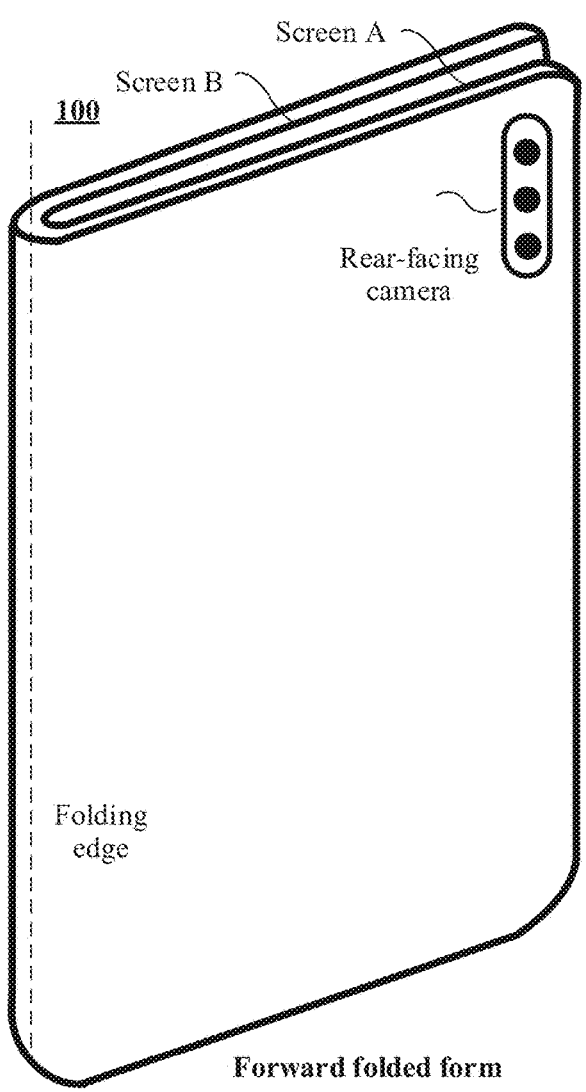

FIG. 1A is a schematic diagram of an unfolded form of the vertically foldable screen. The vertically foldable screen shown in FIG. 1A may be Bolded inward along the folding edge based on a direction 11a and/or 11b shown in FIG. 1A, to form a screen A (namely, a second screen) and a screen B (namely, a third screen) in a forward semi-folded form shown in FIG. 113 and FIG. 1C. After the vertically foldable screen is folded into the screen A and the screen B, the screen A and a front-facing camera on the electronic device 100 may be on a same side of the folding edge. The vertically foldable screen shown in FIG. 1C may be further folded inward along the folding edge based on directions 11a and 11b shown in FIG. 1C, to form the vertically foldable screen in a forward folded form shown in FIG. 1D. As shown in FIG. 1D, after the vertically foldable screen of the electronic device 100 is fully folded forward, the screen A and the screen B face each other and are invisible to a user.

Figure 1E:
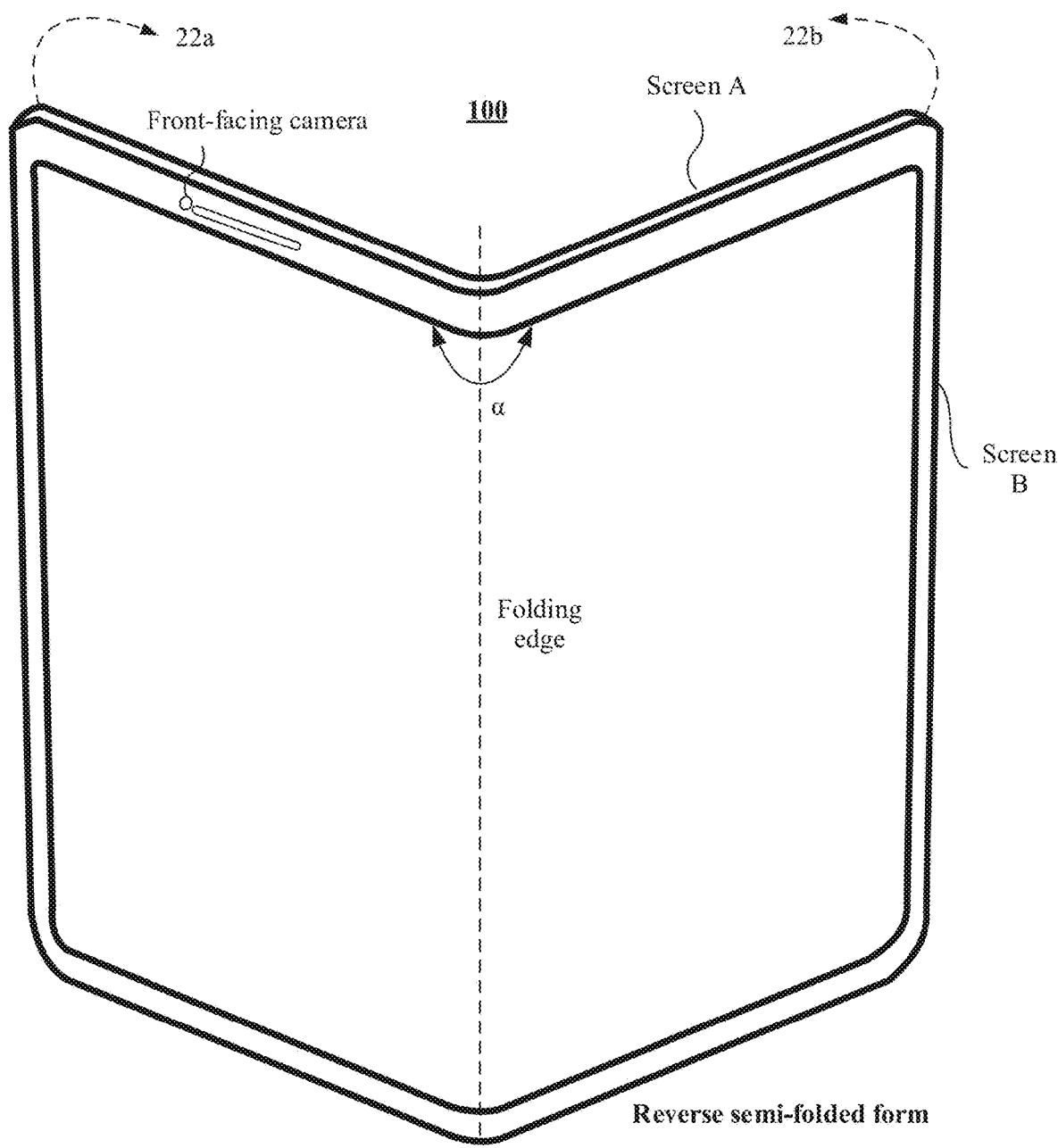
Figure 1F:
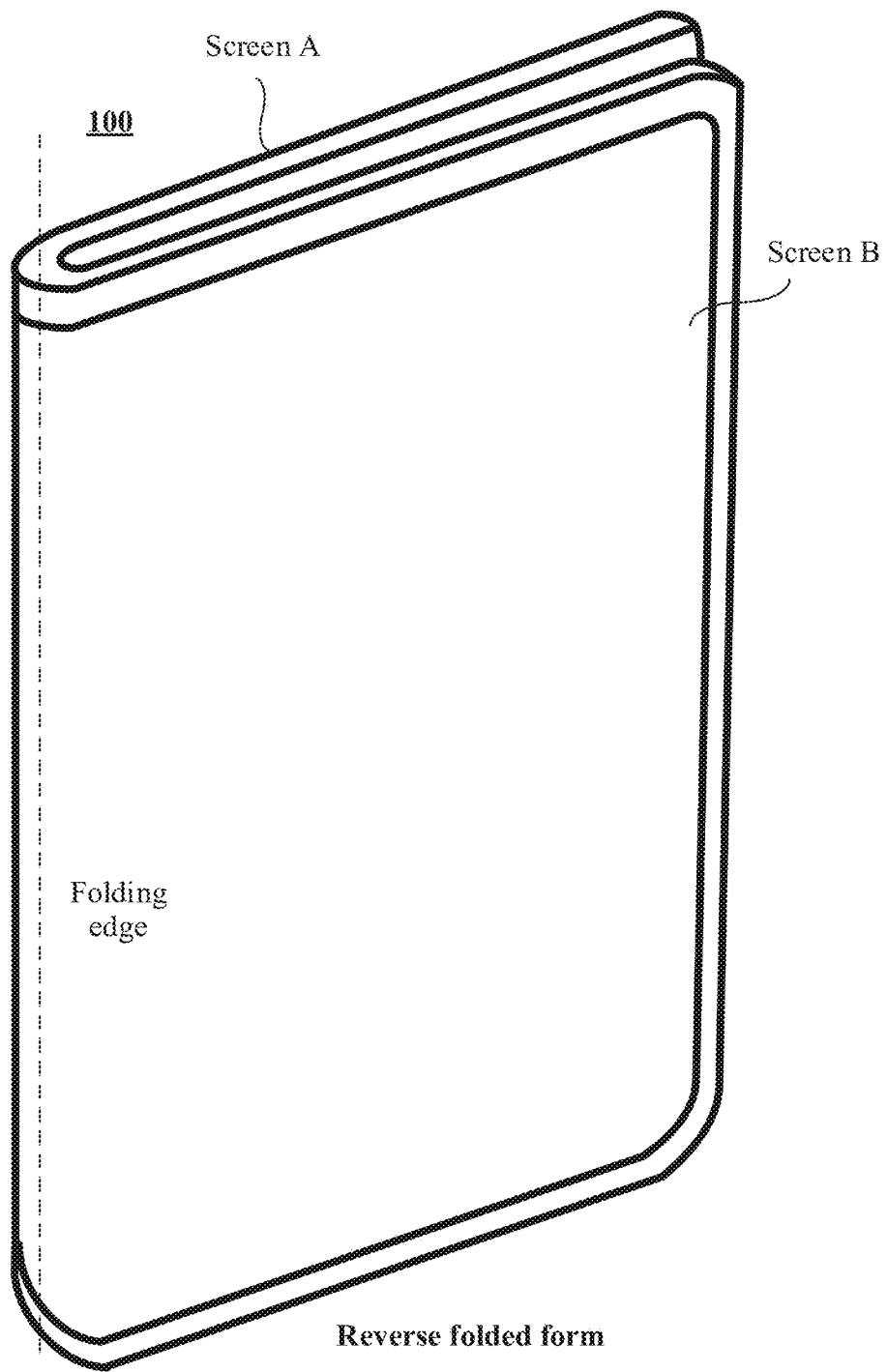

In some embodiments, the vertically foldable screen shown in FIG. 1A may alternatively be folded outward along the folding edge, to form the screen A and the screen B in a reverse semi-folded form shown in FIG. 1E. The vertically foldable screen shown in FIG. 1E may be further folded outward along the folding edge based on directions 22a and 22b shown in FIG. 1E, to form the vertically foldable screen in a reverse folded form shown in FIG. 1F. As shown in FIG. 1F, after the vertically foldable screen of the electronic device 100 is fully folded reversely, the screen A and the screen B are back to back, and a back (namely, a back of the screen A and a back of the screen B) of the electronic device 100 is invisible to the user.

The following describes various forms of the electronic device 100 configured with the horizontally foldable screen.

For example, FIG. 2A to FIG. 2F are schematic diagrams of product forms of the electronic device 100 having the horizontally foldable screen according to an embodiment of this disclosure. A folding edge of the horizontally foldable screen is parallel to a top edge and a bottom edge of the electronic device 100.

Figure 2A:
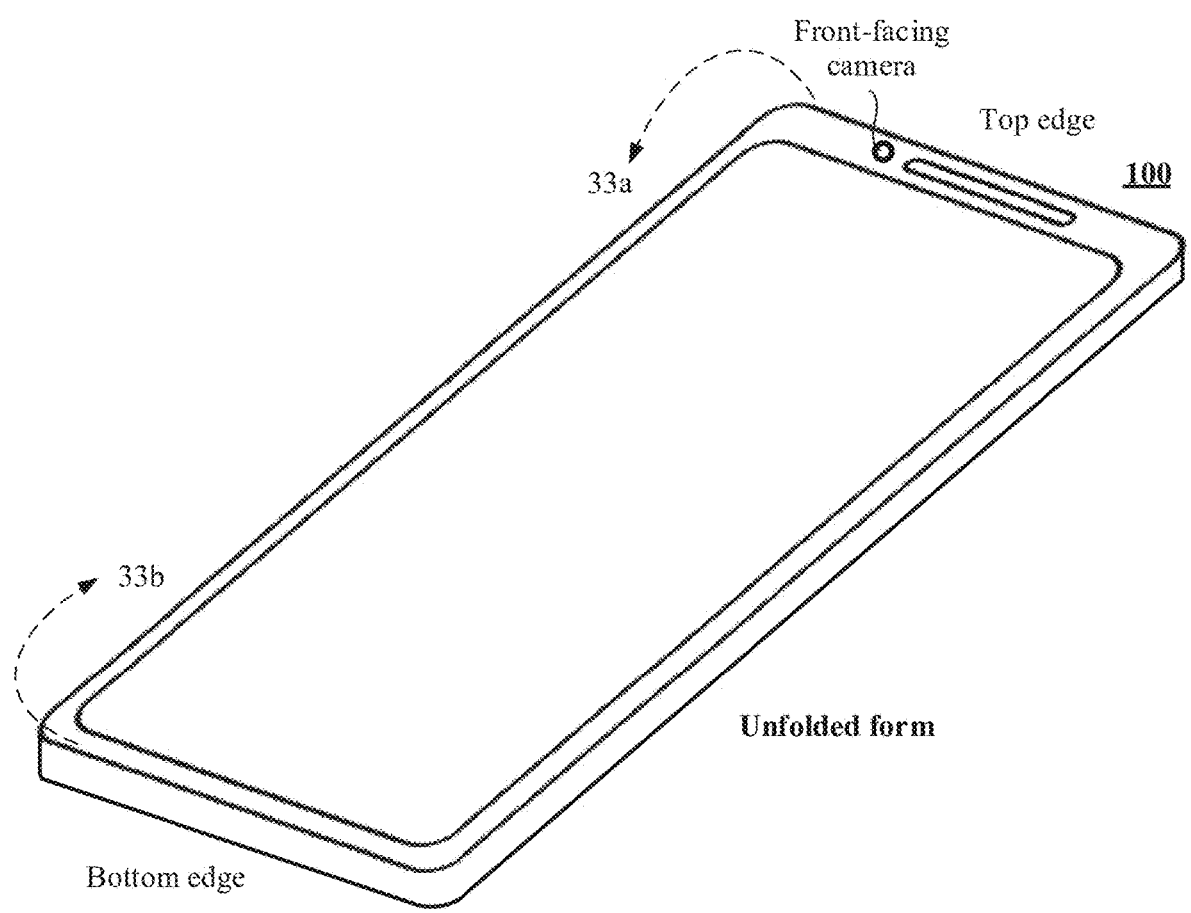
FIG. 2A to FIG. 2F are schematic diagrams of product forms of a horizontally folded electronic device according to an embodiment of this disclosure.
Figure 2B:
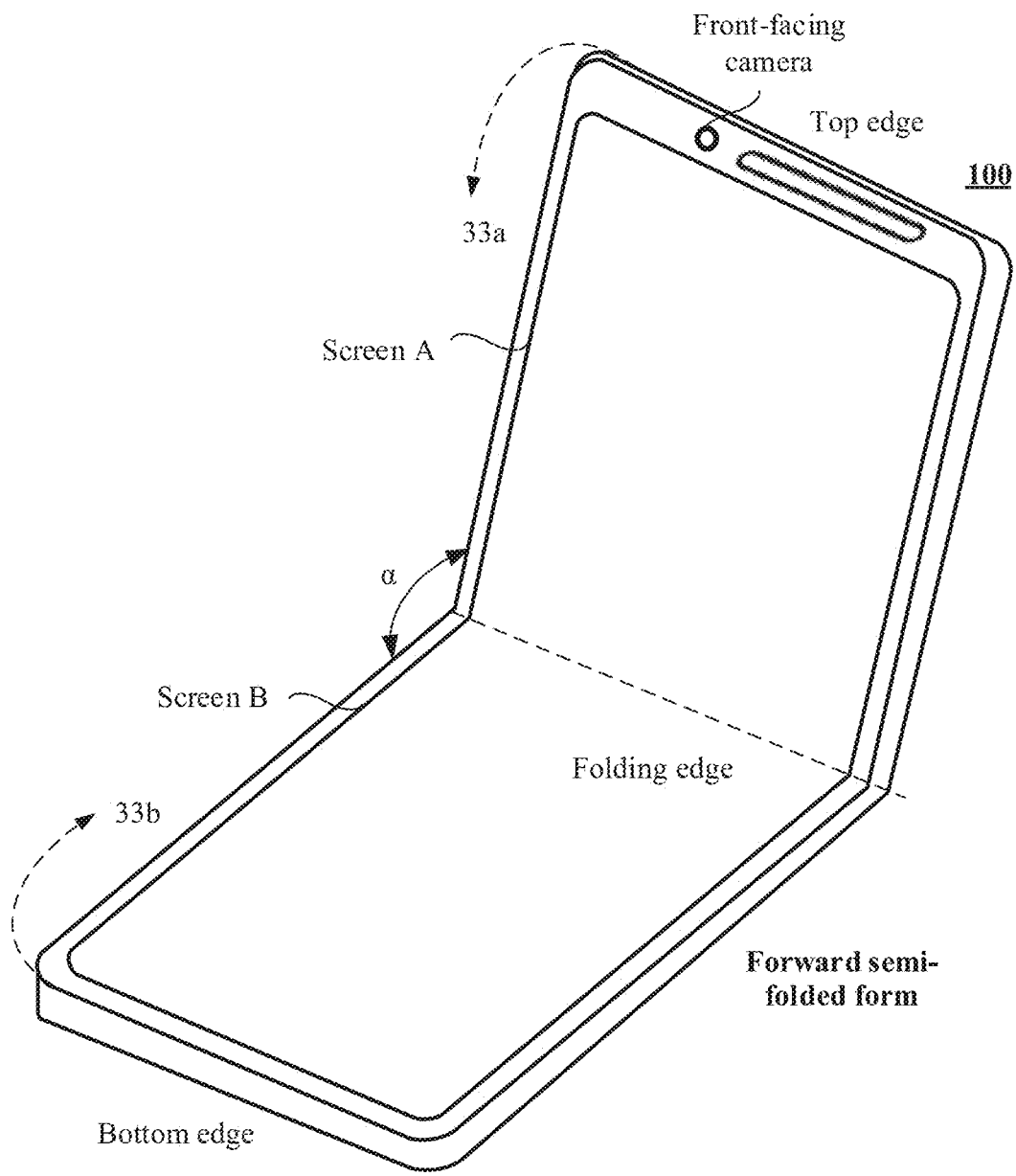
Figure 2C:
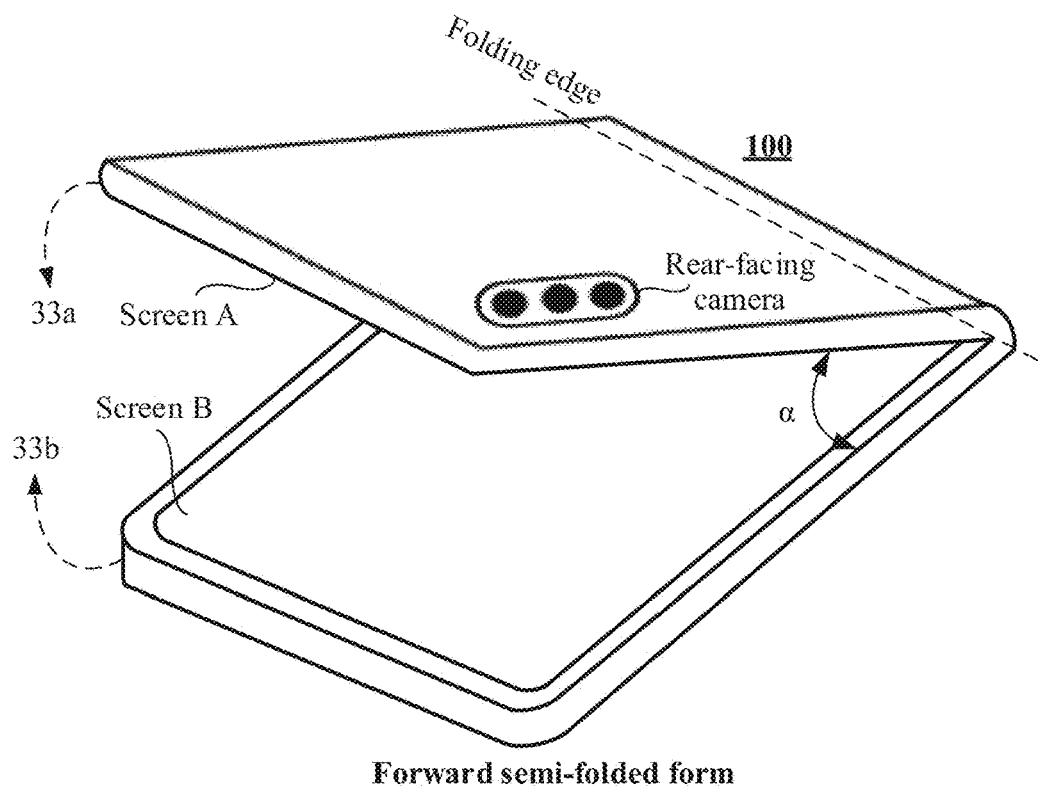
Figure 2D:
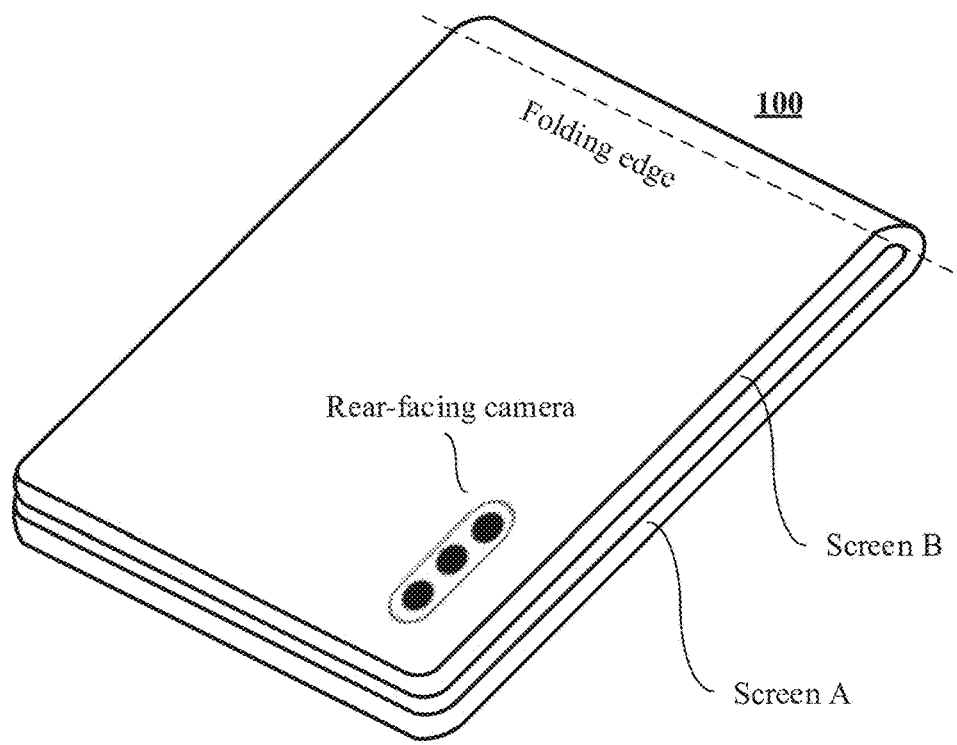

FIG. 2A is a schematic diagram of an unfolded form of the horizontally foldable screen. The horizontally foldable screen shown in FIG. 2A may be folded inward along the (biding edge based on a direction 33a and 33b shown in FIG. 2A, to form a screen A and a screen B in a forward semi-folded form shown in FIG. 2B and FIG. 2C. After the horizontally foldable screen is folded into the screen A and the screen B, the screen A and a front-facing camera on the electronic device 100 may be on a same side of the folding edge. The horizontally foldable screen shown in FIG. 2C may be further folded inward along the folding edge based on directions 33a and 33b shown in FIG. 2C, to form the horizontally foldable screen in a forward folded form shown in FIG. 2D. As shown in FIG. 2D, after the horizontally foldable screen of the electronic device 100 is fully folded forward, the screen A and the screen B face each other and are invisible to a user.

Figure 2E:
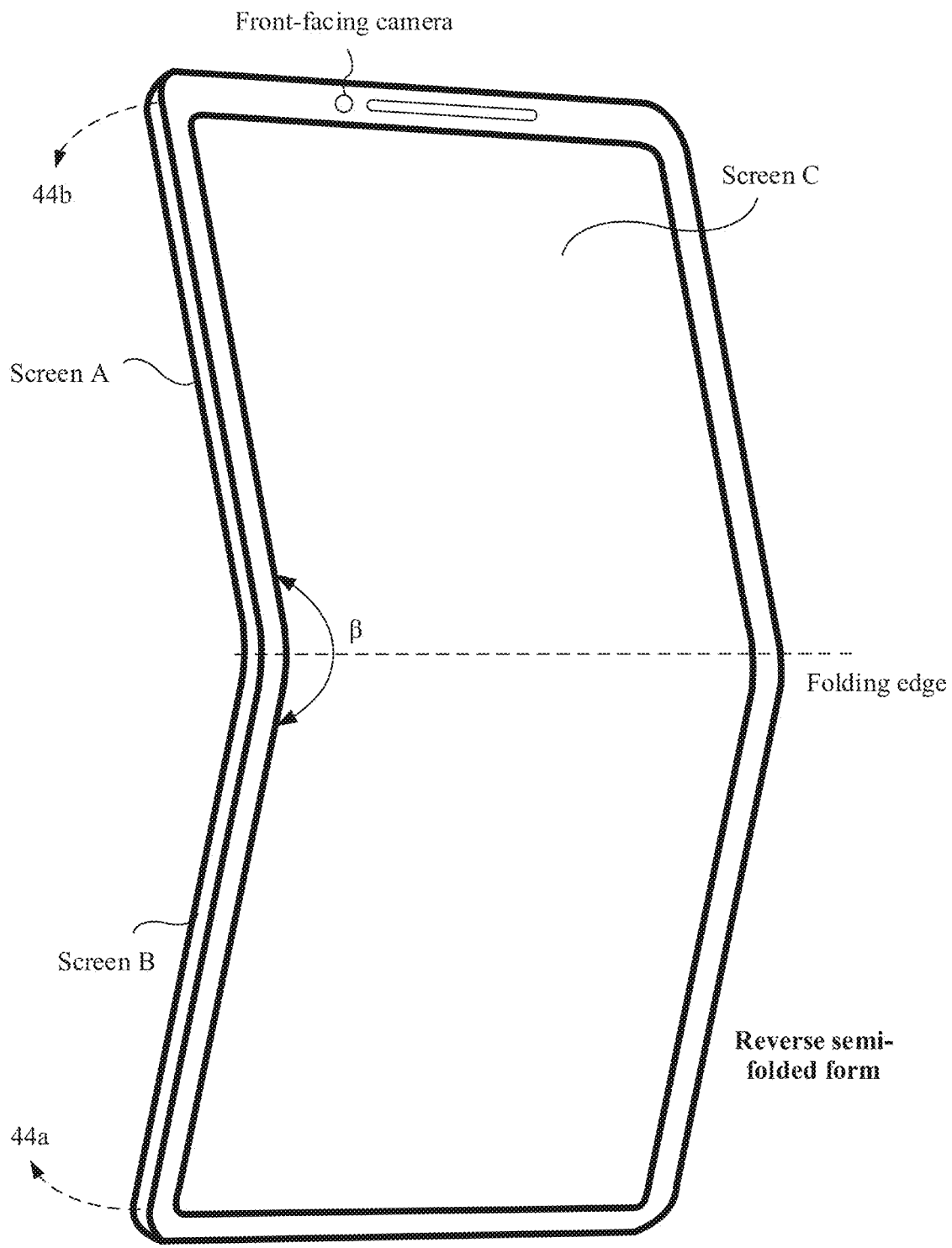
Figure 2F:
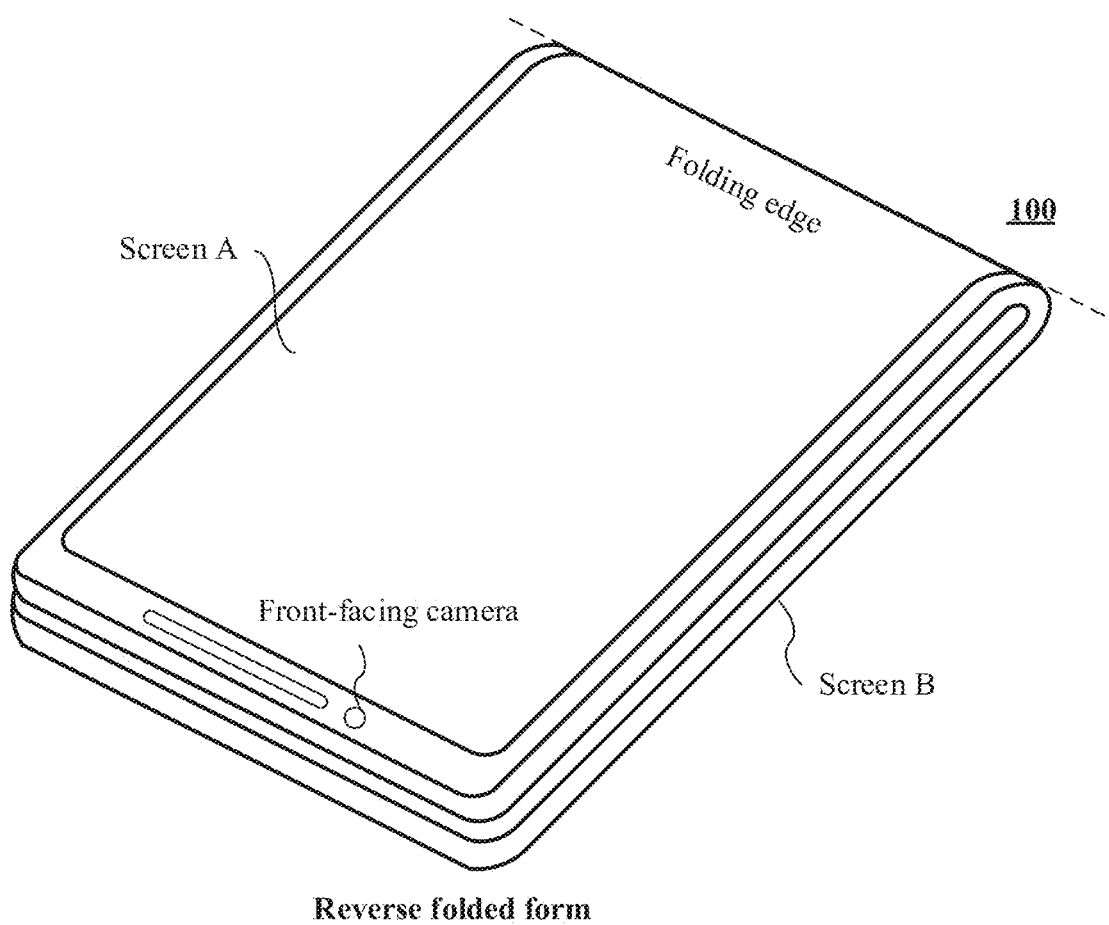

In some embodiments, the horizontally foldable screen shown in FIG. A may alternatively be folded outward along the folding edge, to form the screen A and the screen B in a reverse semi-folded form shown in FIG. 2E. The horizontally foldable screen shown in FIG. 2E may be further folded outward along the folding edge based on directions 44a and 44b shown in FIG. 2E, to form the horizontally foldable screen in a reverse folded form shown in FIG. 2F. As shown in FIG. 2F, after the horizontally foldable screen of the electronic device 100 is fully folded reversely, the screen A and the screen B are back to back, and a back (namely, a back of the screen A and a back of the screen B) of the electronic device 100 is invisible to the user.

A display (a screen C) may be further disposed on the back of the screen A and/or the screen B of the foldable screen (the vertically foldable screen or the horizontally foldable screen) provided in this embodiment of this disclosure.

The foldable screen including the screen A and the screen B is an inward screen of the electronic device 100, and the screen A, the screen B, and the front-facing camera are located on a front of the electronic device 100. The screen C (namely, a first screen) is an outward screen of the electronic device 100, and the screen C and a rear-facing camera are located on the back of the electronic device 100.

In this embodiment of this disclosure, the screen C may be referred to as the first screen, the screen A may be referred to as the second screen, and the screen B may be referred to as the third screen. The screen C is disposed on the back of the screen A, and orientations of the screen C and the screen A are opposite. A rear-facing camera corresponding to the screen C may be referred to as a first camera, and a front-facing camera corresponding to the screen A may be referred to as a second camera. It may be understood that the orientation of the screen C is consistent with a shooting direction of the rear-facing camera, and the orientation of the screen A is consistent with a shooting direction of the front-facing camera. When the foldable screen configured as the inward screen of the electronic device is folded into the screen A and the screen B along the folding edge, the screen B and the front-facing camera (namely, the second camera) corresponding to the screen A are located on different sides of the folding edge.

Figure 3A:
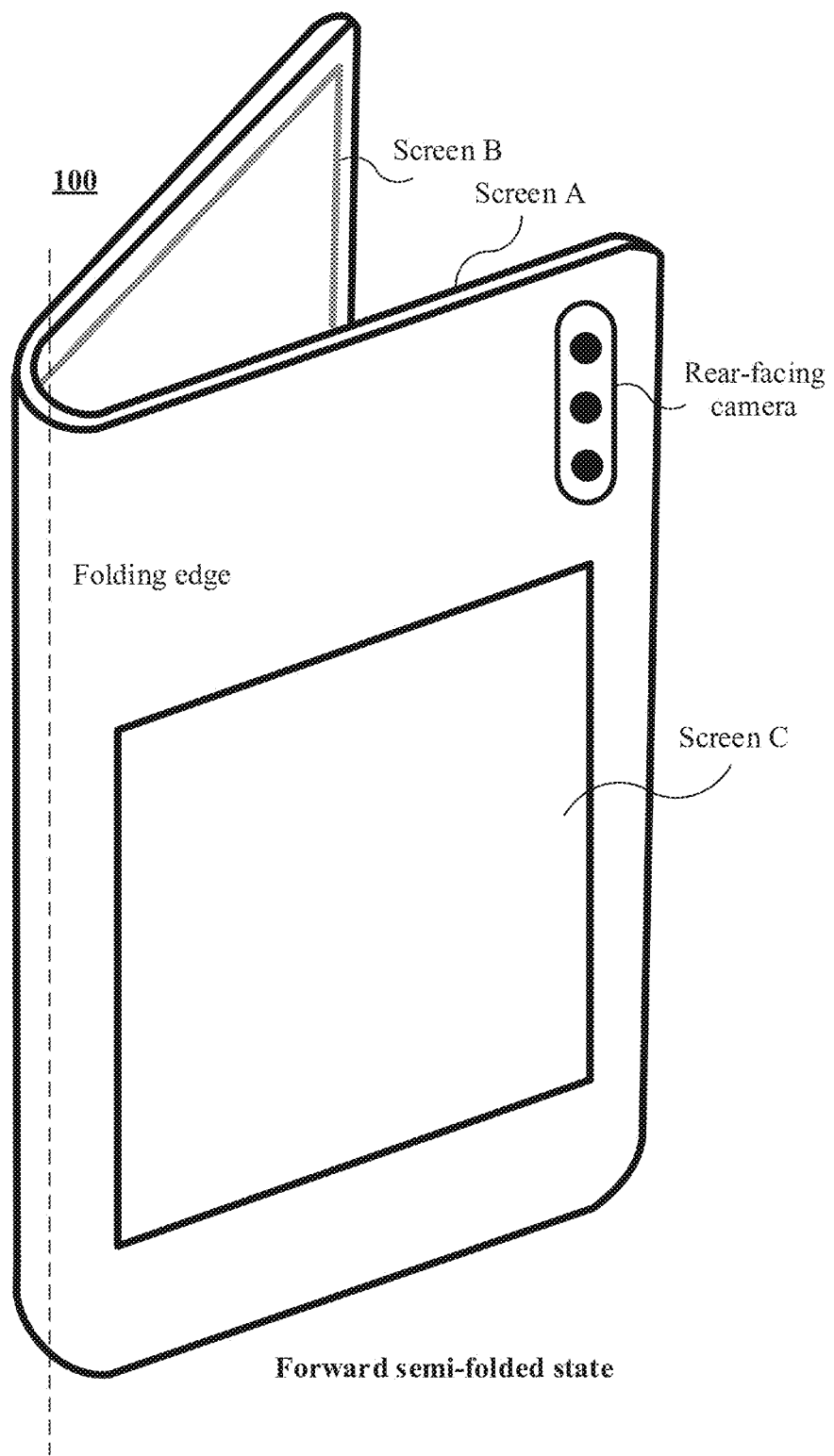
FIG. 3A to FIG. 3C are schematic diagrams of an outward screen of a vertically folded electronic device according to an embodiment of this disclosure.
Figure 3B:
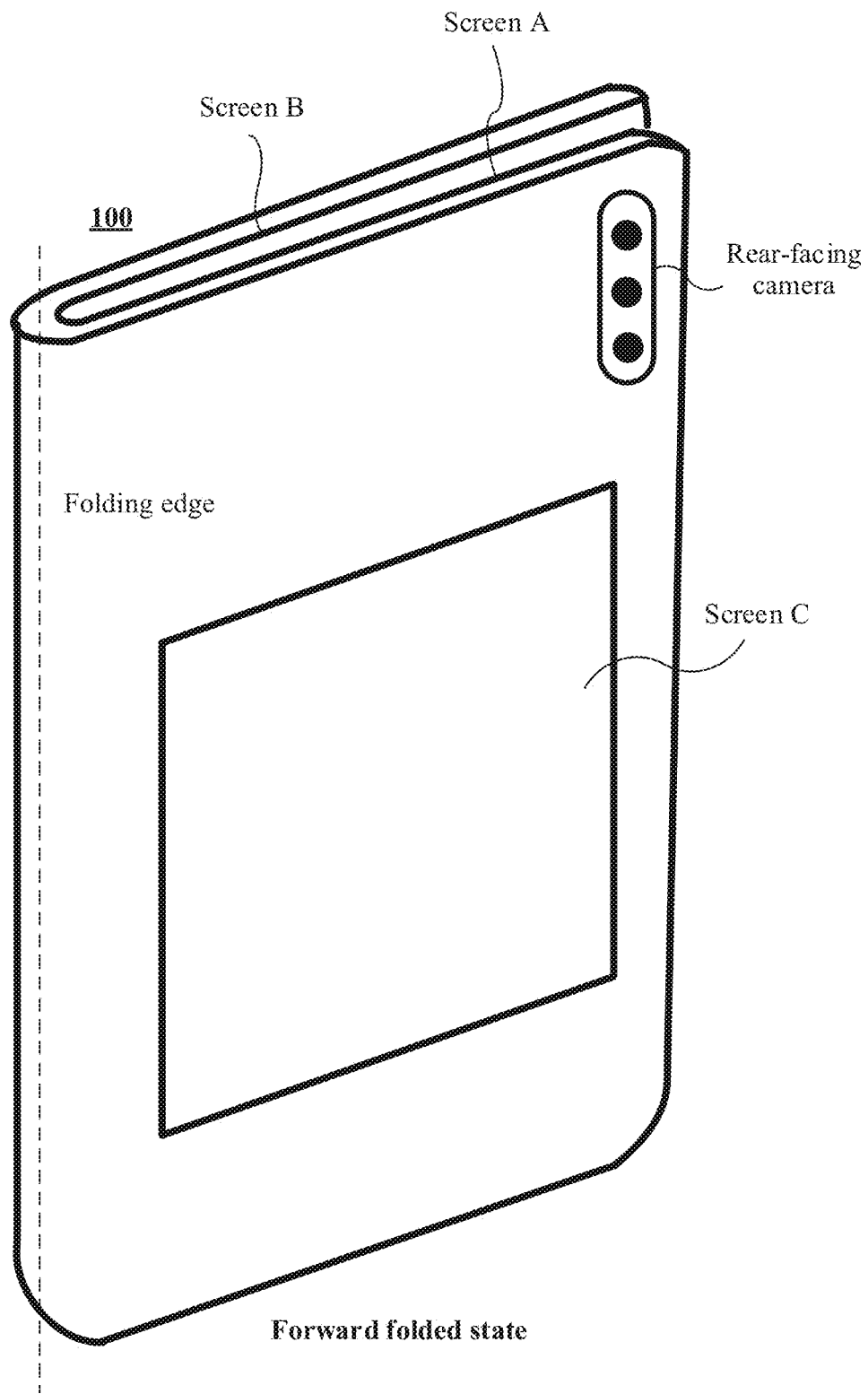
Figure 3C:
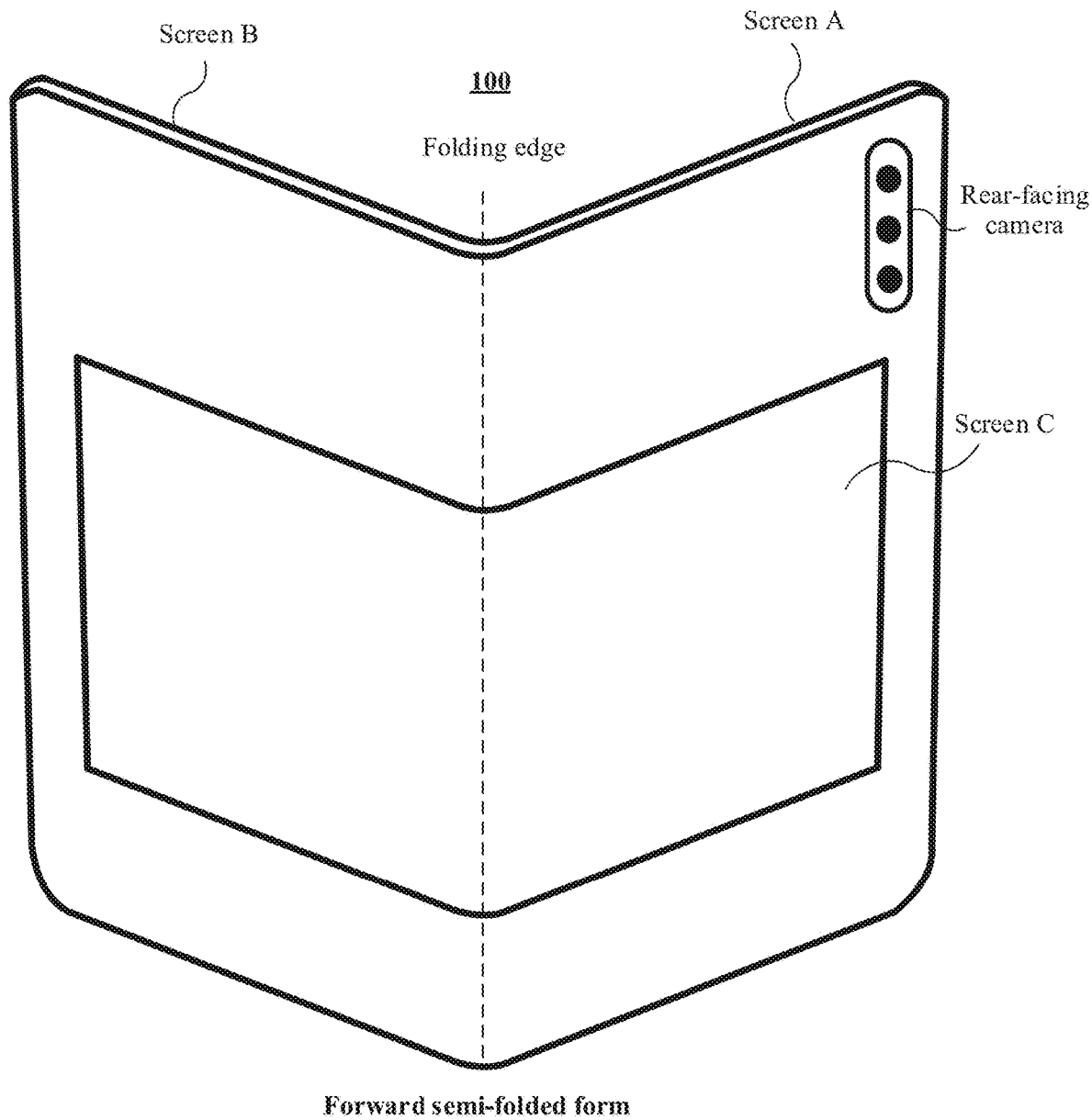
Figure 4A:
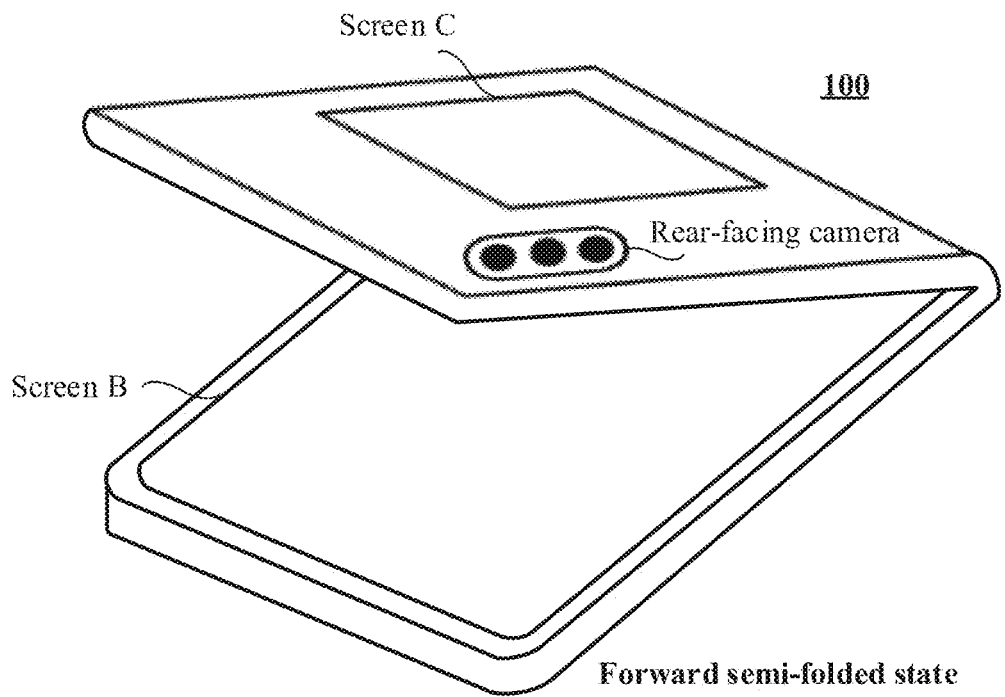
FIG. 4A to FIG. 4C are schematic diagrams of an outward screen of a horizontally folded electronic device according to an embodiment of this disclosure.
Figure 4B:
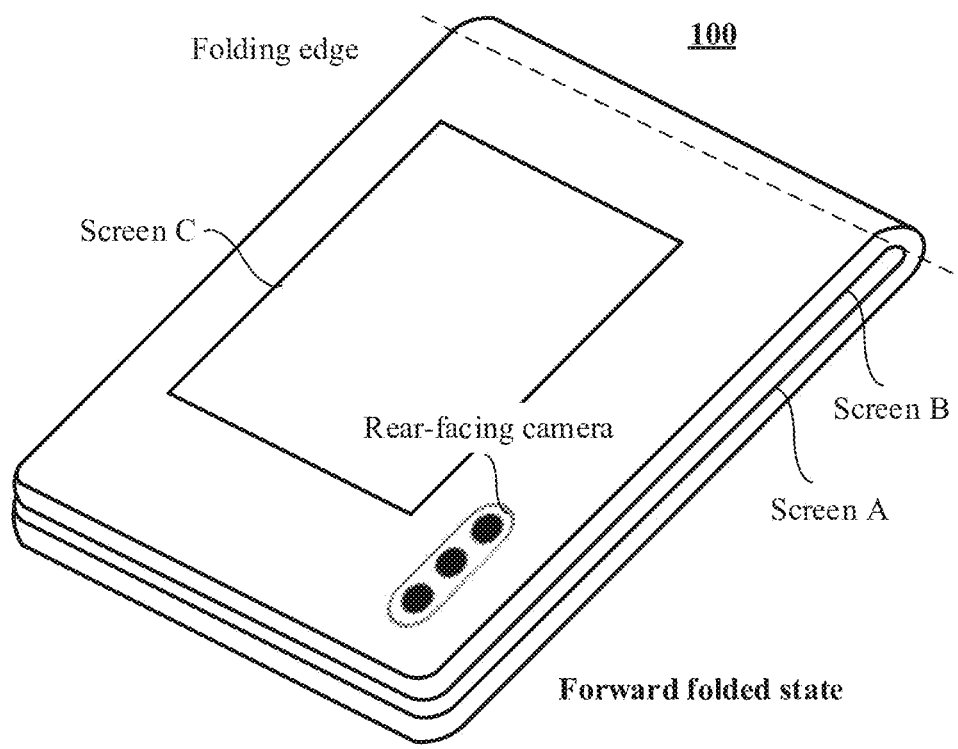
Figure 4C:
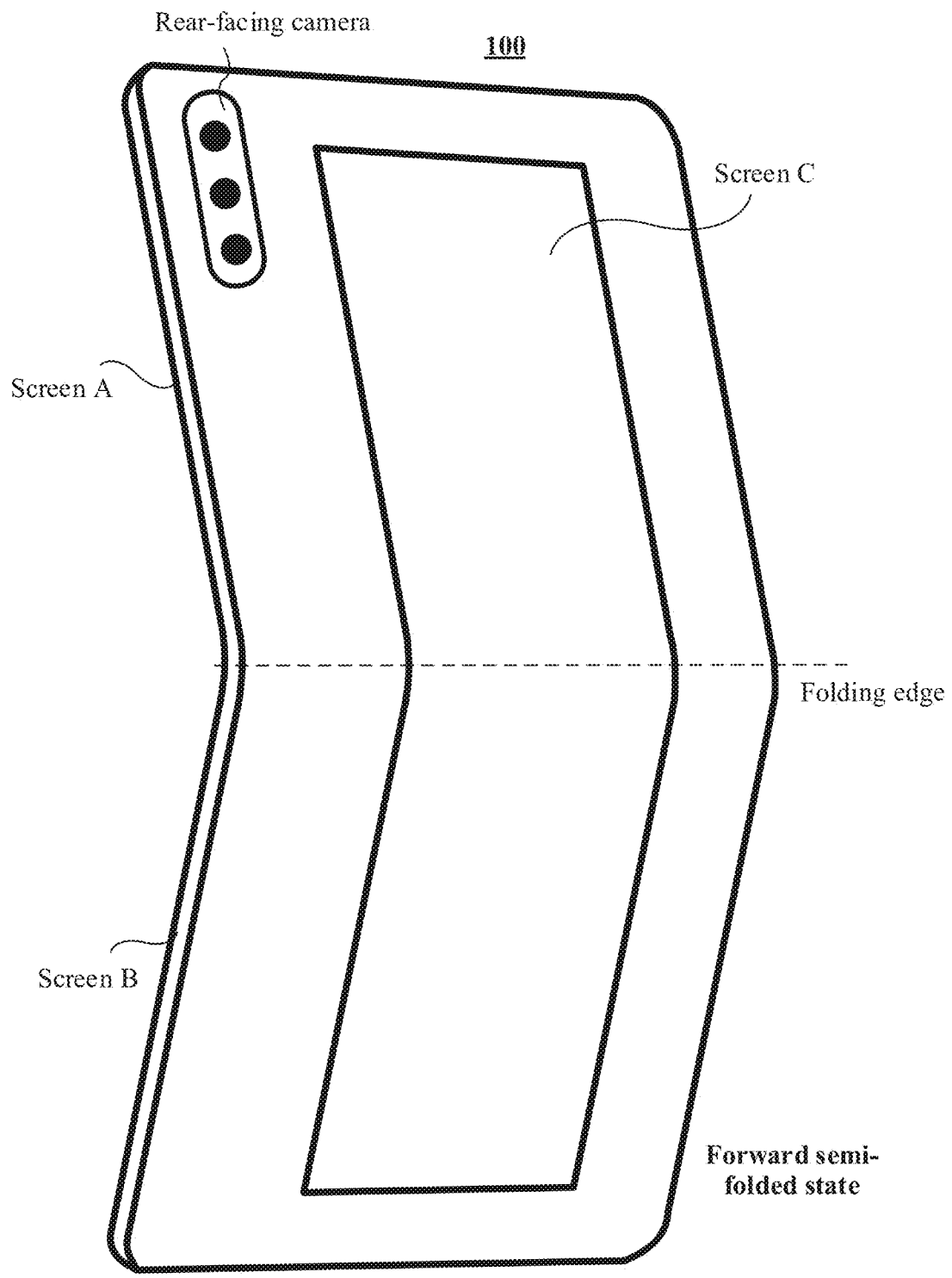

For example, FIG. 3A to FIG. 3C are schematic diagrams of an outward screen of the electronic device 100 whose inward screen is configured as a vertically foldable screen. FIG. 4A to FIG. 4C are schematic diagrams of an outward screen of the electronic device 100 whose inward screen is configured as a horizontally foldable screen.

For example, as shown in FIG. 3A and FIG. 3B, the screen C may be disposed on the back of the screen A in the vertically foldable screen of the electronic device 100. As shown in FIG. 4A and FIG. 4B, the screen C may be disposed on the back of the screen A in the horizontally foldable screen of the electronic device 100. As shown in FIG. 3B and FIG. 4B, after the foldable screen corresponding to the inward screen is fully folded forward, the screen A and the screen B are invisible to the user, the screen C is located on the back of the screen A, and the screen C is visible to the user. The screen C and the rear-facing camera of the electronic device 100 may be on a same side of the folding edge.

For example, as shown in FIG. 3C, a vertically foldable screen C may be disposed on the backs of the screen A and the screen B of the inward screen. For example, as shown in FIG. 4C, a horizontally foldable screen C may be disposed on the backs of the screen A and the screen B of the inward screen. It can be learned from FIG. 3C and FIG. 4C that when the inward screen (namely, the foldable screen including the screen A and the screen B) of the electronic device 100 is in an unfolded form, the outward screen (namely, the screen C) is also in an unfolded form; when the inward screen of the electronic device 100 is folded, the outward screen is folded accordingly; and when the inward screen of the electronic device 100 is in a folded form, the outward screen is also in a folded form.

It may be understood that, for the electronic device 100 having the screen C, when the inward screen (namely, the foldable screen including the screen A and the screen B) is in the folded form, the electronic device 100 may display a user interface on the screen C; or when the inward screen is in the semi-folded form and unfolded form, the electronic device 100 may display a user interface on the screen A, the screen B, and/or the screen C.

In some embodiments, the foldable screen of the electronic device 100 may surround a periphery of the electronic device 100, and the screen A, the screen B, and the screen C each may be a part of the foldable screen.

In this embodiment of this disclosure, the electronic device 100 may determine, based on a detected included angle α (a first included angle) between the screen A and the screen B, a form of the foldable screen configured as the inward screen. In some embodiments, a value range of the included angle α between the screen A and the screen B of the foldable screen (the vertically foldable screen or the horizontally foldable screen) of the electronic device 100 is [0°, 180°], and the electronic device 100 cannot be folded reversely. In some embodiments, a value range of the included angle α between the screen A and the screen B of the foldable screen (the vertically foldable screen or the horizontally foldable screen) of the electronic device 100 is [0°, 360°], and the electronic device 100 can perform both forward folding and reverse folding.

It should be noted that, in this embodiment of this disclosure, the included angle α between the screen A and the screen B may also be referred to as the first included angle.

For example, the value range of α is [0°, 360°]. When the included angle α∈[0°, P1), the electronic device 100 may determine that the foldable screen is in the forward folded form. When the included angle α∈[P1, P2), the electronic device 100 may determine that the foldable screen is in the forward semi-folded form. When the included angle α∈[P2, P3), the electronic device 100 may determine that the foldable screen is in the unfolded form. When α∈[P3, P4), the electronic device 100 may determine that the foldable screen is in the reverse semi-folded form. When the included angle α∈[P4, 360°), the electronic device 100 may determine that the foldable screen is in the reverse folded form. 0°<P1<P2<180°<P3<P4<360°. P1, P2, P3, and P4 are preset angle thresholds. P1, P2, P3, and P4 may be set by the user in the electronic device 100, or may be set in the electronic device 100 by default.

In some embodiments, a difference between P1 and 0°, a difference between P2 and 180°, a difference between P3 and 180°, and a difference between P4 and 360° are all preset error values set by the electronic device 100 or the user. For example, if the preset error values are equal to 2°, P1, P2, P3, and P4 are respectively 2°, 178°, 192°, and 358°.

In some embodiments, P1, P2, P3, and P4 may be determined based on a habit of using the foldable screen by the user. For example, according to use habits of most users, when the included angle α between the screen A and the screen B is less than 50 degrees, there is a relatively high probability that the user intends not to use the screen A or the screen B; when the included angle α between the screen A and the screen B is greater than 50° and less than or equal to 160° (or a is greater than 190° and less than or equal to 280°), there is a relatively high probability that the user intends to use the screen A and the screen B to display different displayed content; when the included angle α between the screen A and the screen B is greater than 160° and less than or equal to 190°, there is a relatively high probability that the user intends to use the screen A and the screen B as a whole (that is, as a complete display); and when the included angle between the screen A and the screen B is greater than 280° and less than or equal to 360°, there is a relatively high probability that the user intends to use the screen A or the screen B alone. Based on the use habits, a value range of P1 may be (0, 40°], a value range of P2 may be [160°, 180°), a value range of P3 may be [180°, 190°), and a value range of P4 may be [280°, 360°). For example, P1 is 30°, P2 is 170°, P3 is 185°, and P4 is 300°.

It should be noted that, in this embodiment of this disclosure, the at least two displays formed by folding the foldable screen may be a plurality of displays that exist independently, or may be a complete display of an integrated structure that is folded to form at least two parts.

For example, the foldable screen may be a flexible foldable screen, and the flexible foldable screen includes a folding edge made of a flexible material. A part or all of the flexible foldable screen is made of a flexible material. At least two screens formed by folding the flexible foldable screen are a complete screen of an integrated structure that is folded to form at least two parts.

For another example, the foldable screen may be a multi-screen foldable screen. The multi-screen foldable screen may include a plurality of (two or more) displays. The plurality of displays are a plurality of separate displays. The plurality of displays may be sequentially connected by using folding axes. Each screen may rotate around a folding axis connected to the screen, to implement folding of the multi-screen foldable screen.

In subsequent embodiments of this disclosure, an example in which the foldable screen is a flexible foldable screen that can be horizontally folded is used to describe the display method provided in embodiments of this disclosure.

The following describes, with reference to the accompanying drawings, the electronic device 11 provided in embodiments of this disclosure.

The electronic device 100 may be a terminal device using iOS, Android, Microsoft, or another operating system. For example, the electronic device 100 may be a device including the foregoing foldable screen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (Augmented reality, AR)/virtual reality (virtual reality, VR) device. A specific type of the electronic device 100 is not specially limited in embodiments of this disclosure.

Figure 5:
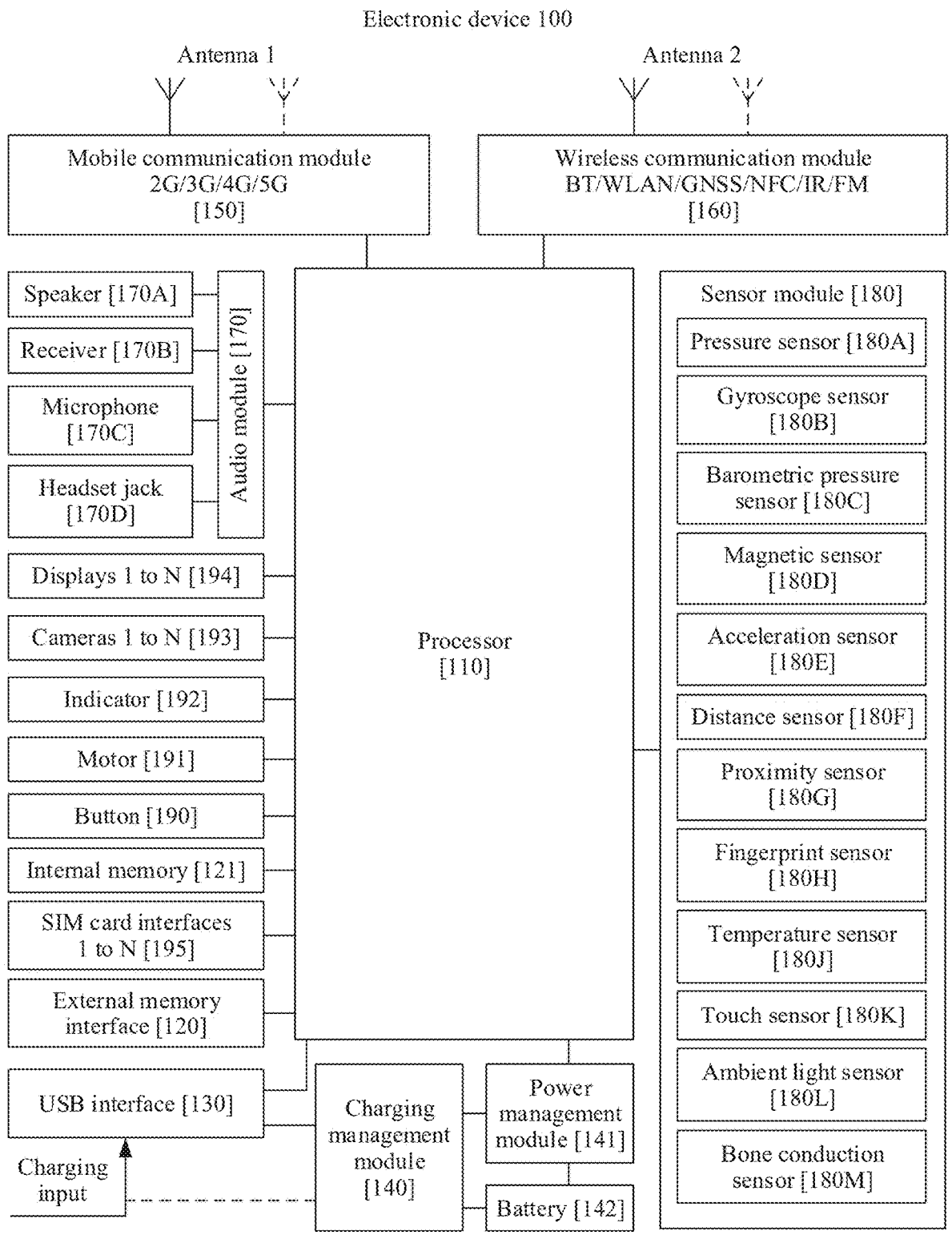
FIG. 5 is a schematic diagram of a structure of an electronic device according to an embodiment of this disclosure.

For example, FIG. 5 is a schematic diagram of a structure of the electronic device 100. As shown in FIG. 5, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180E, a bone conduction sensor 180M, and the like.

It may be understood that the structure shown in this embodiment of the present disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may further be disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured for audio communication.

The UART interface is a universal serial data bus, and is configured to perform asynchronous communication. The bus may be a two-way communication bus. The bus converts to-be-transmitted data between serial communication and parallel communication. In some embodiments, the DART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSO, and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured through software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, a MIDI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be used to connect to a headset for playing audio through the headset. Alternatively, the interface may be configured to connect to another electronic device, for example, an AR device.

It may be understood that an interface connection relationship between the modules shown in this embodiment of the present disclosure is merely an example for description, and does not constitute a limitation on the structure of the electronic device 100. In some other embodiments of this disclosure, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may further supply power to the electronic device 100 through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that includes wireless communication technologies such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video try the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communications processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), BeiDou navigation satellite system (BeiDou navigation satellite system, BIAS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, (SLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a shooting function through the camera 193, the ISP, the video codec, the GPU, the display 194, the application processor and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The internal memory 121 may include one or more random access memories (random access memory RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory. SDRAM), a double data rate synchronous dynamic random access memory (double data rate synchronous dynamic random access memory, DDR SDRAM, where for example, a fifth generation DDR SDRAM is generally referred to as a DDR5 SDRAM), and the like. The nonvolatile memory may include a magnetic disk storage device and a flash memory (flash memory).

According to an operation principle, the flash memory may include a NOR FLASH, a NAND FLASH, a 3D NAND FLASH, and the like. According to a potential order of a cell, the flash memory may include a single-level cell (single-level cell, SLC), a multi-level cell (multi-level cell, MLC), a triple-level cell (triple-level cell, TLC), a quad-level cell (quad-level cell, QLC), and the like. According to a storage specification, the flash memory may include a universal flash storage (English: universal flash storage, UFS), an embedded multimedia card (embedded multimedia card, eMMC), and the like.

The random access memory may be directly read and written by the processor 110, may be configured to store an executable program (for example, machine instructions) of an operating system or another running program, may be further configured to store data of a user and an application, and the like.

The non-volatile memory may also store an executable program, data of a user and an application, and the like, and may be loaded to the random access memory in advance for the processor 110 to directly perform reading and writing.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

Figure 6A:
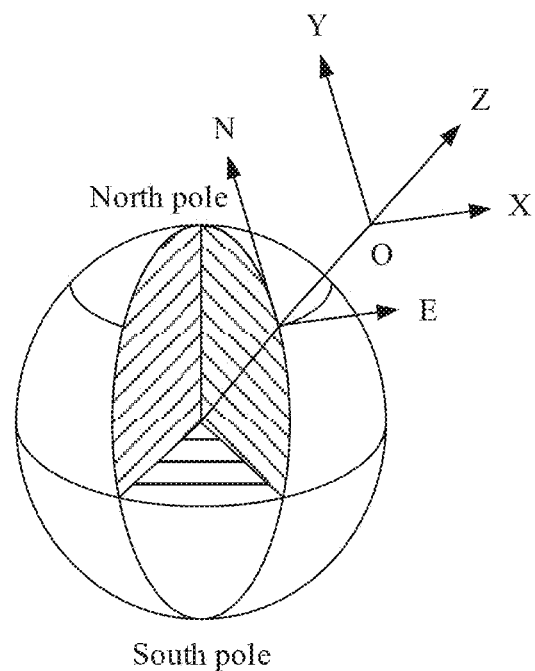
FIG. 6A is a schematic diagram of a geographic coordinate system according to an embodiment of this disclosure.

It should be noted that a coordinate system of the gyroscope sensor is a geographic coordinate system. As shown in FIG. 6A, in the geographic coordinate system, an origin O is located at a point at which a carrier (namely, a device including the gyroscope sensor, for example, the electronic device 100) is located, an axis X points to the east (B) along a local latitude line, an axis Y points to the north (N) along a local meridian line, and an axis Z points upward along a local geographic perpendicular line and forms a right-hand rectangular coordinate system together with the axis X and the axis Y. A plane formed by the axis X and the axis Y is a local horizontal plane, and a plane formed by the axis Y and the axis Z is a local meridian plane. Therefore, it may be understood that the coordinate system of the gyroscope sensor is as follows: using the gyroscope sensor as the origin O, using a direction pointing to the east along the local latitude line as the axis X, using a direction pointing to the north along the local meridian line as the axis Y, and using a direction pointing upward along the local geographic perpendicular line (namely, a direction of the geographic perpendicular line) as the axis Z.

In this embodiment of this disclosure, the display 194 of the electronic device 100 may be folded to form a plurality of displays. A gyroscope sensor 180B may be disposed on each screen, and is configured to measure an orientation of the display (namely, a direction vector perpendicular to the display and pointing from the inside of the electronic device 100 to the outside). The electronic device 100 may determine an included angle between adjacent screens based on an orientation change that is of each display and that is obtained through measurement by the gyroscope sensor 180B.

Defer to FIG. 1A to FIG. 2F. The display 194 of the electronic device 100 may be folded to form the screen A and the screen B that are adjacent to each other. The screen A is provided with a gyroscope sensor A, and the electronic device 100 may measure an orientation of the screen A by using the gyroscope sensor A. The screen B is provided with a gyroscope sensor B, and the electronic device 100 may measure an orientation of the screen B by using the gyroscope sensor B. The electronic device 100 may determine the included angle α between the screen A and the screen B based on measured orientation changes of the screen A and the screen B. The following specifically describes a principle of obtaining the included angle α.

Figure 6B:
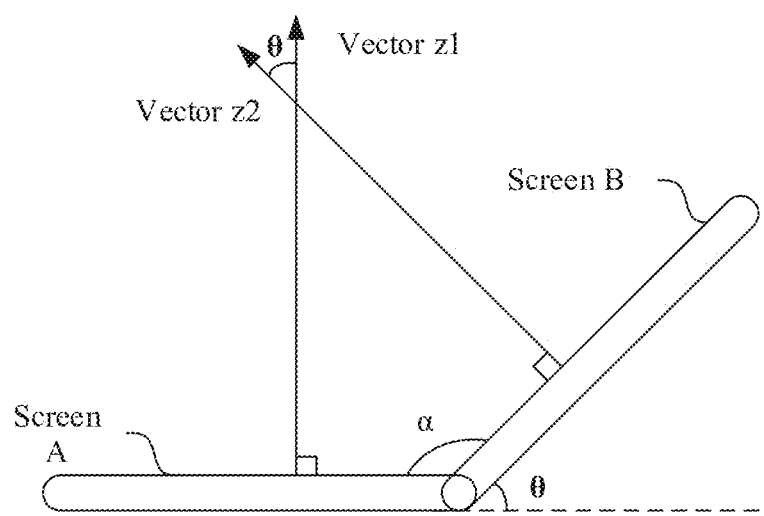
FIG. 6B is a schematic diagram of calculating an included angle between a screen A and a screen B according to an embodiment of this disclosure.

For example, FIG. 6B is a schematic diagram of the included angle α between the screen A and the screen B. As shown in FIG. 6B, the electronic device 100 measures, by using the gyroscope sensor A, that the orientation of the screen A is a vector $\vec{z1}$, and measures, by using the gyroscope sensor B, that the orientation of the screen B is a vector $\vec{z2}$. The vector $\vec{z1}$ is perpendicular to the screen A, and the vector $\vec{z2}$ is perpendicular to the screen B. The electronic device 100 may calculate an included angle θ between the vector $\vec{z1}$ and the vector $\vec{z2}$ by using the following formula (1), and then the electronic device 100 may determine the included angle between the screen A and the screen B: α=180°−θ.

$$\theta = \arccos\left(\frac{\vec{z1} \cdot \vec{z2}}{|\vec{z1}| \times |\vec{z2}|}\right) \quad \text{Formula (1)}$$

It should be noted that although locations of the gyroscope sensor A on the screen A and the gyroscope sensor B on the screen B do not overlap, that is, origins of coordinate systems of the two gyroscope sensors do not overlap, two X axes of the two coordinate systems are parallel, two Y axes are parallel, and two Z axes are also parallel. In this way, although the vector $\vec{z1}$ and the vector $\vec{z2}$ are measured in different coordinate systems by using different gyroscope sensors, because the axes of the coordinate systems of the two gyroscope sensors are parallel, the electronic device 100 may calculate the included angle θ between the vector $\vec{z1}$ and the vector $\vec{z2}$ by using the formula (1).

In some embodiments, the electronic device 100 measures an included angle between adjacent screens of the foldable screen, for example, the included angle α between the screen A and the screen B, by using one or more acceleration sensors. For example, one acceleration sensor may be disposed on each display of the foldable screen. The electronic device 100 (for example, the processor 110) may measure, by using the acceleration sensor, a motion acceleration when each display is rotated; and then calculate, based on the measured motion acceleration, an angle at which one display rotates relative to another display, for example, the included angle α between the screen A and the screen B.

In some embodiments, the gyroscope sensor may be a virtual gyroscope sensor formed through cooperation of a plurality of other sensors. The virtual gyroscope sensor may be configured to calculate an included angle between adjacent screens of the foldable screen, for example, the included angle α between the screen A and the screen B.

In some other embodiments, an angle sensor is installed on a folding part (for example, a rotating shaft) of the electronic device 100. The electronic device 100 may measure, by using the angle sensor, an included angle between adjacent screens of the foldable screen, for example, the included angle α between the screen A and the screen B.

In this embodiment of this disclosure, the electronic device 100 may further measure an included angle β1 between the screen A and a horizontal plane by using the gyroscope sensor A, and measure an included angle β2 between the screen B and the horizontal plane by using the gyroscope sensor B.

Figure 7A:
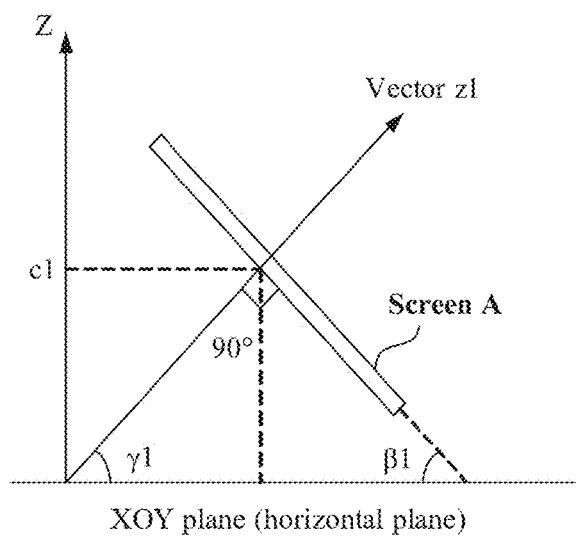
FIG. 7A is a schematic diagram of calculating an included angle between a screen A and a horizontal plane according to an embodiment of this disclosure.

For example, FIG. 7A shows the coordinate system of the gyroscope sensor A on the screen A of the electronic device 100. An XOY plane formed by the axis X and the axis Y is a local horizontal plane, and a plane formed by the axis Y and the axis Z is a local meridian plane. The orientation of the screen A of the electronic device 100 in the coordinate system of the gyroscope sensor A is the vector $\vec{z1}=(a1, b1, c1)$. An included angle γ1 between the vector $\vec{z1}$ and the XOY plane (namely, the horizontal plane) has the following relationship: $c1=|\vec{z1}|\times\sin \gamma 1$. The screen A of the electronic device 100 is perpendicular to the vector $\vec{z1}$. An included angle β1 between a plane on which the screen A of the electronic device 100 is located and the horizontal plane and the included angle γ1 are complementary to each other, that is, $\beta 1+\gamma 1=90°$. It can be learned that the included angle β1 and the vector $\vec{z1}$ have the following relationship: $c1=\vec{z1}\times\cos \beta 1$, where $$\beta 1 = \arccos\left(\frac{c1}{|\vec{z1}|}\right) \quad \text{Formula (2)}$$

Figure 7B:
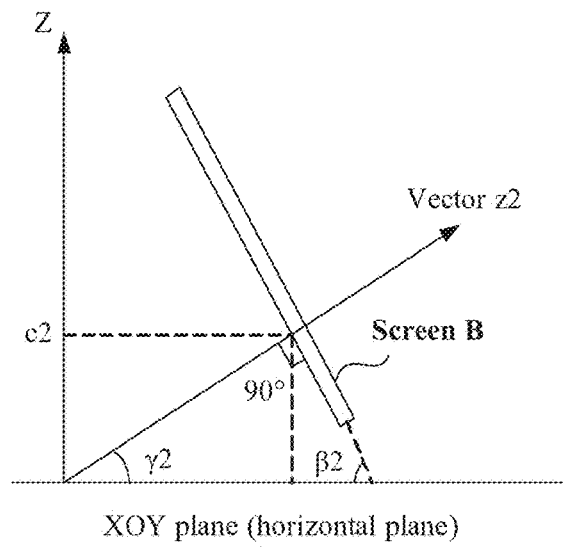
FIG. 7B is a schematic diagram of calculating an included angle between a screen B and a horizontal plane according to an embodiment of this disclosure.

For example, FIG. 7B shows the coordinate system of the gyroscope sensor B on the screen B of the electronic device 100. An XOY plane formed by the axis X and the axis Y is a local horizontal plane, and a plane formed by the axis Y and the axis Z is a local meridian plane. The orientation of the screen B of the electronic device 100 in the coordinate system of the gyroscope sensor is the vector $\vec{z2}=(a2, b2, c2)$. An included angle γ2 between the vector $\vec{z2}$ and the XOY plane (namely, the horizontal plane) has the following relationship: $c2=\vec{z2}\times\sin \gamma 2$. The screen B of the electronic device 100 is perpendicular to the vector $\vec{z2}$. An included angle β2 between a plane on which the screen B of the electronic device 100 is located and the horizontal plane and the included angle γ2 are complementary to each other, that is, $\beta 2+\gamma 2=90°$. It can be learned that the included angle β2 and the vector $\vec{z2}$ have the following relationship: $c2=\vec{z2}\times\cos \beta 2$, where $$\beta 2 = \arccos\left(\frac{c2}{|\vec{z2}|}\right) \quad \text{Formula (3)}$$

In conclusion, after obtaining, through measurement by the gyroscope sensor A, the vector $\vec{z1}$ corresponding to the orientation of the screen A, the electronic device 100 may determine the included angle β1 between the screen A and the horizontal plane by using the formula (2). In conclusion, after obtaining, through measurement by the gyroscope sensor B, the vector $\vec{z2}$ corresponding to the orientation of the screen B, the electronic device 100 may determine the included angle β2 between the screen B and the horizontal plane by using the formula (3).

The barometric pressure sensor 180C is configured to measure barometric pressure. In some embodiments, the electronic device 100 calculates an altitude through the barometric pressure measured by the barometric pressure sensor 180C, to assist in positioning and navigation.

The acceleration sensor 180E may detect accelerations in various directions (usually on three axes) of the electronic device 100. When the electronic device 100 is still, a magnitude and a direction of gravity may be detected. The acceleration sensor may be further configured to recognize a posture of the electronic device 100, and is applied to an application such as switching between a landscape mode and a portrait mode or a pedometer.

The distance sensor 180F is configured to measure a distance. The electronic device 100 may measure the distance in an infrared manner or a laser manner. In some embodiments, in a shooting scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode.

The ambient light sensor 180L is configured to sense ambient light brightness. The electronic device 100 may adaptively adjust brightness of the display 194 based on the sensed ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from lat of the display 194.

The bone conduction sensor 180M may obtain a vibration signal.

The button 190 includes a power button, a volume button, and the like. The button 190 may be a mechanical button or a touch button.

The motor 191 may generate a vibration prompt.

The indicator 192 may be an indicator light, and may be configured to indicate a charging status a power change, a message, a notification, and the like.

The SIM card interface 195 is configured to connect to a SIM card.

The following describes a display direction of the screen C of the electronic device 100 in embodiments of this disclosure.

In this embodiment of this disclosure, the electronic device 100 may determine a display direction of a user interface 1 corresponding to the screen C based on a detected physical posture of the screen C.

Figure 8A:
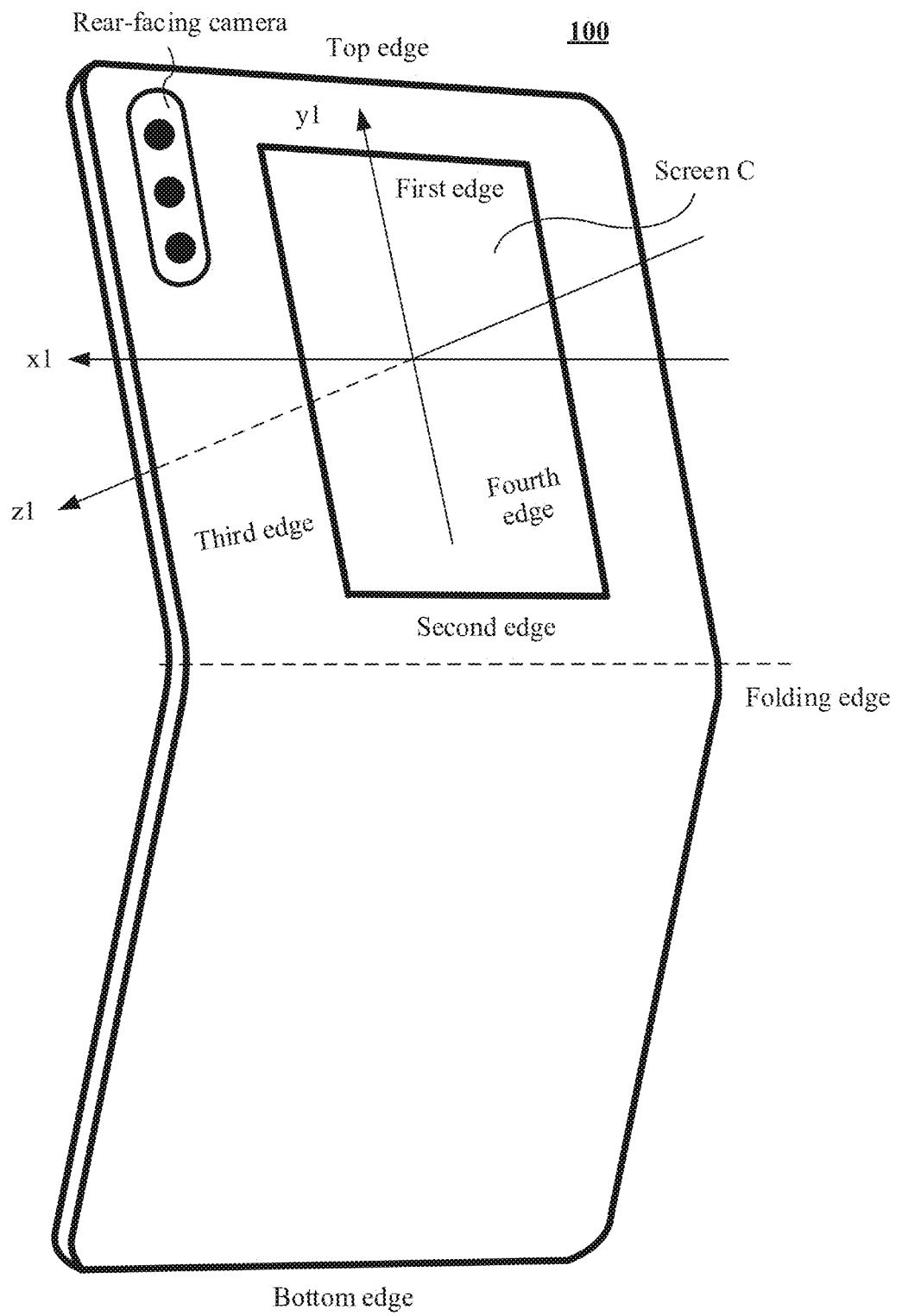
FIG. 8A is a schematic diagram of a coordinate system of an electronic device according to an embodiment of this disclosure.
Figure 8B:
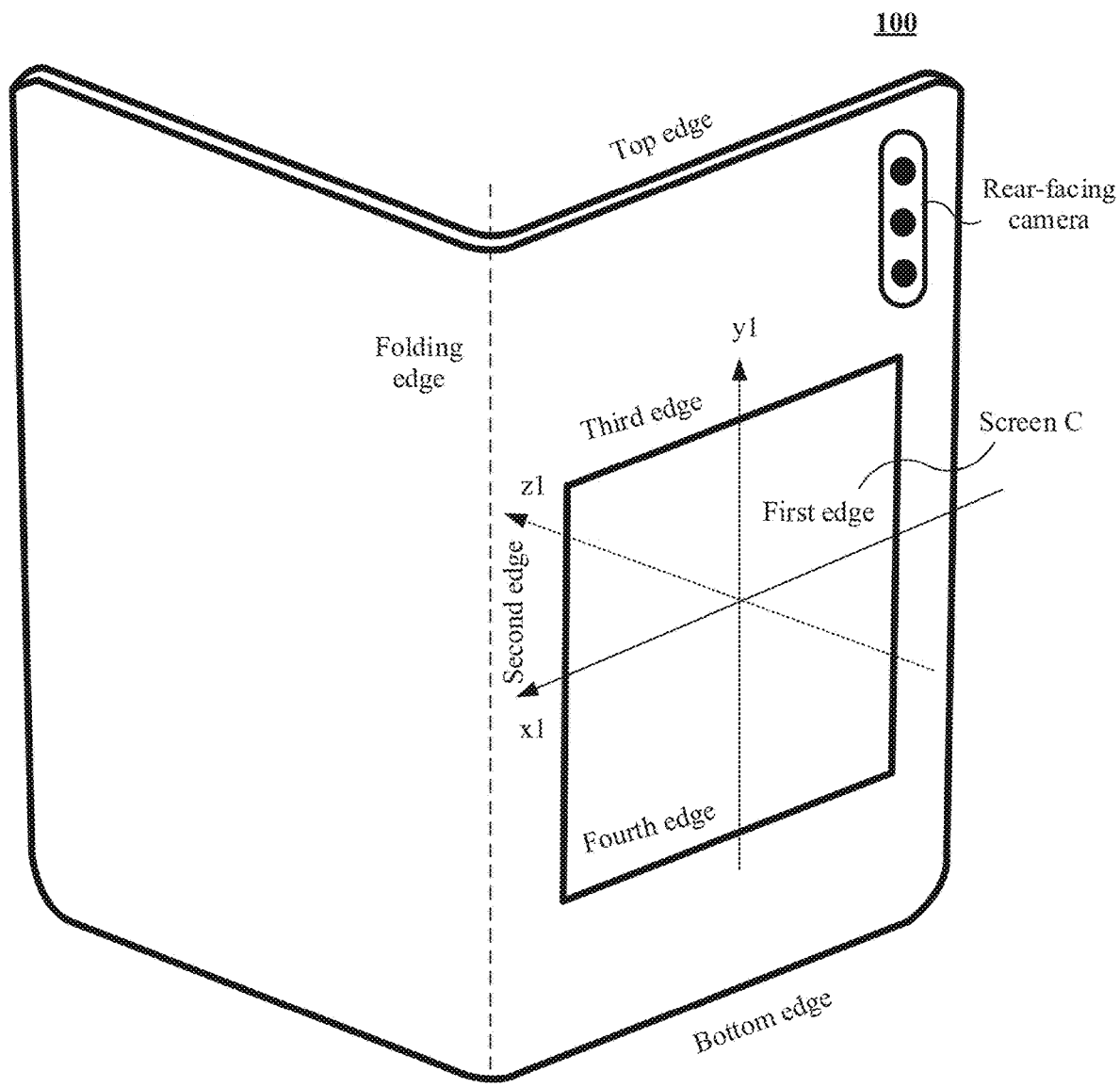
FIG. 8B is a schematic diagram of a coordinate system of another electronic device according to an embodiment of this disclosure.

For example, refer to the horizontally folded electronic device 100 shown in FIG. 8A and the vertically folded electronic device 100 shown in FIG. 8B. Four edges of the screen C include a first edge, a second edge, a third edge, and a fourth edge, and the first edge and the second edge of the screen C are parallel to the folding edge of the electronic device 100. The display direction of the user interface 1 corresponding to the screen C includes one or more of a display direction 1, a display direction 2, a display direction 3, and a display direction 4.

The display direction 1 means that a top edge and a bottom edge of the user interface 1 are parallel to the first edge, and the top edge of the user interface 1 is closer to the first edge than the bottom edge of the user interface 1. The display direction 2 means that the top edge and the bottom edge of the user interface 1 are parallel to the first edge, and the bottom edge of the user interface 1 is closer to the first edge than the top edge of the user interface 1. The display direction 3 means that two side edges (a left side edge and a right side edge) of the user interface 1 are parallel to the first edge, and compared with the left side edge of the user interface 1, the right side edge of the user interface 1 is closer to the first edge. The display direction 4 means that two side edges (a left side edge and a right side edge) of the user interface 1 are parallel to the first edge, and compared with the right side edge of the user interface 1, the left side edge of the user interface 1 is closer to the first edge.

In this embodiment of this disclosure, a physical posture of the electronic device 100 may include a first physical posture, a second physical posture, a third physical posture, and a fourth physical posture.

In some embodiments, when it is detected that the electronic device 100 is in a first physical posture, the display direction of the user interface 1 corresponding to the screen C is controlled to be the display direction 1; when it is detected that the electronic device 100 is in a second physical posture, the display direction of the user interface 1 corresponding to the screen C is controlled to be the display direction 2; when it is detected that the electronic device 100 is in a third physical posture, the display direction of the user interface 1 corresponding to the screen C is controlled to be the display direction 3; and when it is detected that the electronic device 100 is in a fourth physical gesture, the display direction of the user interface 1 corresponding to the screen C is controlled to be the display direction 4.

In some embodiments, refer to the horizontally folded electronic device 100 shown in FIG. 7A. A default display direction of the screen C of the electronic device 100 is the display direction 1. When the electronic device 100 is in the first physical gesture, the electronic device 100 displays the user interface 1 corresponding to the screen C in the default display direction of the screen C. When the electronic device 100 is in the second physical gesture, the electronic device 100 rotates the user interface corresponding to the screen C by 180° before displaying the user interface.

In some embodiments, refer to the horizontally folded electronic device 100 shown in FIG. 7A. A default display direction of the screen C of the electronic device 100 is the display direction 2. When the electronic device 100 is in the second physical gesture, the electronic device 100 displays the user interface of the screen C in the default display direction of the screen C. When the electronic device 100 is in the first physical gesture, the electronic device 100 rotates the user interface of the screen C by 180° before displaying the user interface.

In some embodiments, refer to the vertically folded electronic device 100 shown in FIG. 7B. A default display direction of the screen C of the electronic device 100 is the display direction 3. When the electronic device 100 is in the third physical gesture, the electronic device 100 displays the user interface 1 corresponding to the screen C in the default display direction of the screen C. When the electronic device 100 is in the first physical gesture, the electronic device 100 rotates the user interface corresponding to the screen C by 90° before displaying the user interface. When the electronic device 100 is in the fourth physical gesture, the electronic device 100 rotates the user interface corresponding to the screen C by 180° before displaying the user interface. When the electronic device 100 is in the second physical gesture, the electronic device 100 rotates the user interface corresponding to the screen C by 270° (or −90°) before displaying the user interface.

In this way, according to the foregoing embodiments, the display direction of the user interface corresponding to the screen C may be adaptively adjusted with the physical posture of the electronic device 100, to facilitate viewing by the user, thereby effectively improving user experience. Similarly, in this embodiment of this disclosure, display directions of user interfaces corresponding to the screen A, the screen B, and the inward screen may also be adaptively adjusted with the physical posture of the electronic device 100. It may be understood that default display directions corresponding to the screen A, the screen B, and the inward screen are usually as follows: A top edge of the user interface is parallel to the top edge of the electronic device 100, and the top edge of the user interface is closer to the top edge of the electronic device 100 relative to a bottom edge of the user interface.

The following describes how to determine which physical posture the screen C is in.

In this embodiment of this disclosure, the screen C, the screen A, and the gyroscope sensor A are disposed on a same side of the folding edge. The gyroscope sensor A may detect a physical posture of the screen A, or may be configured to detect the physical posture of the screen C. The screen A and the screen C may share a coordinate system of the electronic device 100, or may not share a coordinate system of the electronic device 100. The following uses an example in which the screen A and the screen C share a coordinate system of the electronic device 100 for description.

For example, FIG. 8A and FIG. 813 each show a three-axis coordinate system of the screen A (or the screen C) of the electronic device 100. As shown in FIG. 8A and FIG. 8B, when the screen A faces the user, an x1 axis of the three-axis coordinate system of the screen A is perpendicular to a left side edge of the screen A, and points from the left side edge of the screen A to a right side edge of the screen A; a y1 axis of the three-axis coordinate system of the screen A is perpendicular to the bottom edge of the screen A, and points from the bottom edge of the screen A to the top edge of the screen A; and a z1 axis of the three-axis coordinate system of the screen A is used to indicate the orientation of the screen A, and the z1 axis is perpendicular to the screen A.

In some embodiments, refer to the horizontally folded electronic device 100 shown in FIG. 8A. The gyroscope sensor A may detect a vector $\vec{y1}$ corresponding to the y1 axis. When an included angle β4 between a projection of the y1 axis on the local meridian (namely, the YOZ plane of the geographic coordinate system) and the Z axis of the geographic coordinate system is within a preset range 11, the electronic device 100 determines that the screen C is in the first physical posture. When the included angle 134 is within a preset range 12, the electronic device 100 determines that the screen C is in the third physical posture. When the included angle β4 is within a preset range 13, the electronic device 100 determines that the screen C is in the second physical posture. When the included angle β4 is within a preset range 14, the electronic device 100 determines that the screen C is in the fourth physical posture. For example, the preset range 11 is [−45°, 45°), the preset range 12 is [45°, 135°), the preset range 13 is [135°, 225°), and the preset range 14 is [−45°, −135°).

In some embodiments, refer to the vertically folded electronic device 100 shown in FIG. 8B. The gyroscope sensor A may detect a vector $\vec{y1}$ corresponding to the y1 axis. When an included angle β4 between a projection of the y1 axis on the local meridian (namely, the YOZ plane of the geographic coordinate system) and the Z axis of the geographic coordinate system is within a preset range 11, the electronic device 100 determines that the screen C is in the third physical posture. When the included angle β4 is within a preset range 12, the electronic device 100 determines that the screen C is in the second physical posture. When the included angle β4 is within a preset range 13, the electronic device 100 determines that the screen C is in the fourth physical posture. When the included angle β4 is within a preset range 14, the electronic device 100 determines that the screen C is in the first physical posture.

This disclosure is not limited to the foregoing implementations of determining the physical posture of the electronic device 100. In this embodiment of this disclosure, the physical posture that the screen C is in may alternatively be determined in another implementation. This is not specifically limited herein. For example, the electronic device 100 detects, by using the gyroscope sensor and the acceleration sensor, a pitch angle (namely, an angle at which the screen C rotates around the x1 axis), a roll angle (namely, an angle at which the screen C rotates around the y1 axis), and a yaw angle (namely, an angle at which the screen C rotates around the z1 axis) of the screen C, to further determine the physical posture of the screen C based on the pitch angle, the roll angle, and the yaw angle of the screen C.

Refer to the vertically folded electronic device 100 shown in FIG. 8B. Based on a use habit of the user, a default display direction of the electronic device 100 in this form is usually the display direction 3. Refer to the horizontally folded electronic device 100 shown in FIG. 8A. Based on a use habit of the user, a default display direction of the electronic device 100 in this form is usually the display direction 2. It should be noted that, in a display method provided in subsequent embodiments, the horizontally folded electronic device 100 in which the default display direction of the screen C is the display direction 2 is used as an example for description. A horizontally folded electronic device 100 or a vertically folded electronic device 100 with another default display direction is also applicable to the display method provided in embodiments of this disclosure.

Refer to FIG. 9A to FIG. 9F. The following describes several holder states related to the electronic device 100 in embodiments of this disclosure.

In some embodiments, when detecting that the included angle β2 between the screen B and the horizontal plane is within a preset range 15 (namely, [0, f1], for example, f1=10°), an included angle β5 between the vector $\vec{z2}$ corresponding to the screen B and the Z axis of the geographic coordinate system is less than 90 degrees, and the included angle α between the screen A and the screen B is within a preset range 16 (namely, [f2, f3]), the electronic device 100 determines that the electronic device 100 is in a first holder state, where 0°<f2<f3≤90°. For example, f2=20° and f3=90°. For example, FIG. 9A is a schematic diagram of the first holder state of the electronic device 100.

In some embodiments, when detecting that the included angle β2 between the screen B and the horizontal plane is within the preset range 15 (namely, [0, f1], for example, f1=10°), the included angle β5 between the vector $\vec{z2}$ corresponding to the screen B and the Z axis of the geographic coordinate system is less than 90 degrees, and the included angle α between the screen A and the screen B is within a preset range 17 (namely, [f4, f5]), the electronic device 100 determines that the electronic device 100 is in a second holder state, where 90°≤f4<f5<180°. For example, f4=90° and f5=160°. For example, FIG. 9C is a schematic diagram of the second holder state of the electronic device 100.

Figure 9A:
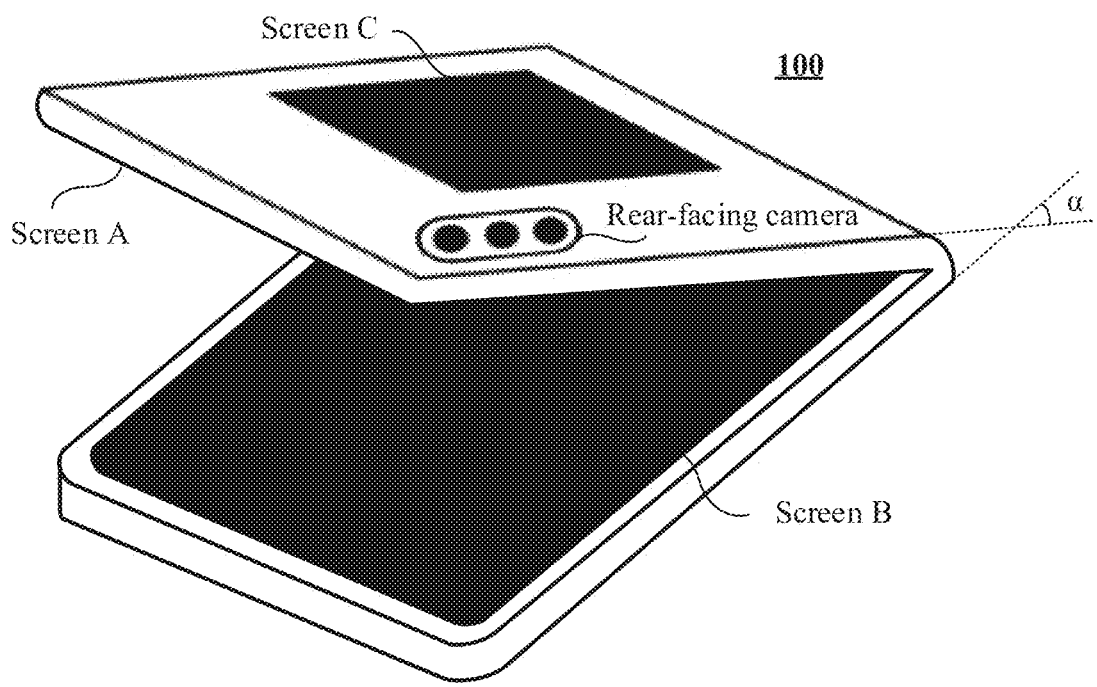
FIG. 9A to FIG. 9F are schematic diagrams of six holder states of an electronic device according to an embodiment of this disclosure.
Figure 9B:
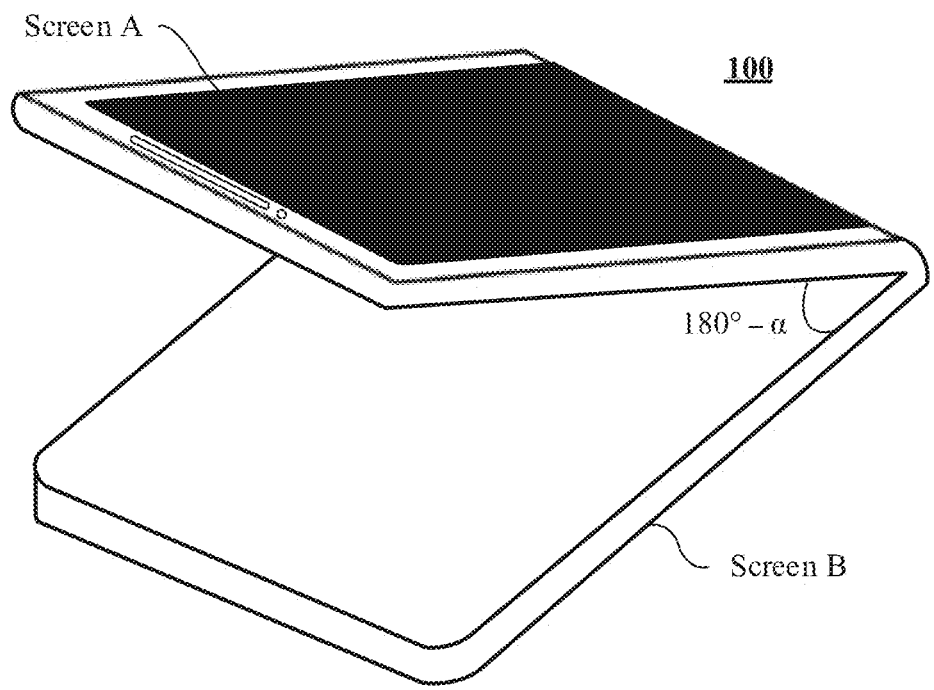
Figure 9C:
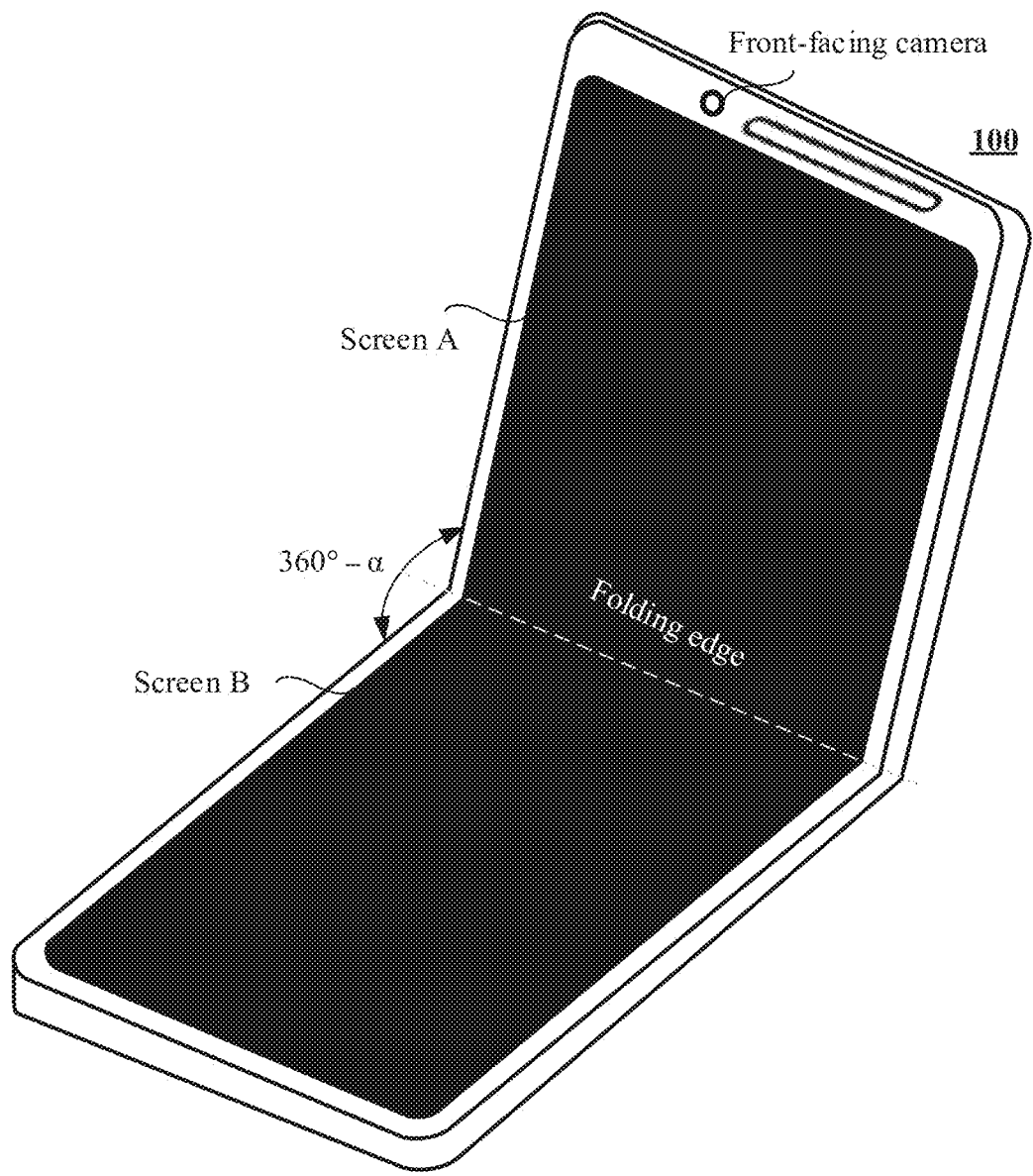

It may be understood that, as shown in FIG. 9A and FIG. 9C, in the first holder state and the second holder state, the screen B of the electronic device 100 is horizontally (or nearly horizontally) placed upward, and the electronic device 100 is in a forward semi-folded state.

In some embodiments, when detecting that the included angle β2 between the screen B and the horizontal plane is within the preset range 15, the included angle β5 between the vector $\vec{z2}$ corresponding to the screen B and the Z axis of the geographic coordinate system is greater than 90 degrees, and the included angle α between the screen A and the screen B is within a preset range 18 (namely, [f6, f7]), the electronic device 100 determines that the electronic device 100 is in a third holder state, where 180°<f6<f7≤270°. For example, f6=200° and f7=270°. For example, FIG. 9D is a schematic diagram of the third holder state of the electronic device 100.

In some embodiments, when detecting that the included angle β2 between the screen B and the horizontal plane is within the preset range 15, the included angle β5 between the vector $\vec{z2}$ corresponding to the screen B and the Z axis of the geographic coordinate system is greater than 90 degrees, and the included angle α between the screen A and the screen B is within a preset range 19 (namely, [f8, f9]), the electronic device 100 determines that the electronic device 100 is in a fourth holder state, where 270°≤f8<f9<360°. For example, f8=270° and f9=340°. For example, FIG. 9B is a schematic diagram of the fourth holder state of the electronic device 100.

Figure 9D:
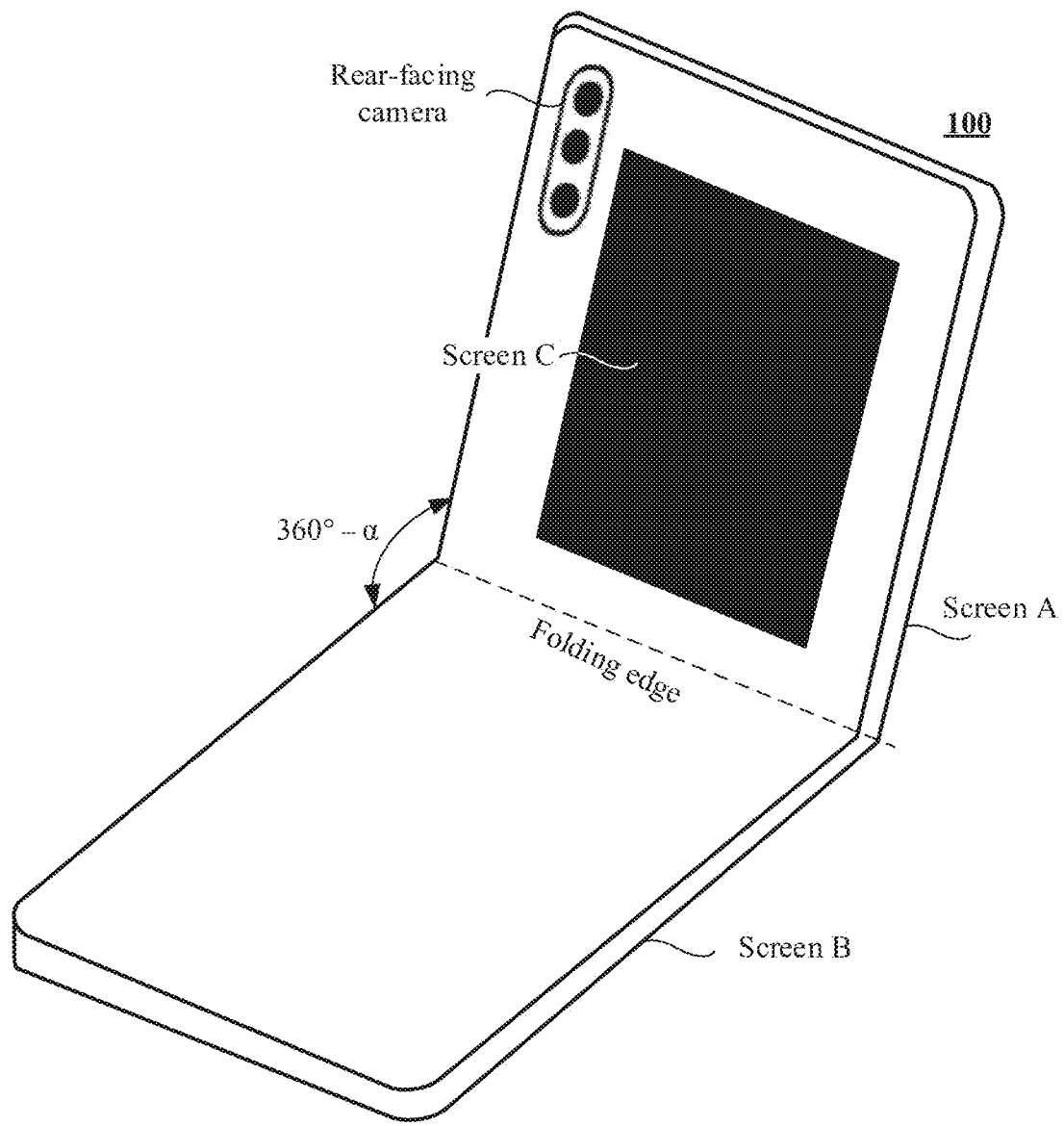

It may be understood that, as shown in FIG. 9D and FIG. 9B, in the third holder state and the fourth holder state, the screen B is placed horizontally (or nearly horizontally) downward, and the electronic device 100 is in a reverse semi-folded state.

It should be noted that, in the first holder state, the second holder state, the third holder state, and the fourth holder state, the screen C is in the first physical posture, and the display direction of the user interface corresponding to the screen C is the display direction 1.

Figure 9E:
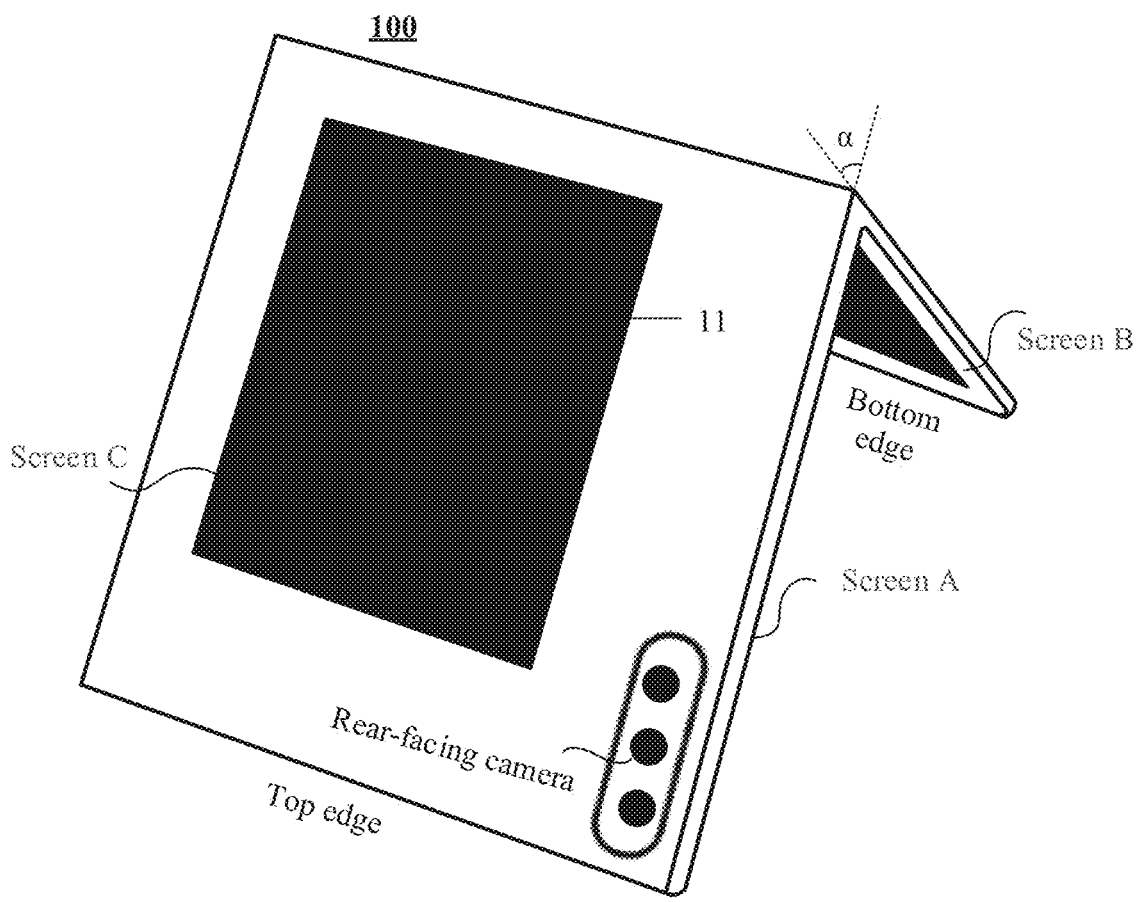

In some embodiments, when the electronic device 100 detects that a difference between the included angle β1 between the screen A and the horizontal plane and the included angle β2 is within a preset range 20 (namely, [0°, f10], for example, f10=5°), the included angle β5 between the vector $\vec{z2}$ corresponding to the screen B and the Z axis of the geographic coordinate system is greater than 90 degrees, and the included angle α between the screen A and the screen B is within a preset range 21 (namely, [f11, f12]), the electronic device 100 is in a fifth holder state, where 0°<f11<f12<180°. For example, f11=30° and f12=150°. For example, FIG. 9E is a schematic diagram of the fifth holder state of the electronic device 100. It may be understood that, in the fifth holder state, a plane formed by the top edge and the bottom edge of the electronic device 100 is the horizontal plane or a plane close to the horizontal plane, and the electronic device 100 is in the forward semi-folded state.

Figure 9F:
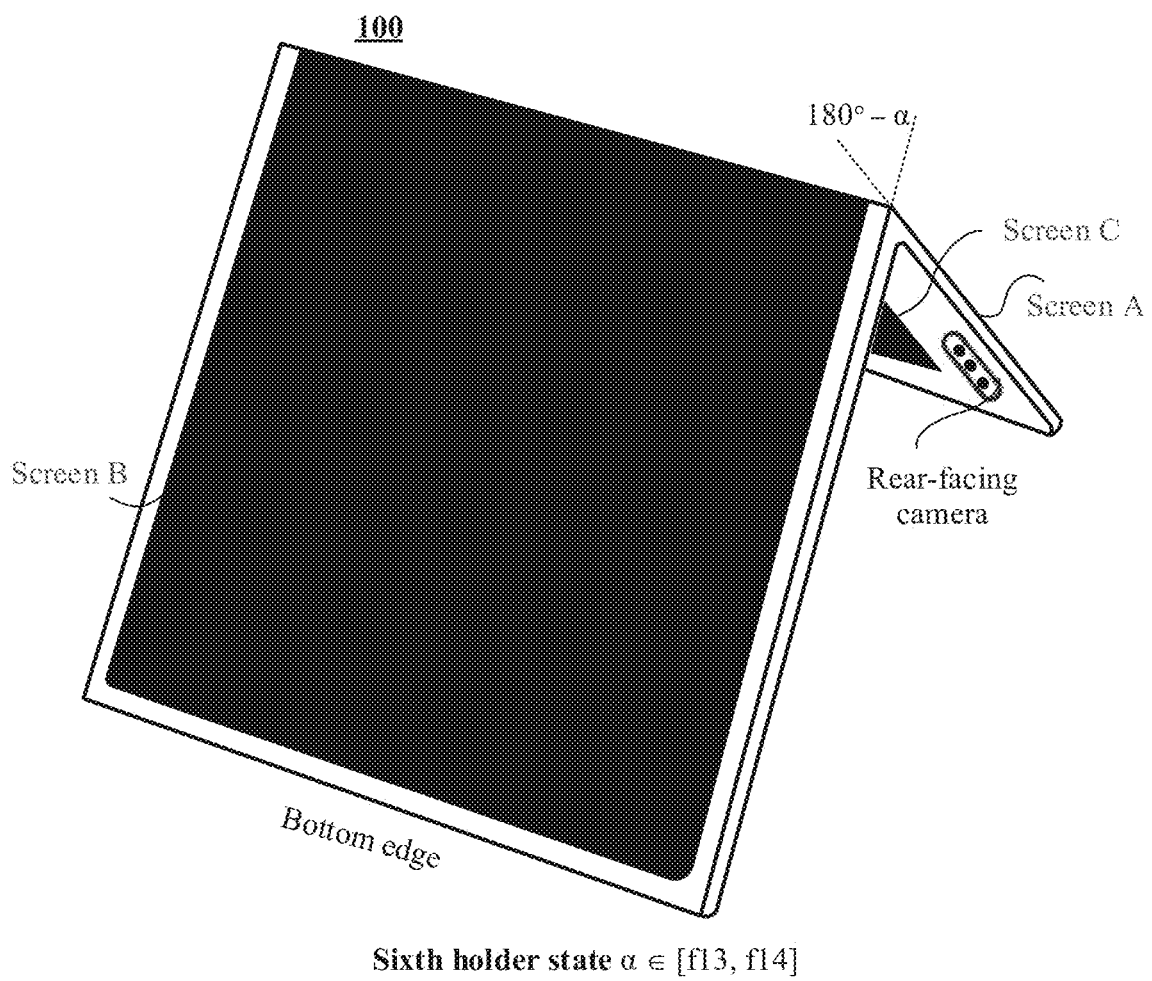

In some embodiments, when the electronic device 100 detects that a difference between the included angle β1 between the screen A and the horizontal plane and the included angle β2 is within a preset range 22, the included angle β5 between the vector $\vec{z2}$ corresponding to the screen B and the Z axis of the geographic coordinate system is less than 90 degrees, and the included angle α between the screen A and the screen B is within a preset range 22 (namely, [f13, f14]), the electronic device 100 is in a sixth holder state, where 180°<f13<f14<360°. For example, f13=210° and f14=330°. For example, FIG. 9F is a schematic diagram of the sixth holder state of the electronic device 100. It may be understood that, in the sixth holder state, a plane formed by the top edge and the bottom edge of the electronic device 100 is the horizontal plane or a plane close to the horizontal plane, and the electronic device 100 is in the reverse semi-folded state.

It should be noted that, in the fifth holder state and the sixth holder state, the screen C is in the second physical posture, and the display direction of the user interface corresponding to the screen C is the display direction 2.

In the foregoing six holder states, there is no need to install an additional holder apparatus (for example, a mobile phone holder) for the electronic device 100, and the user can view, with hands free, content displayed on the display more conveniently.

For example, placing the electronic device 100 in the first holder state may help the user view displayed content on the screen C with hands free. Placing the electronic device 100 in the second holder state may help the user view displayed content on the screen A and the screen B with hands free. Placing the electronic device 100 in the third holder state may help the user view the displayed content on the screen C with hands free. Placing the electronic device 100 in the fourth holder state may help the user view the displayed content on the screen A with hands free. Placing the electronic device 100 in the fifth holder state may help the user view the displayed content on the screen C with hands free. Placing the electronic device 100 in the sixth holder state may help the user view the displayed content on the screen A or the screen B with hands free.

In the display method provided in this embodiment of this disclosure, when the electronic device 100 detects that the electronic device 100 is in a preset posture and a preset condition is met, the electronic device 100 enables a camera 1 corresponding to a display 1 corresponding to the preset posture to capture an image, and displays the captured image on the display 1. It may be understood that the preset posture of the electronic device 100 may help the user view displayed content on the display 1 (namely, at least one of the screen A, the screen B, or the screen C) corresponding to the preset posture. For example, the display 1 includes the screen C (namely, the first screen), and the screen C corresponds to the rear-facing camera (namely, the first camera). For example, the display screen 1 includes the screen A (namely, the second screen), and the screen A corresponds to the front-facing camera namely, the second camera). In this embodiment of this disclosure, after the user places the electronic device 100 in the preset posture, the user may start, with hands free, the camera corresponding to the preset posture to take a selfie, and perform real-time preview by using the display corresponding to the preset posture, thereby avoiding complex user operations and effectively improving user experience.

Based on the descriptions of the hardware structure, the display direction, and the holder state of the electronic device 100 in the foregoing embodiments, the following describes in detail the display method provided in embodiments of this disclosure with reference to the accompanying drawings.

The following describes the display method provided in embodiments of this disclosure by using an example in which the display 1 is the screen C (namely, the first screen.

In some embodiments, when it is detected that the electronic device 100 is in a first preset posture and the electronic device 100 meets a first preset condition, the electronic device 100 displays a user interface 11 on the screen C. The first preset posture includes that the included angle α between the screen A and the screen B is within a first preset range. Optionally, the electronic device 100 also controls the screen A and/or the screen B to be turned off.

It should be noted that controlling the screen A (or the screen B) to be turned off means: if the screen A is in an off state, maintaining the off state; or if the screen A is in an on state, controlling the screen A to switch to the off state. Displaying the user interface 11 on the screen C means: If the screen C is in an off state, the screen C is turned on and the user interface 11 is displayed; or if a user interface 12 is displayed on the screen C, displayed content on the screen C is switched to the user interface 11. In an implementation, when controlling the outward screen (namely, the screen C) to be turned on, the electronic device 100 also controls the inward screen (namely, the screen A and the screen B) to be turned off, and when controlling the inward screen to be turned on, the electronic device 100 also controls the outward screen to be turned off. In this way, energy consumption can be effectively reduced.

In some embodiments, after controlling the screen C to display the user interface 11, the electronic device 100 automatically starts a gesture detection service of a rear-facing low-power-consumption camera corresponding to the screen C, and detects an air gesture operation of the user in real time by using the low-power-consumption camera. In response to the detected air gesture operation, the electronic device 100 may execute a response event corresponding to the air gesture operation. In this way, after the electronic device 100 controls the screen C to display the user interface 11, hands of the user can continue to be freed, to further implement contactless air interaction.

In some embodiments, if the screen C is currently in the off state, the user interface 11 may be a user interface recently displayed before the screen C is turned off. In some embodiments, the user interface 11 is an initial interface corresponding to the screen C. In some embodiments, the user interface 11 is a user interface recently displayed on the inward screen (namely, the display formed by the screen A and the screen B). In this way, continuous display from the inward screen to the outward screen can be implemented.

In some embodiments, before the electronic device 100 displays the user interface 11, the rear-facing camera (namely, the first camera) corresponding to the screen C is started to capture an image, and a preview display area of the user interface 11 is used to display the image captured by the rear-facing camera (namely, the first camera) in real time. It may be understood that the image captured by the rear-facing camera in real time is a preview image on the user interface 11. It should be noted that when the screen C corresponds to a plurality of rear-facing cameras, the user interface 11 includes images captured by the electronic device 100 by using one or more of the plurality of rear-facing cameras, optionally, an image captured by a camera with a highest pixel quantity in the plurality of rear-facing cameras, and optionally, an image captured by a macro camera in the plurality of rear-facing cameras.

It should be noted that, in this embodiment of this disclosure, the user interface 11 displayed on the screen C may be referred to as a first user interface, and the preview display area of the user interface 11 displayed on the screen C may be referred to as a first preview display area.

It should be noted that, in this embodiment of this disclosure, the rear-facing low-power-consumption camera and the first camera that correspond to the screen C may be a same camera, or may be different cameras. This is not specifically limited herein.

The following describes the first preset condition.

In some embodiments, the first preset condition includes that a pause time of the electronic device 100 at a current included angle value reaches a first preset time. For example, the first preset time is 3 s.

In some embodiments, when the screen C is in an on state, the first preset condition further includes that the electronic device 100 does not receive, within a second preset time, an input operation performed by the user on the screen C. For example, the second preset time is 2 s.

In some embodiments, the first preset condition further includes that the electronic device 100 detects a face (or a face of a preset user) by using the rear-facing camera corresponding to the screen C. Specifically, the electronic device 100 enables a face detection service of the low-power-consumption camera corresponding to the screen C, and detects, by using a facial recognition algorithm, whether the image captured by the low-power-consumption camera includes a face (or a face of the preset user). Optionally, after the electronic device 100 is powered on, the electronic device 100 enables the face detection service of the low-power-consumption camera corresponding to the screen C. Optionally, the electronic device 100 enables the face detection service of the low-power-consumption camera corresponding to the screen C only when the electronic device 100 is in the first preset posture. Optionally, the electronic device 100 enables the face detection service of the low-power-consumption camera corresponding to the screen C only when the electronic device 100 is in the first preset posture and meets another condition included in the first preset condition.

In some embodiments, the first preset condition further includes that the electronic device 100 detects a first preset gesture by using the rear-facing camera corresponding to the screen C. The first preset gesture is used to trigger the screen C to display the user interface 11 when the electronic device 100 is in the first preset posture. Specifically, the electronic device 100 enables the gesture detection service of the low-power-consumption camera corresponding to the screen C, and detects, by using a gesture recognition algorithm, whether the image captured by the low-power-consumption camera includes the preset gesture. Optionally, after the electronic device 100 is powered on, the electronic device 100 enables the gesture detection service of the low-power-consumption camera corresponding to the screen C. Optionally, the electronic device 100 enables the gesture detection service of the low-power-consumption camera corresponding to the screen C only when the electronic device 100 is in the first preset posture. Optionally, the electronic device 100 enables the gesture detection service of the low-power-consumption camera corresponding to the screen C only when the electronic device 100 is in the first preset posture and meets another condition included in the first preset condition.

In some embodiments, the first preset range includes at least one of the preset range 16 (namely, [f2, f3]), the preset range 18 (namely, [f6, f7]), and the preset range 21 (namely, [f11, f12]).

The following describes the first preset posture.

In some embodiments, the first preset posture specifically includes: the included angle α between the screen A and the screen B decreases to (and/or increases to) α1, where α1 is within the first preset range.

In some embodiments, in the first preset posture, the first preset range does not include 0° and 180°.

Figure 10A:
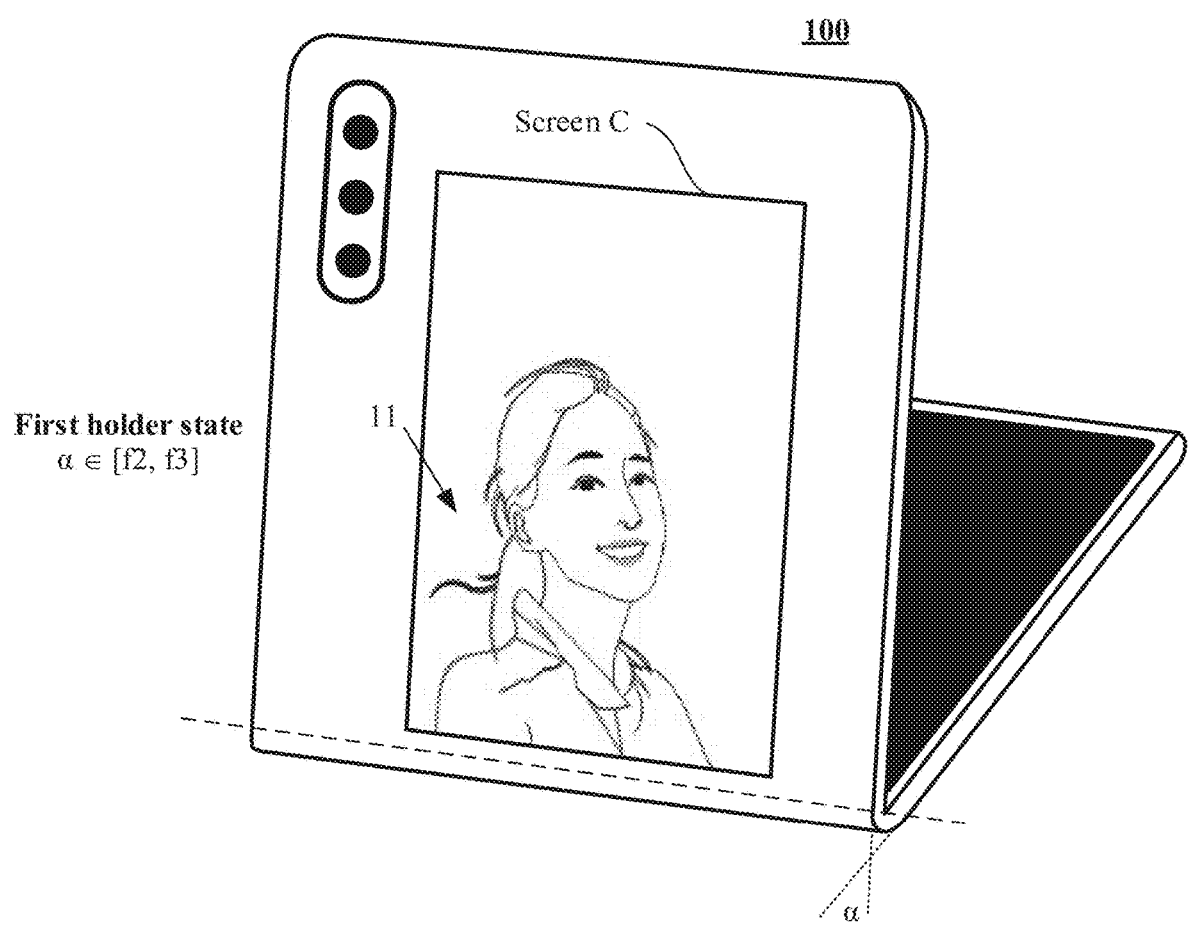
FIG. 10A to FIG. 10C are display interfaces of a screen C in a specific holder state according to an embodiment of this disclosure.

In some embodiments, the first preset posture further includes that the electronic device 100 is in the first holder state. In the first preset posture, the first preset range is [d1, d2], and [d1, d2] is within the preset range 16 (namely, [f2, f3]). In other words, f2≤d1≤d2≤f3. For example, as shown in FIG. 10A, the included angle α between the screen A and the screen B is within [d1, d2]. The electronic device 100 controls the inward screen to be turned off, and displays the user interface 11 rotated by 180° on the screen C. The user interface 11 includes the image captured by the rear-facing camera. Optionally, an angle in the first preset range is greater than 0° and less than 120°.

Figure 10B:
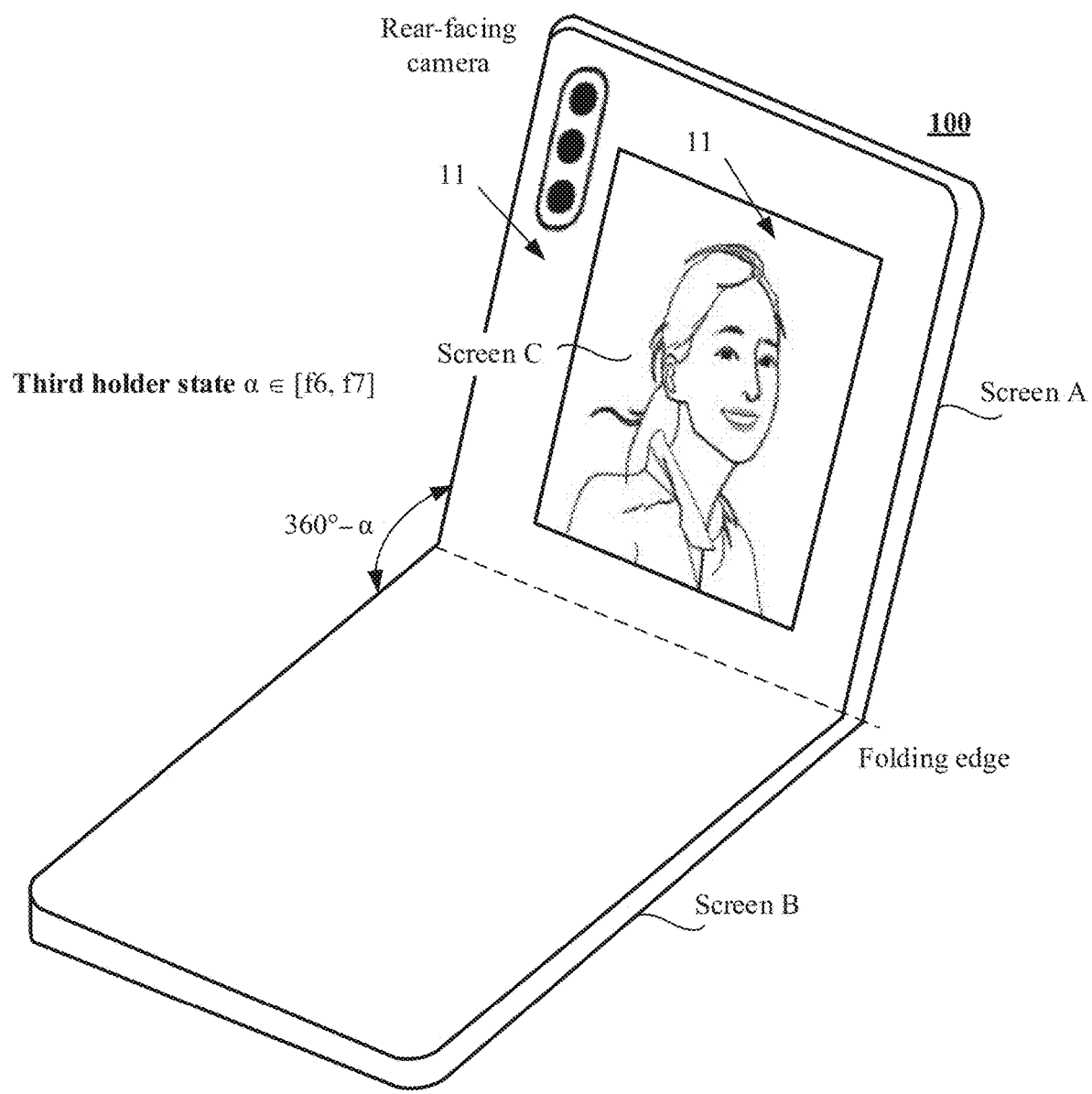

In some embodiments, the first preset posture further includes that the electronic device 100 is in the third holder state. In the first preset posture, the first preset range is [d3, d4], and [d3, d4] is within the preset range 18 (namely, [f6, f7]). In other words, f6≤d3≤d4≤f7. For example, as shown in FIG. 10B, the included angle α between the screen A and the screen B is within [d3, d4]. The electronic device 100 controls the inward screen to be turned off, and displays the user interface 11 rotated by 180° on the screen C. The user interface 11 includes the image captured by the rear-facing camera. Optionally, an angle in the first preset range is greater than 180° and less than 300°.

Figure 10C:
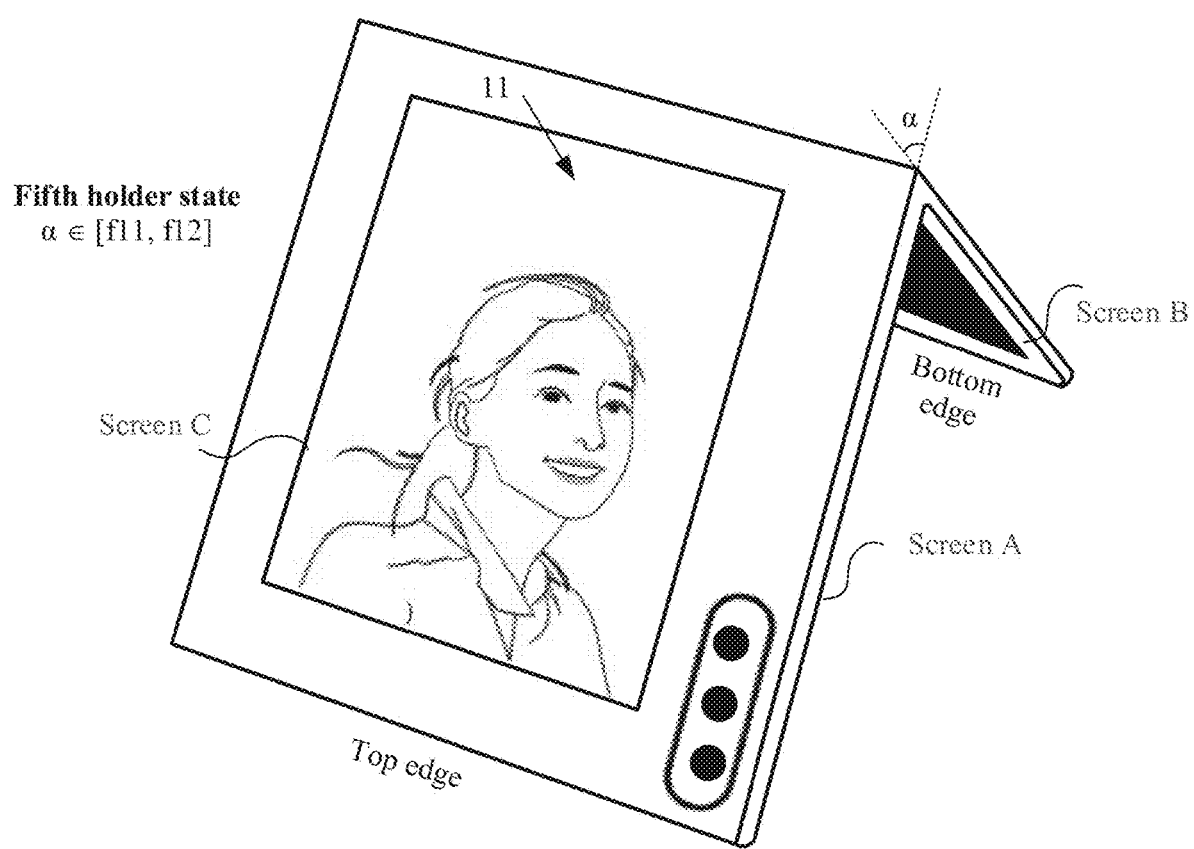

In some embodiments, the first preset posture further includes that the electronic device 100 is in the fifth holder state. In the first preset posture, the first preset range is [d5, d6], and [d5, d6] is within the preset range 21 (namely, [f11, f12]). In other words, f11≤d5≤d6≤f12. For example, as shown in FIG. 10C, the included angle α between the screen A and the screen B is within [d5, d6]. The electronic device 100 controls the inward screen to be turned off, and displays the user interface 11 on the screen C in the default display direction. The user interface 11 includes the image captured by the rear-facing camera. Optionally, an angle in the first preset range is greater than 0° and less than 180°.

It should be noted that, because the default display direction of the screen C is the display direction 2, and when the electronic device 100 is in the first holder state and the third holder state, the display direction corresponding to the screen C is the display direction 1, the electronic device 100 shown in FIG. 10A and FIG. 10B rotates the user interface 11 by 180° before displaying the user interface on the screen C.

The following describes several cases in which the user interface 11 is stopped displaying on the screen C after the user interface 11 is displayed on the screen C.

In some embodiments, as shown in FIG. 10A, after the screen C of the electronic device 100 that meets the first preset condition in the first holder state is controlled to display the user interface 11, when the electronic device 100 detects that the included angle α between the screen A and the screen B exceeds [d1, d2], or detects that the electronic device 100 is out of the first holder state, or detects that the electronic device 100 is folded to the unfolded form, the electronic device 100 stops displaying the user interface 11 on the screen C. For example, the user continues to fold the electronic device 100 in the first holder state, so that when the included angle α is less than 5°, the electronic device 100 stops displaying the user interface 11 on the screen C. For example, the user continues to unfold the electronic device 100 in the first holder state, so that when the included angle α is greater than 90°, the electronic device 100 stops displaying the user interface 11 on the screen C.

In some embodiments, as shown in FIG. 10B, after the screen C of the electronic device 100 that meets the first preset condition in the third holder state is controlled to display the user interface 11, when the electronic device 100 detects that the included angle α between the screen A and the screen B exceeds [d3, d4], or detects that the electronic device 100 is out of the third holder state, or detects that the electronic device 100 is folded to the unfolded form, the electronic device 100 stops displaying the user interface 11 on the screen C.

In some embodiments, as shown in FIG. 10C, after the screen C of the electronic device 100 that meets the first preset condition in the fifth holder state is controlled to display the user interface 11, when the electronic device 100 detects that the included angle α between the screen A and the screen B exceeds [d5, d6], or detects that the electronic device 100 is out of the fifth holder state, or detects that the electronic device 100 is folded to the unfolded form, the electronic device 100 stops displaying the user interface 11 on the screen C.

In some embodiments, the first preset condition includes that a face (or a face of the preset user) is detected by using the rear-facing low-power-consumption camera. After the screen C of the electronic device 100 that meets the first preset condition is controlled to display the user interface 11, when no face (or no face of the preset user) is detected by using the low-power-consumption camera within a third preset time, the electronic device 100 stops displaying the user interface 11 on the screen C, and disables the face detection service of the low-power-consumption camera.

In some embodiments, the electronic device 100 detects a preset gesture 1 of the user by using the low-power-consumption camera corresponding to the screen C, and in response to the preset gesture 1, the electronic device 100 stops displaying the user interface 11 on the screen C.

In some embodiments, that the electronic device 100 stops displaying the user interface 11 on the screen C specifically includes: The electronic device 100 controls the screen C to be turned off; or the electronic device 100 controls the screen C to display another preset interface, for example, the initial interface corresponding to the screen C, for example, a user interface recently displayed on the screen C before the user interface 11 is displayed.

For "the preview display area of the user interface 11 includes the image captured by the rear-facing camera in real time", the following specifically describes the user interface 11.

In some embodiments, after determining that the first preset condition is met, the electronic device 100 starts an application 1, invokes, by using the application 1, the rear-facing camera corresponding to the screen C to capture an image, and displays the captured image on the screen C by using the user interface 11 corresponding to the application 1.

Figure 11A:
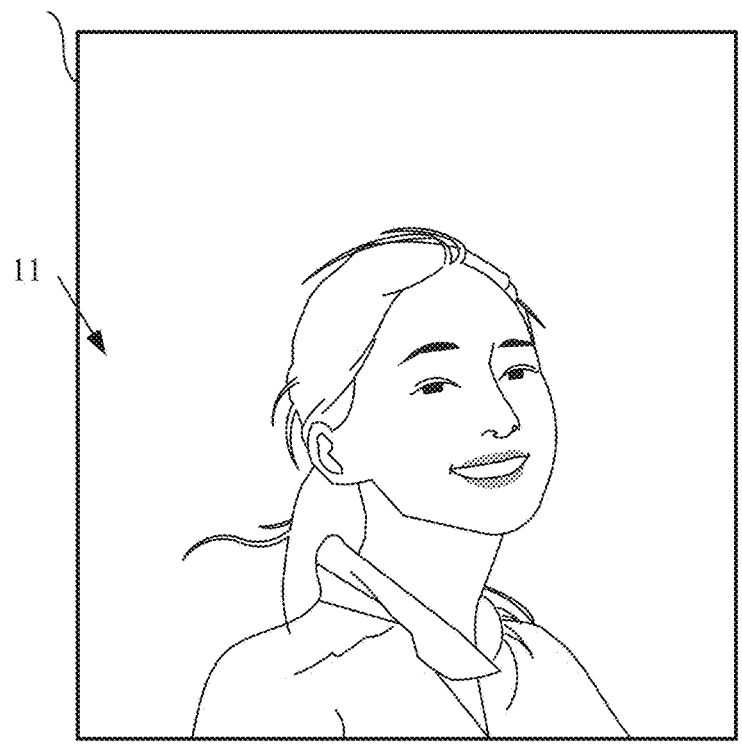
FIG. 11A to FIG. 11F are schematic diagrams of a group of user interfaces according to an embodiment of this disclosure.

For example, as shown in FIG. 11A, the preview display area of the user interface 11 is used to display the image captured by the rear-facing camera corresponding to the screen C. Optionally, the user interface 11 shown in FIG. 11A is a user interface of a mirror application.

It should be noted that the image captured by the rear-facing camera is displayed in full screen on the screen C shown in FIG. 11A, and the preview display area of the user interface 11 occupies the entire screen C. In this embodiment of this disclosure, the preview display area of the user interface 11 may alternatively occupy only a part of the screen C. This is not specifically limited herein.

Figure 11B:

In some embodiments, the rear-facing camera corresponding to the screen C includes an ultraviolet (Ultraviolet, UV) camera, the user interface 11 includes an image captured by the UV camera, and the UV camera performs shooting by using ultraviolet light as a light source. For example, refer to the user interface 11 shown in FIG. 11B. Because the sunscreen may block ultraviolet rays, the image captured by the UV camera may highlight an area to which the sunscreen is applied. In this way, by using the user interface 11 displayed on the screen C, the user can view application of the sunscreen in real time.

Figure 11C:
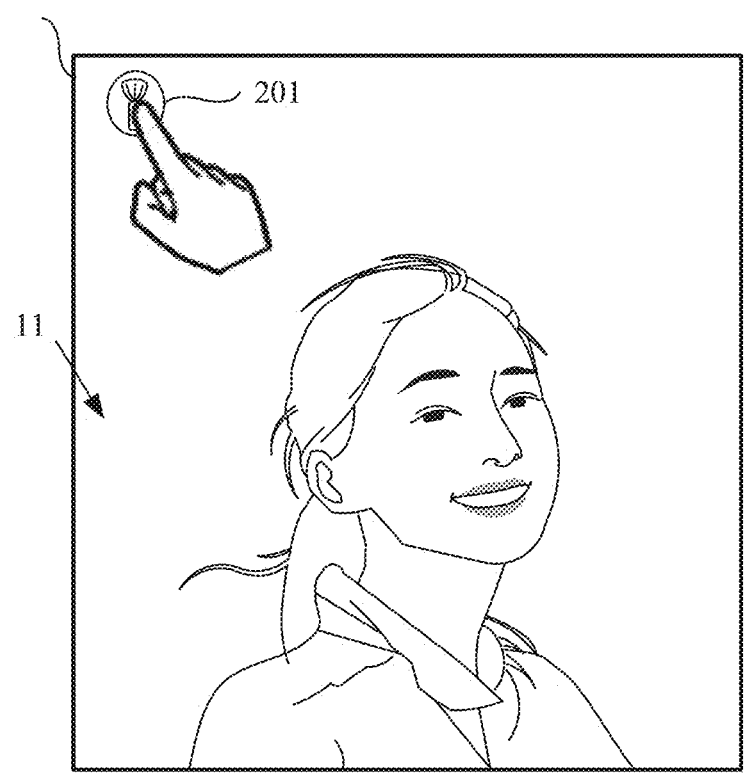
Figure 11D:
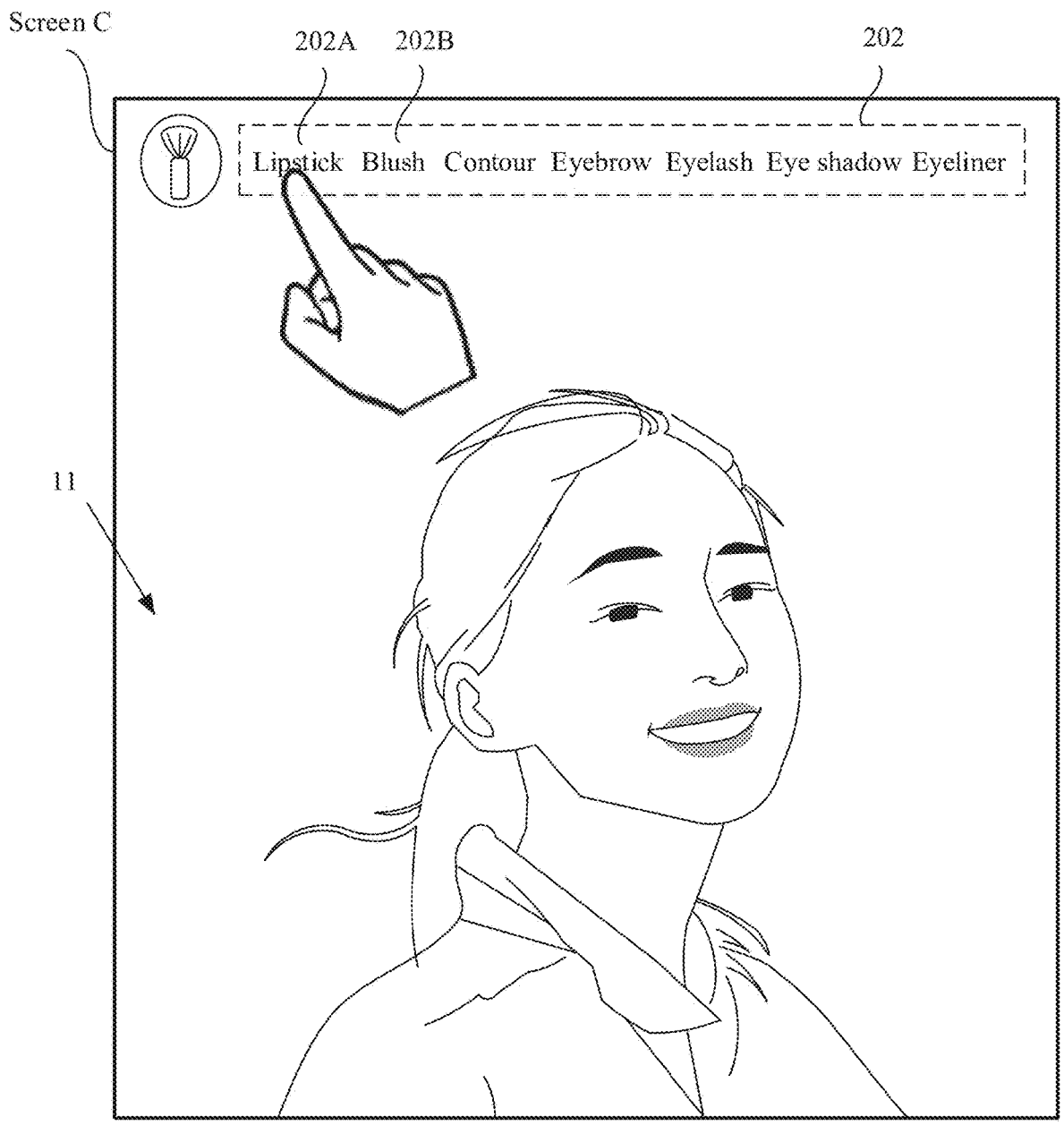

In some embodiments, as shown in FIG. 11C, the user interface 11 may further include a makeup control 201. For example, the makeup control 201 may receive an input operation (for example, a touch operation) of the user. In response to the input operation, the electronic device 100 displays at least one makeup option 202 shown in FIG. 11D, for example, a lipstick option 202A, a blush option 202B, a contour option, an eyebrow option, an eyelash option, an eye shadow option, and an eyeliner option.

In some embodiments, a makeup option 1 in the at least one makeup option 202 may receive an input operation (for example, a touch operation) of the user, and in response to the input operation, the electronic device 100 displays at least one makeup style corresponding to the makeup option 1. After the user selects a makeup style 1 in the at least one makeup style, the electronic device 100 may add a makeup effect corresponding to the makeup style to a face captured by the camera, and display the makeup effect on the user interface 11. In this way, by using the user interface 11 displayed on the screen C, the user can preview the makeup effect in real time by using the screen C. The application 1 corresponding to the user interface 11 may be a makeup application.

Figure 11E:
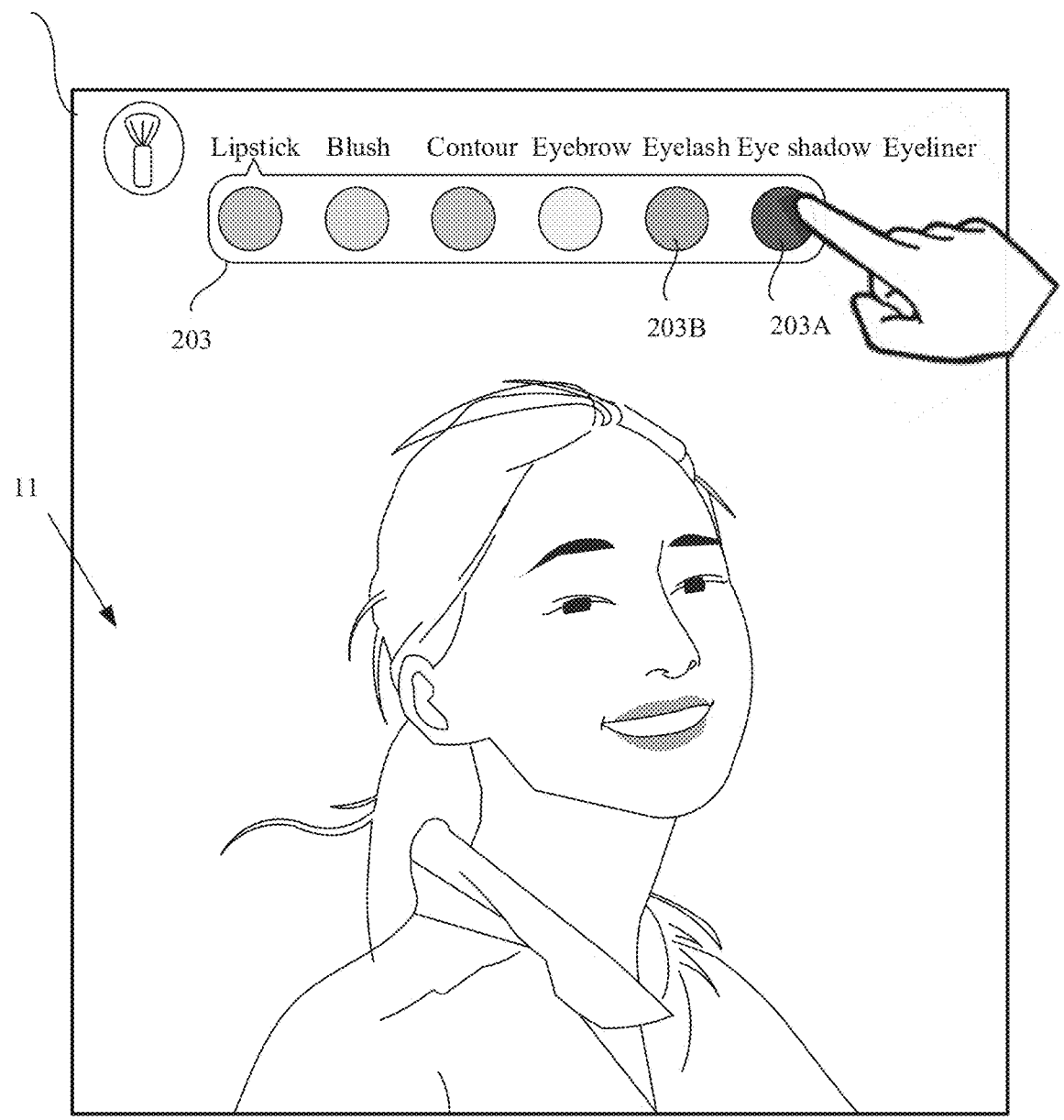
Figure 11F:
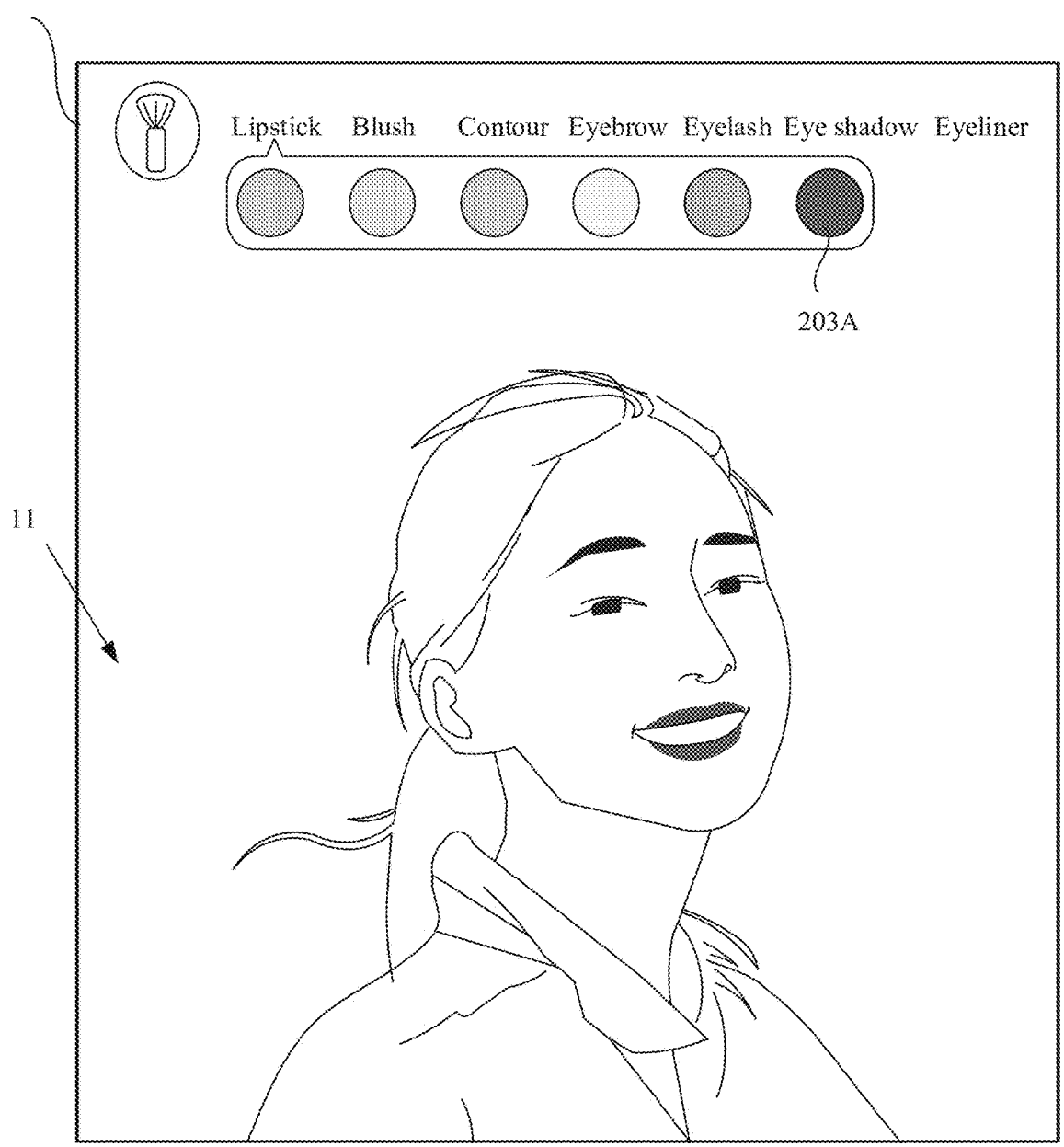

For example, the makeup option 1 is the lipstick option 202A, and a makeup style corresponding to the lipstick option 202A is a lipstick color. In response to the input operation performed on the lipstick option 202A, the electronic device 100 displays at least one lipstick color corresponding to the lipstick option 202A shown in FIG. 11E, for example, a color 203A and a color 203B. For example, the color 203A may receive an input operation (for example, a touch operation) of the user, and in response to the input operation, the electronic device 100 changes a lip color of the face that is captured by the camera in real time and that is displayed on the user interface 11 to the color 203A shown in FIG. 11F.

Similarly, refer to the lipstick option 202A. The user may alternatively select a corresponding makeup style by using another makeup option, to preview various makeup test effects in real time. For example, a makeup style corresponding to the blush option 2023 may indicate a blush color, a blush position, and or a blush shape.

In some embodiments, as shown in HG, 12A, the user interface 11 may further include a shooting control 204. The application 1 corresponding to the user interface 11 may be a camera application. Optionally, after the user selects a makeup style (for example, the color 203A), in response to an input operation performed on the shooting control 204, the electronic device 100 may store an image that is currently displayed on the screen C and to which a makeup effect is added.

Figure 12A:
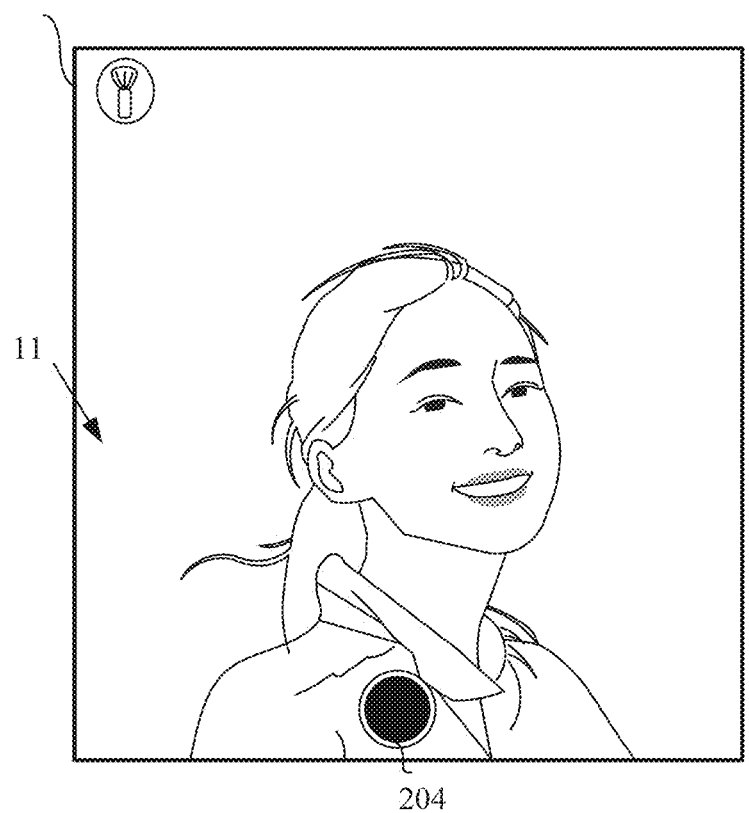
FIG. 12A to FIG. 12N are schematic diagrams of another group of user interfaces according to an embodiment of this disclosure.
Figure 12B:
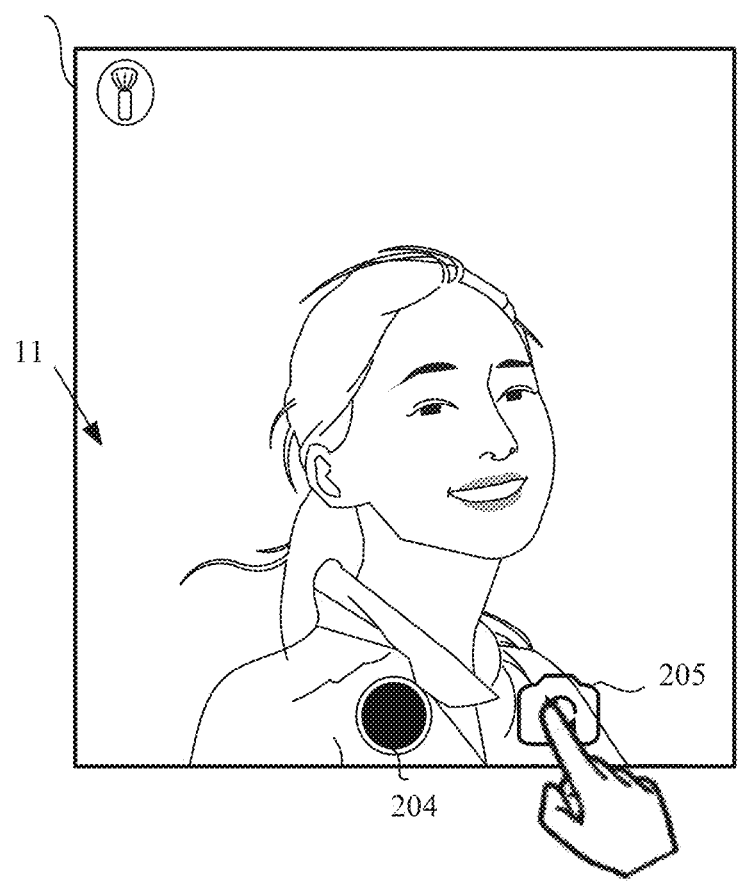
Figure 12C:
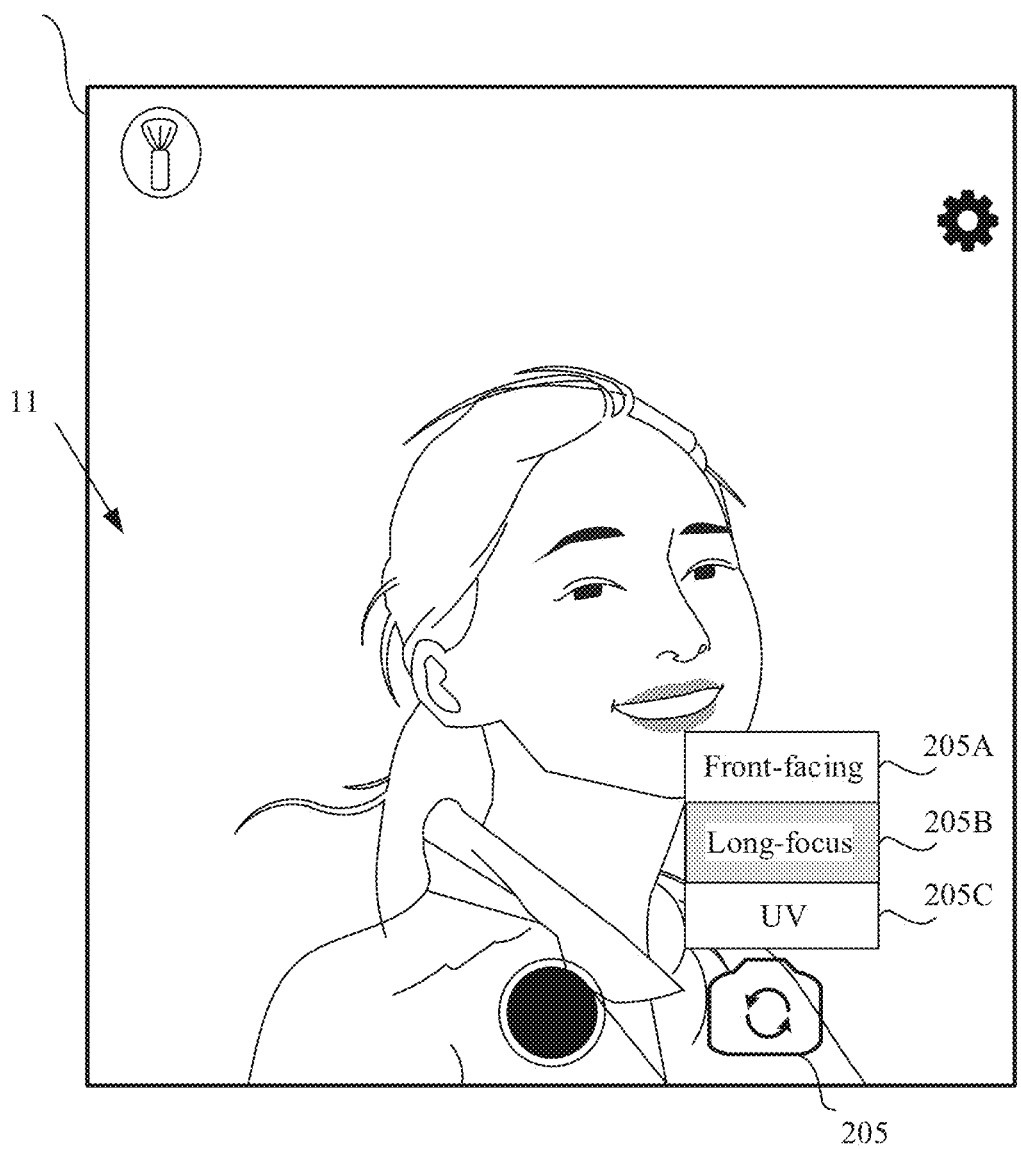
Figure 12D:
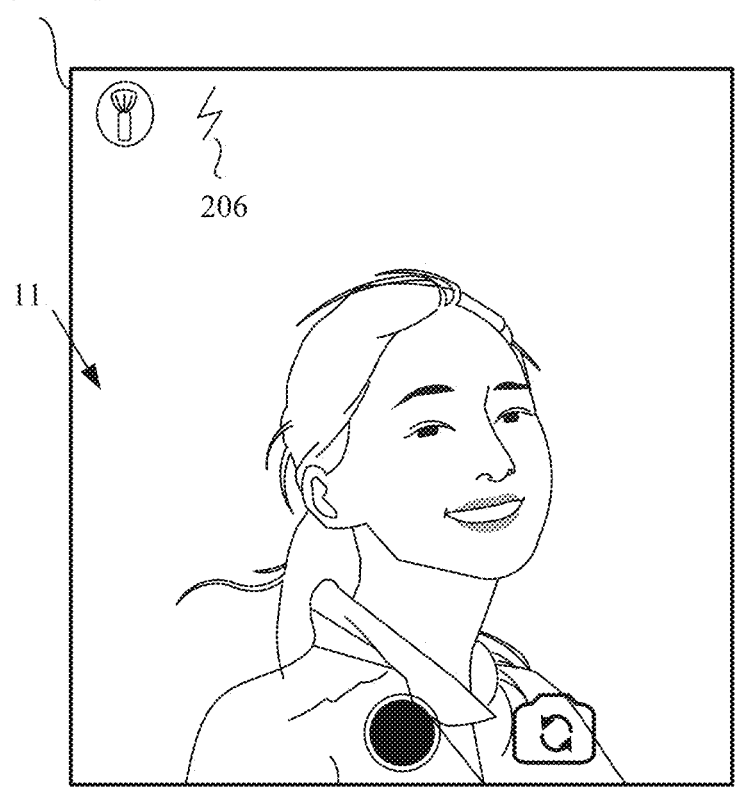

In some embodiments, as shown in FIG. 12B, the user interface 11 may include a camera switching control 205, and the camera switching control 205 may switch the camera configured to capture the image displayed on the screen C to another camera. It may be understood that the electronic device 100 may include a plurality of cameras. For example, the camera switching control 205 may receive an input operation of the user. In response to the operation, the electronic device 100 directly switches the current camera to another preset camera, or displays at least one camera option shown in FIG. 12C, for example, a front-facing camera 205A, a rear-facing long-focus camera 205B, and a rear-facing ITV camera 205C. The user may select a target camera from the at least one camera option.

In some embodiments, if the user chooses to switch, to the front-facing camera, the rear-facing camera that corresponds to the screen C and that is configured to capture an image, the electronic device 100 further displays prompt information in response to an input operation of the user. The prompt information is used to prompt the user to fold the electronic device 100, so that the electronic device 100 can capture an image by using the front-facing camera. For example, the user is prompted to fold the electronic device 100 into the unfold form (or the second holder state, the fourth holder state, or the sixth holder state).

Figure 12E:
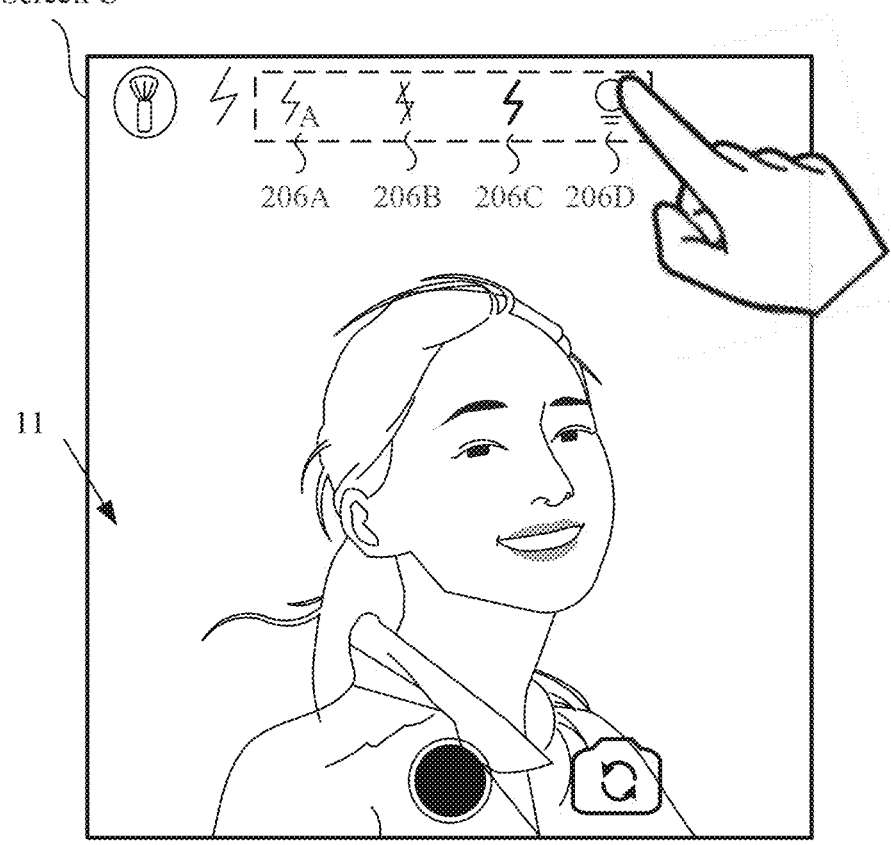

In some embodiments, as shown in HG, 12D, the user interface 11 may further include a light compensation control 206. Optionally, in response to an input operation (for example, a touch operation) performed on the light compensation control 206, the electronic device 100 may display at least one light compensation option shown in FIG. 12E, for example, a flash automatic light compensation control 206A, a flash off control 206B, a flash on control 206C, and a display light compensation control 206D. After the user selects the flash automatic light compensation control 206A, the electronic device 100 may determine, based on ambient light luminance, whether to turn on a flash.

Figure 12F:
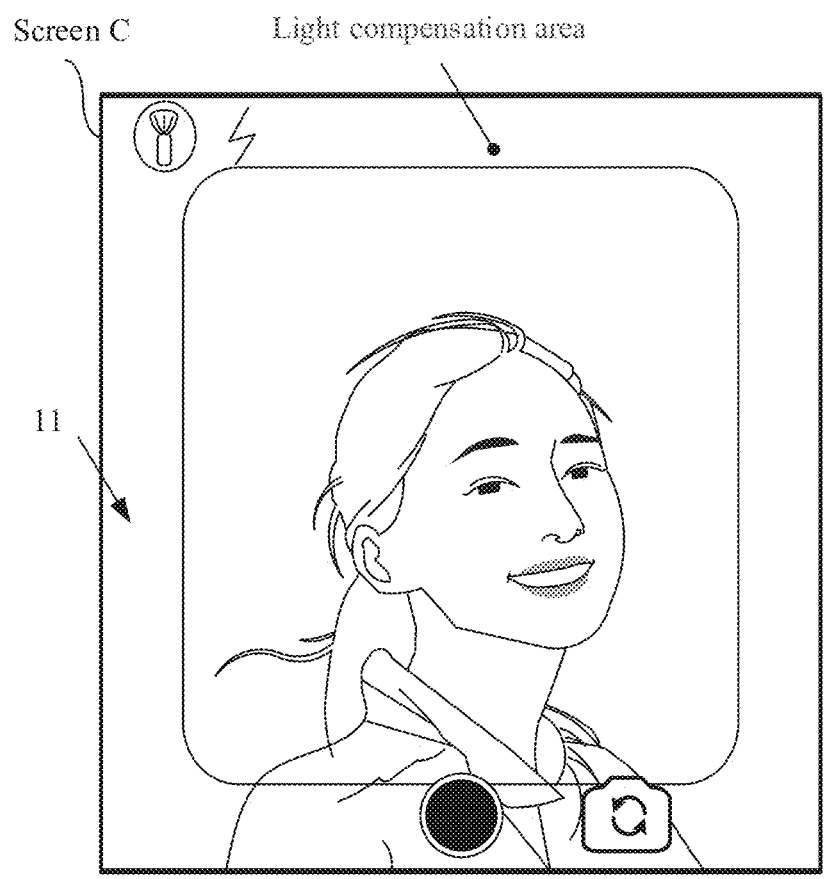

For example, as shown in FIG. 12F, in response to an input operation (for example, a touch operation) performed on the display light compensation control 206D, the electronic device 100 lights brightness of a preset light compensation area on the screen C. In this embodiment of this disclosure, a position, a shape, and the brightness of the preset light compensation area may be set by the user, or may be set in the electronic device 100 by default. This is not specifically limited herein.

Figure 12G:
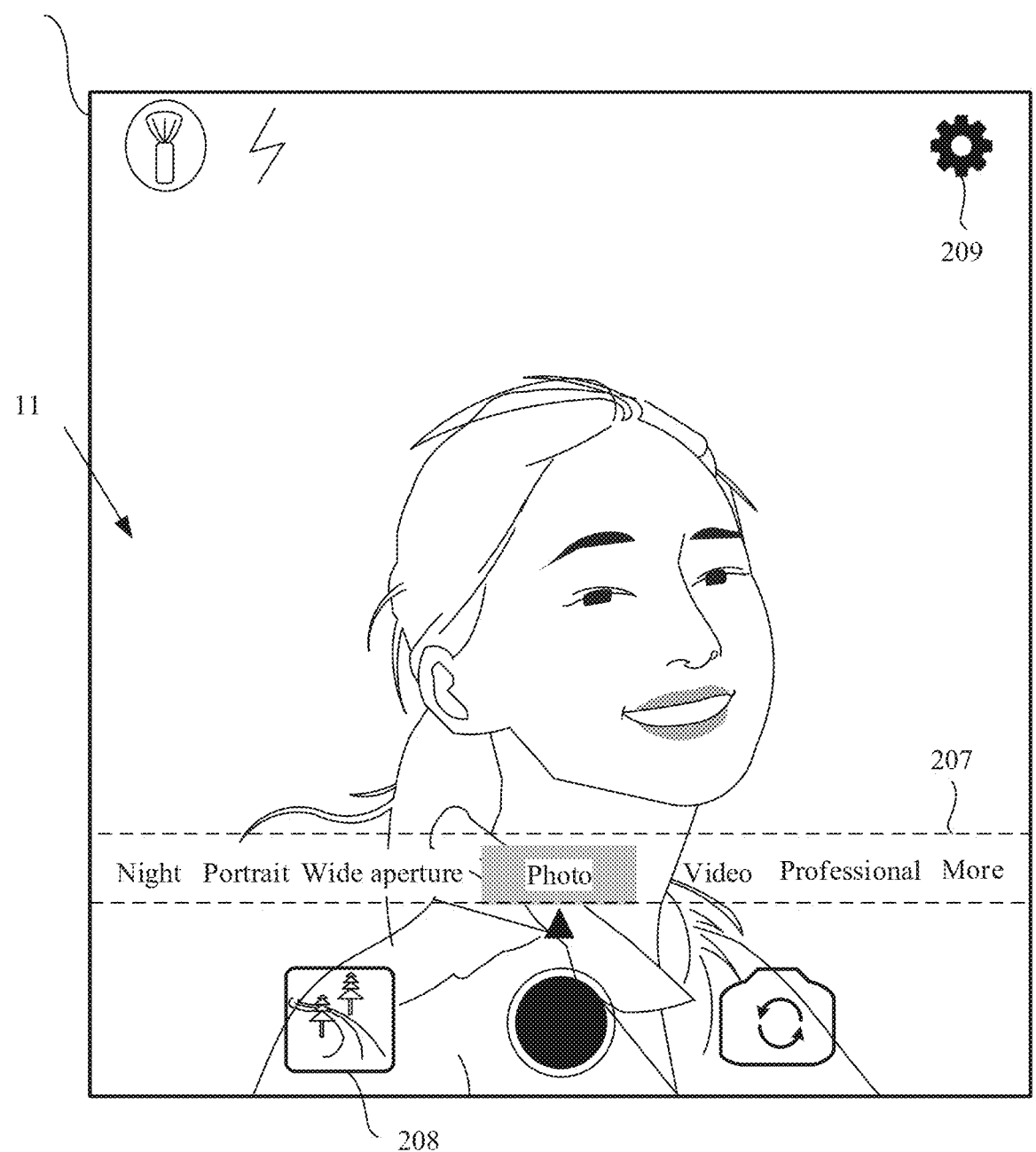

In some embodiments, as shown in FIG. 12G, the user interface 11 may further include at least one shooting mode 207 corresponding to the shooting control, for example, a night mode, a portrait mode, a wide aperture mode, a photo mode, a video mode, or a professional mode. After the user selects a shooting mode, the electronic device 100 controls the camera to capture an image in the shooting mode, and displays the image on the user interface 11 corresponding to the screen C. The user interface 11 may further include an album control 208. The album control 208 may receive an input operation of the user, and in response to the input operation, the electronic device 100 may display a user interface of the album application.

Figure 12H:
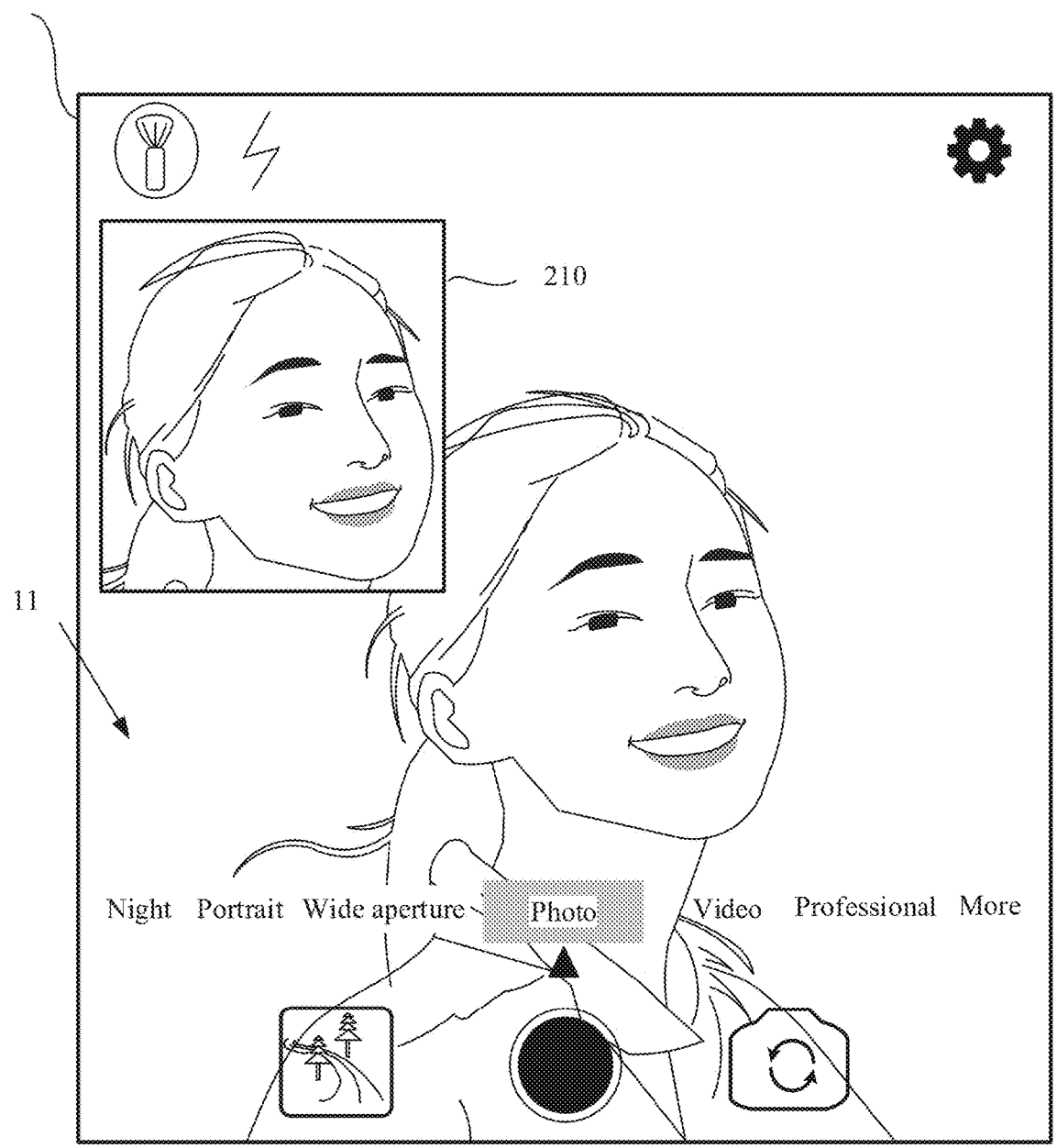
Figure 12I:
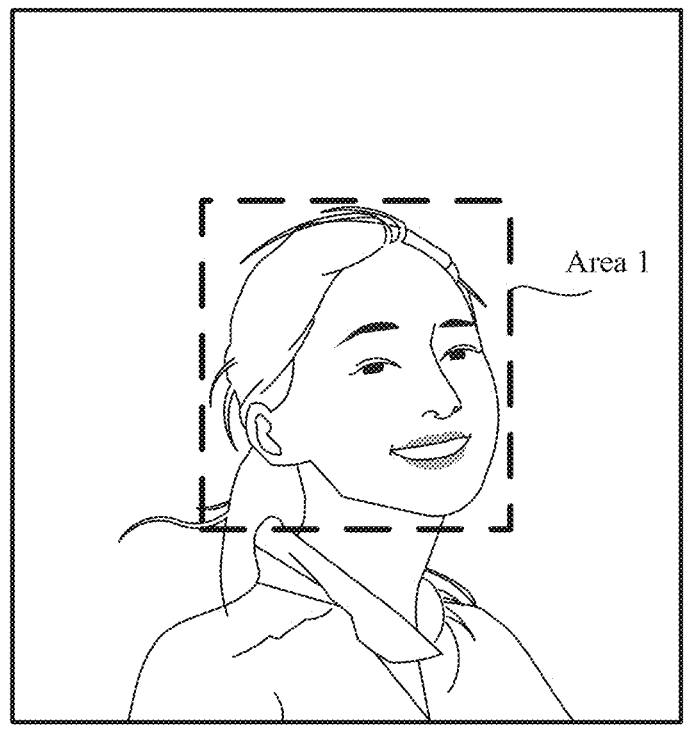

In some embodiments, as shown in FIG. 12H, the user interface 11 may further include a local feature display box 210. For example, as shown in FIG. 12I, the electronic device 100 recognizes an area 1 (namely, a first area) of a preset local feature (for example, a face) in an image 1 captured by the camera, and displays an image in the area 1 in the display box 210. It may be understood that in this implementation, the electronic device 100 may continuously track a preset local feature (for example, a face) in a shooting range of the camera, and display the local feature in the display box 210 in real time. Optionally, the electronic device 100 enlarges the image of the preset local feature in the area 1 and then displays the image in the display box 210, so that the user previews details of the preset local feature.

It should be noted that in this embodiment of this disclosure, the area 1 may also be referred to as the first area.

Figure 12J:

In some embodiments, the display box 210 shown in FIG. 12H may receive an input operation of the user. As shown in FIG. 12J, in response to the input operation, the electronic device 100 may enlarge the image of the preset local feature in the area 1, and then display the image on the screen C in full screen. Then, the screen C shown in FIG. 12J may also receive an input operation of the user (for example, double-tapping the screen C). In response to the input operation, the electronic device 100 may scale down the image of the preset local feature to the display box 210, that is, display the user interface 11 shown in FIG. 12H again.

In some embodiments, when it is detected that the electronic device 100 is in the first preset posture and the electronic device 100 meets the first preset condition, the electronic device 100 displays, on the user interface 11 corresponding to the screen C, a partially enlarged image of the image captured by the camera. Optionally, as shown in FIG. 12I, the electronic device 100 recognizes the area 1 of the preset local feature (for example, a face) of the image 1 captured by the camera, and the partially enlarged image is an enlarged image of the preset local feature in the area 1 shown in FIG. 12J. Optionally, the partially enlarged image is an enlarged image of a central area of the image 1 captured by the camera. It should be noted that the user interface 11 shown in 12J may also include another interface element (for example, the makeup control 201) of the user interface 11 shown in FIG. 12G.

In some embodiments, as shown in FIG. 12A or FIG. 12J, when it is detected that the electronic device 100 is in the first preset posture, and the electronic device 100 meets the first preset condition, the user interface 11 displayed by the electronic device 100 on the screen C includes only the image captured by the camera corresponding to the screen C (or the partially enlarged image of the image). Then, the electronic device 100 can display another interface element of the user interface 11 only when the electronic device 100 responds to a received first input operation of the user, for example, one or more of the makeup control 201, the shooting control 204, the camera switching control 205, the light compensation control 206, the shooting mode 207, the album control 208, the setting control 209, and the display box 210. The first input operation may be a touch operation performed on the screen C (for example, a finger of the user touches the display of the electronic device 100), or may be a preset air gesture. This is not specifically limited herein.

Figure 12K:
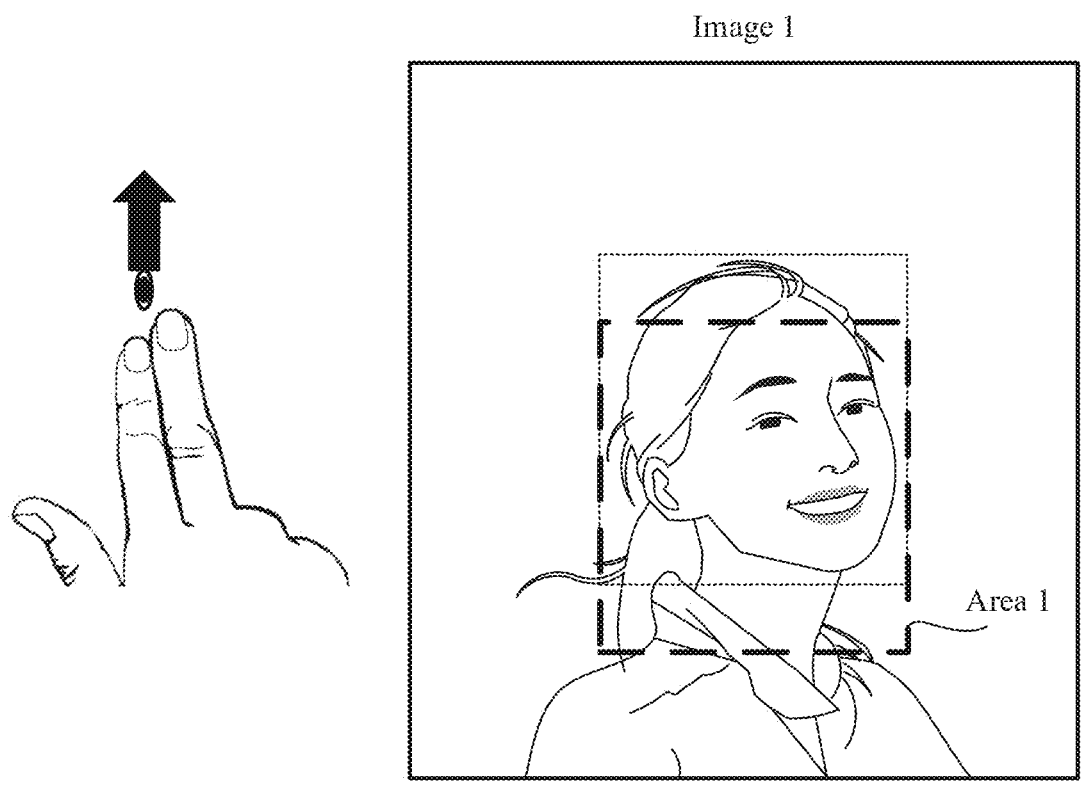
Figure 12L:
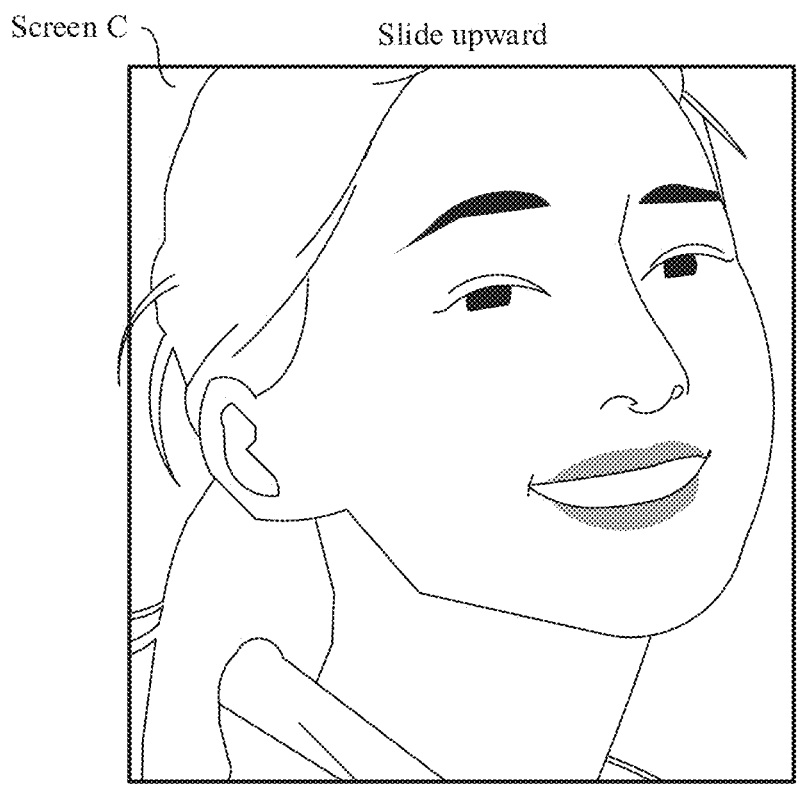

In some embodiments, the image displayed on the user interface 11 is the partially enlarged image of the image captured by the camera. The user may drag the image displayed on the user interface 11 to view another area of the original image captured by the camera. For example, the electronic device 100 shown in FIG. 12J displays, on the user interface 11 in real time, the image in the area 1 of the image captured by the camera. The image shown in FIG. 12J may receive a sliding operation (for example, an upward sliding operation) of the user. As shown in FIG. 12K, in response to the sliding operation, the electronic device 100 moves a position of the area 1 in an opposite direction of a sliding direction of the sliding operation. As shown in FIG. 12L, the electronic device 100 displays, on the user interface 11, an enlarged image of an image in a moved area 1.

It should be noted that, visually, in response to the sliding operation of the user, the image displayed on the user interface 11 moves along the sliding direction of the user. The sliding operation may be a touch operation or an air gesture. This is not specifically limited herein.

Figure 12M:
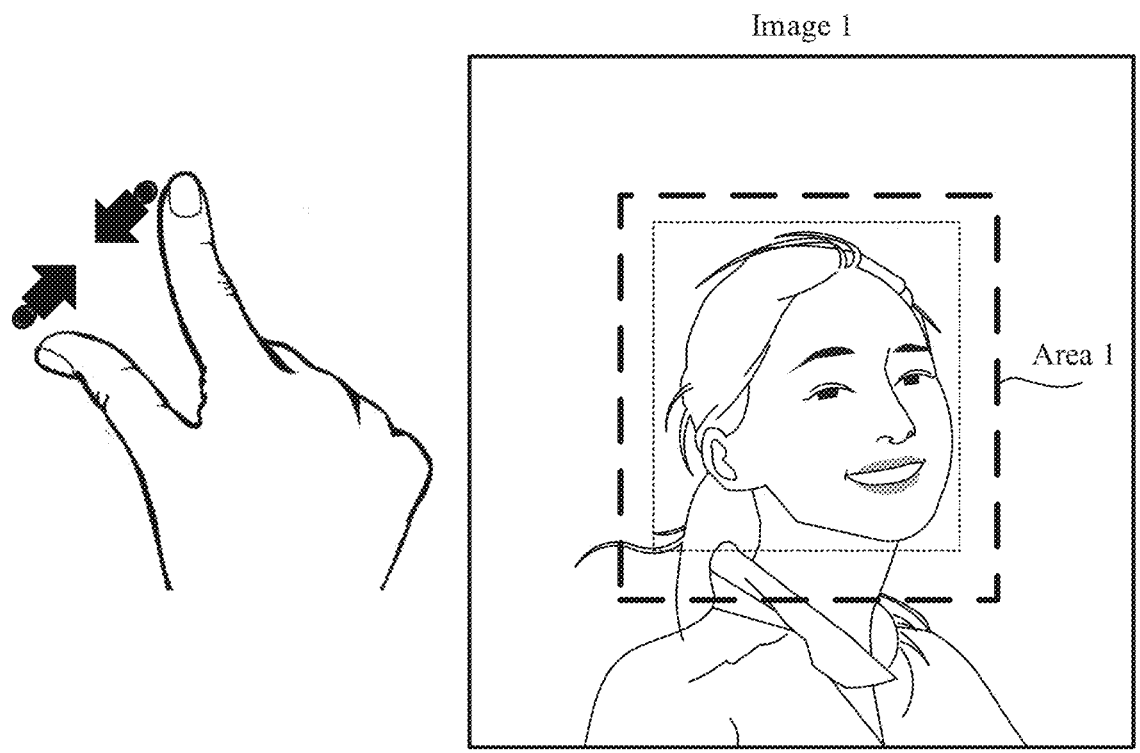
Figure 12N:
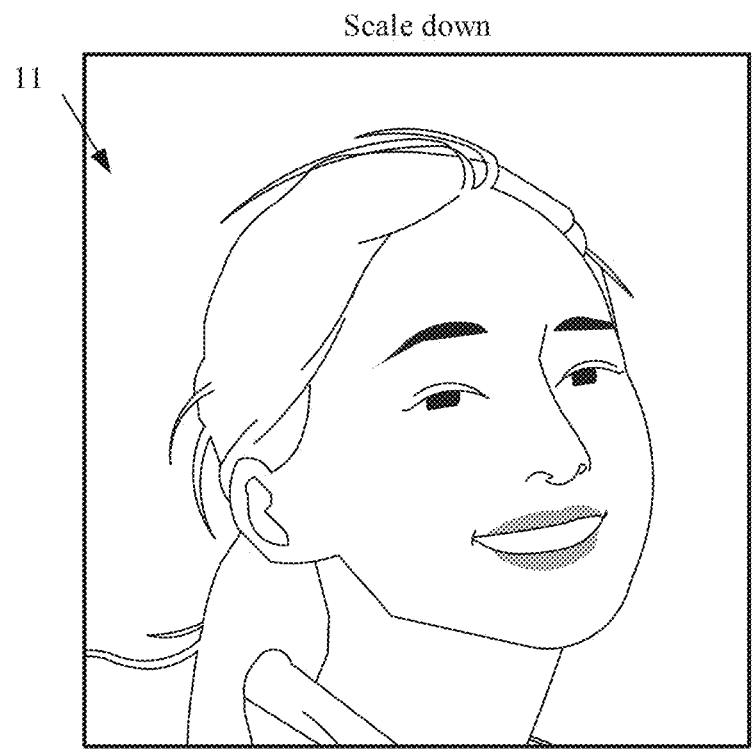

In some embodiments, the user may scale up and scale down the image displayed on the user interface 11. For example, the electronic device 100 shown in FIG. 12J displays, on the user interface 11 in real time, the image in the area 1 of the image captured by the camera. The image shown in FIG. 12J may receive a scaling operation (for example, a scaling-down operation) of the user. As shown in FIG. 12M, in response to the scaling operation, the electronic device 100 scales a size of the area t. As shown in FIG. 12N, the electronic device 100 displays, on the user interface 11, an enlarged image of an image in a scaled area 1.

It should be noted that the electronic device 100 may scale up the size of the area 1 based on a scaling-down operation of the user. Visually, in response to the scaling-down operation of the user, the image displayed on the user interface 11 is scaled down. The electronic device 100 may scale down the size of the area 1 based on a scaling-up operation of the user. Visually, in response to the scaling-up operation of the user, the image displayed on the user interface 11 is scaled up. The scaling operation may be a touch operation or an air gesture. This is not specifically limited herein.

In some embodiments, as shown in FIG. 12J, when it is detected that the electronic device 100 is in the first preset posture and the electronic device 100 meets the first preset condition, the electronic device 100 displays, on the user interface 11 corresponding to the screen C, the image captured by the macro camera.

The following describes the display method provided in embodiments of this disclosure by using an example in which the display 1 is the screen A (namely, the second screen).

In some embodiments, when it is detected that the electronic device 100 is in a second preset posture and the electronic device 100 meets a first second condition, the electronic device 100 displays a user interface 11 on the screen A. The second preset posture includes that the included angle α between the screen A and the screen B is within a second preset range. Optionally, the electronic device 100 further controls the screen C and/or the screen B to be turned off.

In some embodiments, as shown in FIG. 13A to FIG. 13F, after controlling the screen A to display the user interface 11, the electronic device 100 may detect an air gesture operation of the user in real time by using a gesture detection service of a front-facing low-power-consumption camera corresponding to the screen A. In response to the detected air gesture operation, the electronic device 100 may execute a response event corresponding to the air gesture operation. In this way, after the electronic device 100 controls the screen A to display the user interface 11, hands of the user can continue to be freed, to further implement contactless air interaction.

In some embodiments, if the screen A is currently in an off state, the user interface 11 may be a user interface recently displayed before the screen A (or the inward screen) is turned off. Specifically, if split-screen display is separately performed on the screen A and the screen B before the screen A is turned off, the user interface 11 is the user interface recently displayed before the screen A is turned off. Alternatively, if full-screen display is performed on the inward screen formed by the screen A and the screen B before the screen A is turned off, the user interface 11 is a user interface recently displayed in fill screen before the inward screen is turned off.

In some embodiments, the user interface 11 is a home screen corresponding to the inward screen.

In some embodiments, before the electronic device 100 displays the user interface 11, the front-facing camera (namely, the second camera) corresponding to the screen A is started to capture an image, and a preview display area of the user interface 11 is used to display the image captured by the front-facing camera (namely, the second camera) in real time. It should be noted that when the screen A corresponds to a plurality of front-facing cameras, the user interface 11 includes images captured by the electronic device 100 by using one or more of the plurality of front-facing cameras.

It should be noted that, in this embodiment of this disclosure, the user interface 11 displayed on the screen A may be referred to as a second user interface, and the preview display area of the user interface 11 displayed on the screen A may be referred to as a second preview display area.

It should be noted that, in this embodiment of this disclosure, the low-power-consumption camera and the second camera that correspond to the screen A may be a same camera, or may be different cameras. This is not specifically limited herein.

The following describes the second preset posture.

In some embodiments, the second preset condition includes that a pause time of the electronic device 100 at a current included angle value reaches a first preset time. For example, the first preset time is 3 s.

In some embodiments, when the screen A is in an on state, the second preset condition further includes that the electronic device 100 does not receive, within a second preset time, an input operation performed by the user on the screen A. For example, the second preset time is 2 s.

In some embodiments, the second preset condition further includes that the electronic device 100 detects a face (or a face of a preset user) by using the front-facing low-power-consumption camera corresponding to the screen A.

In some embodiments, the second preset condition further includes that the electronic device 100 detects a second preset gesture by using the front-facing low-power-consumption camera corresponding to the screen A. The second preset gesture is used to trigger the screen A to display the user interface 11 when the electronic device 100 is in the second preset posture.

In some embodiments, the second preset range includes at least one of a preset range 17 (namely, [f4, f5]), a preset range 19 (namely, [f8, f9]), and a preset range 22 (namely, [f13, f14]).

The following describes the second preset posture.

In some embodiments, the second preset posture specifically includes: the included angle α between the screen A and the screen B decreases to (and/or increases to) α2, where α2 is within the second preset range.

Figure 13A:
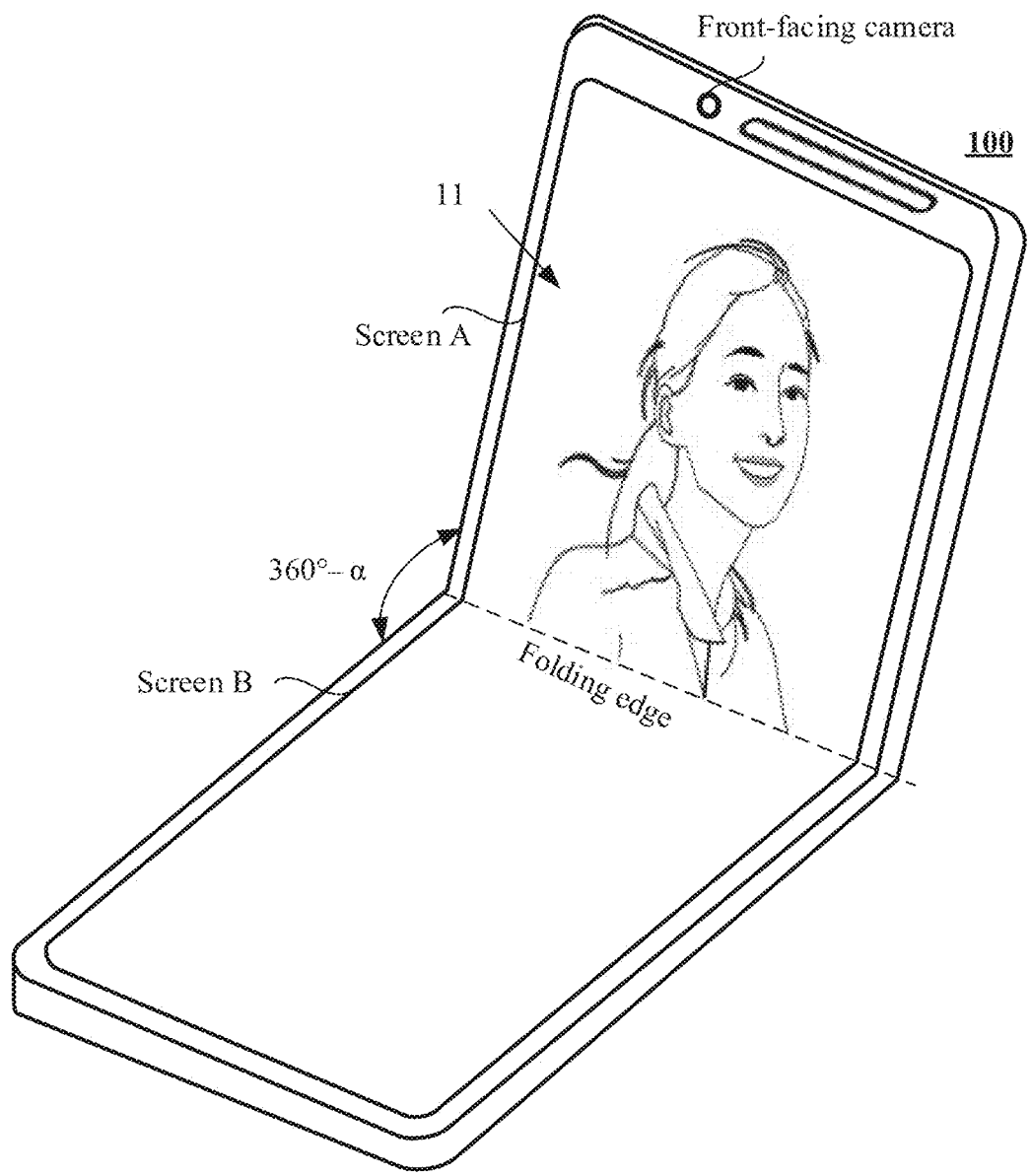
FIG. 13A to FIG. 13F are display interfaces of a screen A in a specific holder state according to an embodiment of this disclosure.
Figure 13B:
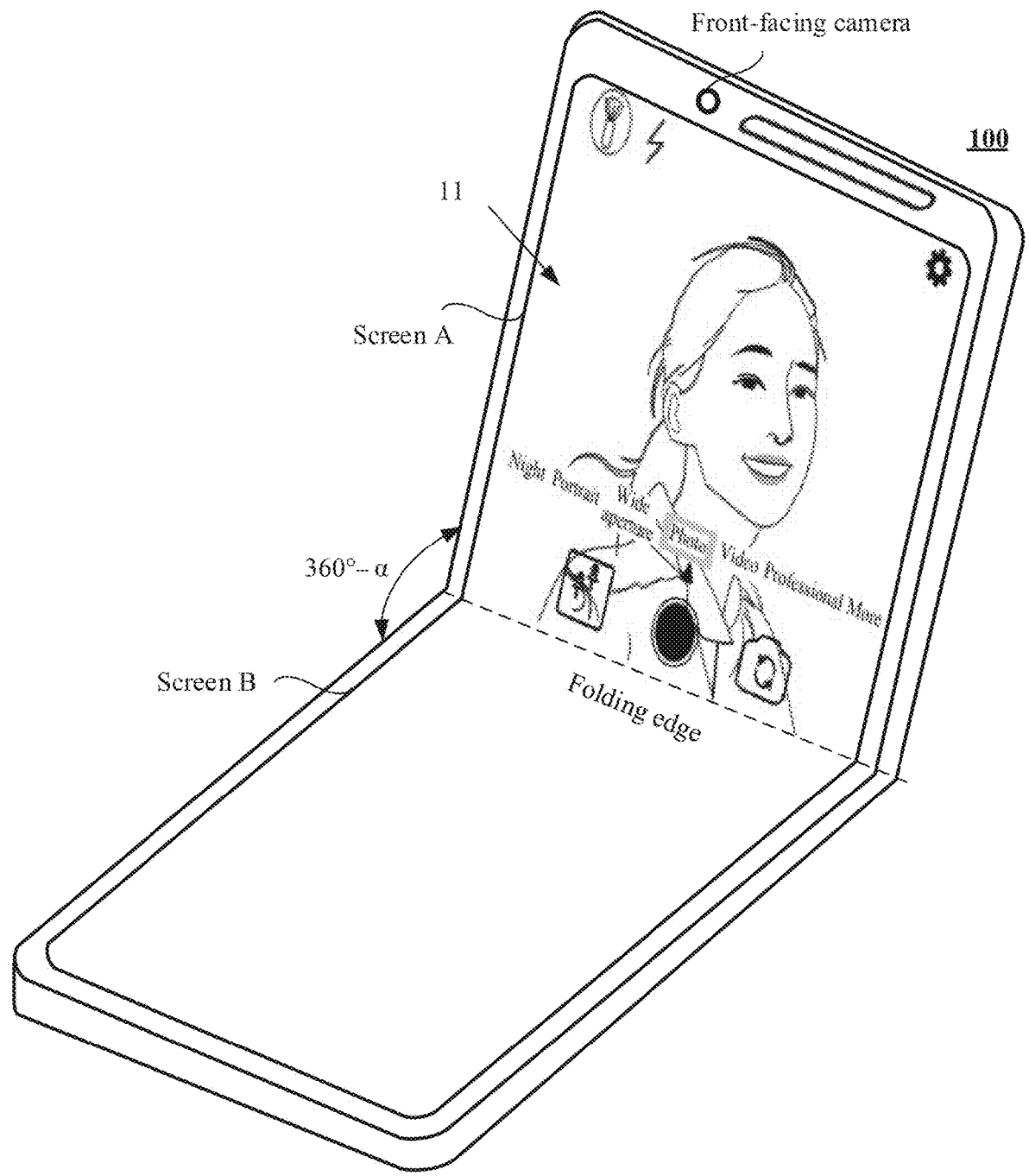

In some embodiments, the second preset posture further includes that the electronic device 100 is in the second holder state. In the second preset posture, the second preset range is [d7, d8], and [d7, d8] is within the preset range 17 (namely, [f4, f5]). In other words, f4≤d7≤d8≤f5. For example, as shown in FIG. 13A and FIG. 13B, the included angle α between the screen A and the screen B is within [d7, d8]. The electronic device 100 controls the screen C to be turned off and the screen B to display a white screen or be turned off, and displays the user interface 11 on the screen A in the default display direction of the screen A. The user interface 11 includes the image captured by the front-facing camera. Optionally, an angle in the second preset range is greater than 60° and less than 180°.

Figure 13C:
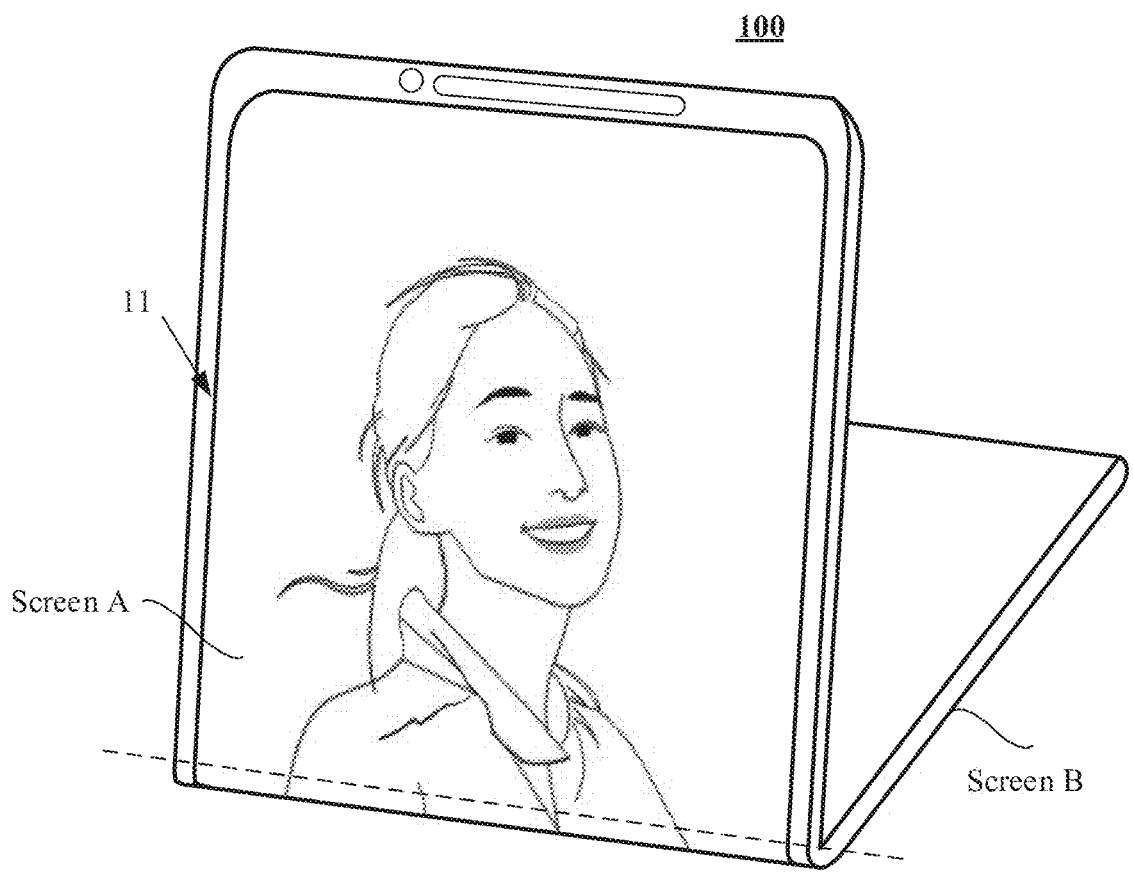
Figure 13D:
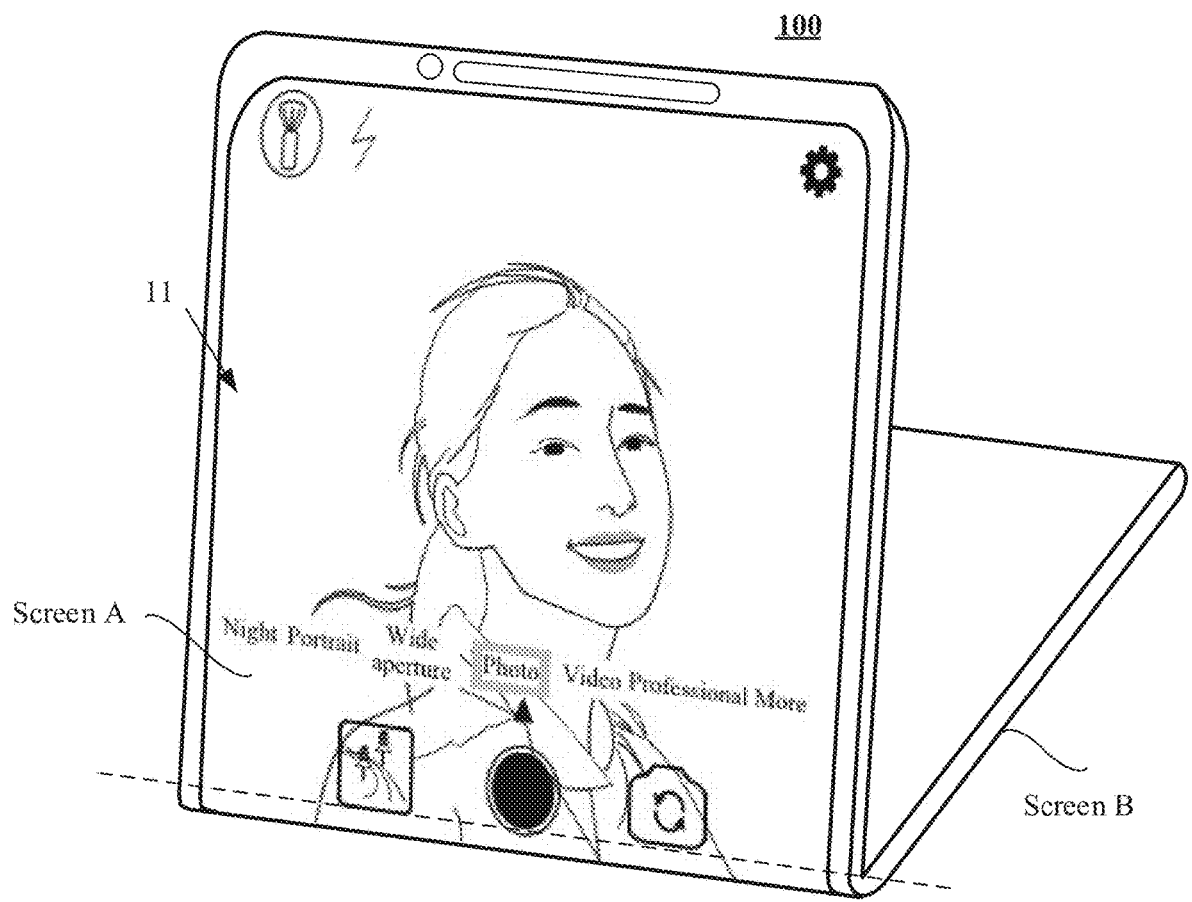

In some embodiments, the second preset posture further includes that the electronic device 100 is in the fourth holder state. In the second preset posture, the second preset range is [d9, d10], and [d9, d10] is within the preset range 19 (namely, [f8, f9]). In other words, f8≤d9≤d10≤f9. For example, as shown in FIG. 13C and FIG. 13D, the included angle α between the screen A and the screen B is within [d9, d10]. The electronic device 100 controls the screen C and the screen B to be turned off, and displays the user interface 11 on the screen A in the default display direction of the screen A. The user interface 11 includes the image captured by the front-facing camera. Optionally, an angle in the second preset range is greater than 240° and less than 360°.

Figure 13E:
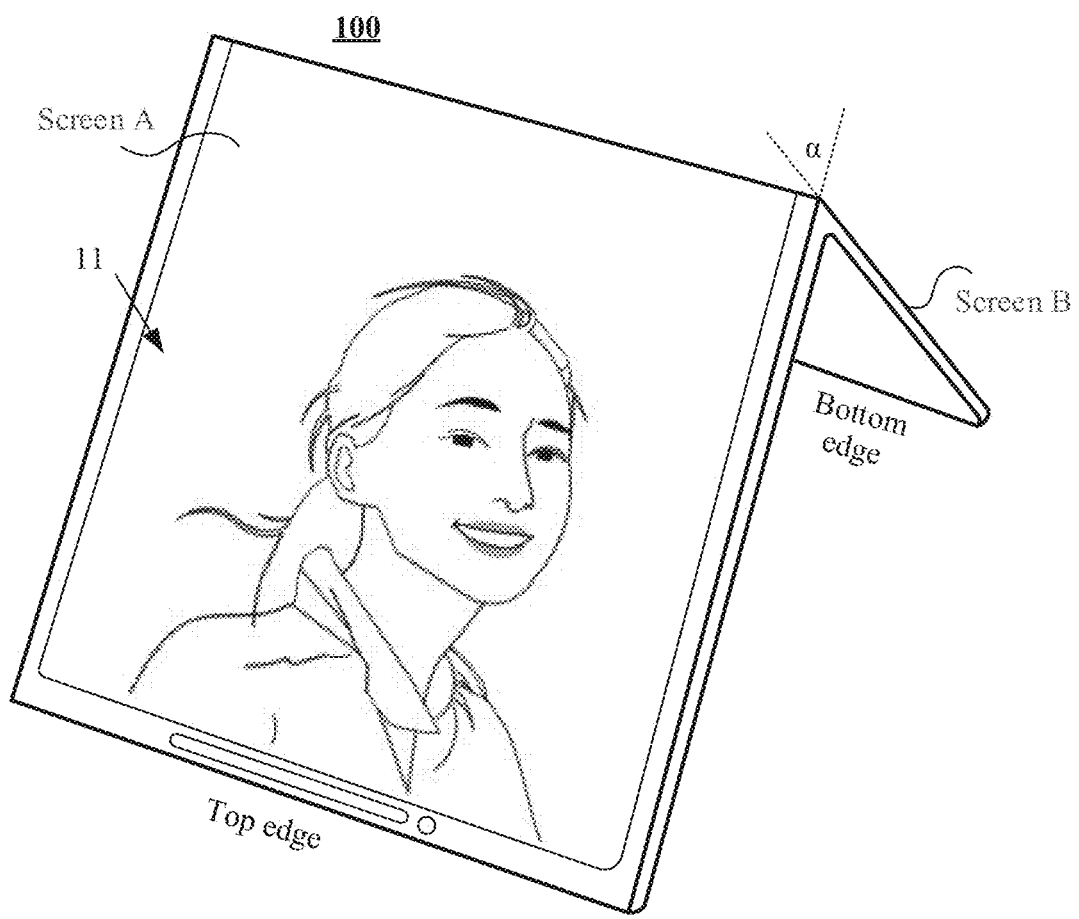
Figure 13F:
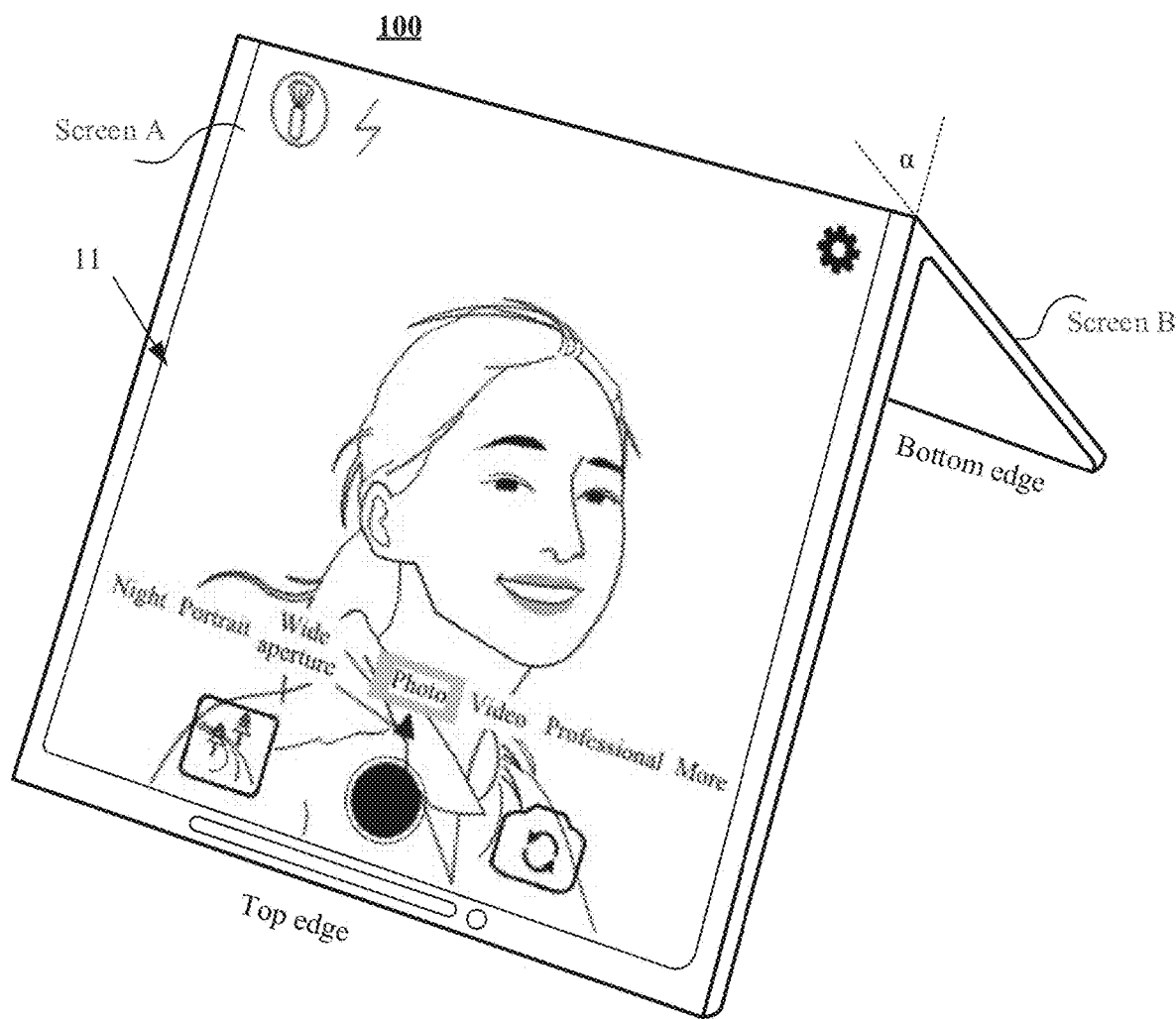

In some embodiments, the second preset posture further includes that the electronic device 100 is in the sixth holder state. In the second preset posture, the second preset range is [d11, d12], and [d11, d12] is within the preset range 22 (namely, [f13, f14]). In other words, f13≤d11≤d12≤f14. For example, as shown in FIG. 13E and FIG. 13F, the included angle α between the screen A and the screen B is within [d11, d12]. The electronic device 100 controls the inward screen to be turned off, and displays the user interface 11 rotated by 180° on the screen A. The user interface 11 includes the image captured by the front-facing camera. Optionally, an angle in the second preset range is greater than 180° and less than 360°.

In some embodiments, in the second preset posture, the second preset range does not include 0° and 180°.

It should be noted that when the electronic device 100 is in the sixth holder state, a display direction corresponding to the screen A is opposite to the default display direction of the screen A. Therefore, the electronic device 100 shown in FIG. 13E and FIG. 13F rotates the user interface 11 by 180° before displaying the user interface on the screen A.

The following describes several cases in which the user interface 11 is stopped displaying on the screen A after the user interface 11 is displayed on the screen A.

In some embodiments, as shown in FIG. 13A and FIG. 13B, after the screen A of the electronic device 100 that meets the second preset condition in the second holder state is controlled to display the user interface 11, when the electronic device 100 detects that the included angle α between the screen A and the screen B exceeds [d7, d8], or detects that the electronic device 100 is out of the second holder state, the electronic device 100 stops displaying the user interface 11 on the screen A.

In some embodiments, as shown in FIG. 13C and FIG. 13D, after the screen A of the electronic device 100 that meets the second preset condition in the fourth holder state is controlled to display the user interface 11, when the electronic device 100 detects that the included angle α between the screen A and the screen B exceeds [d9, d10], or detects that the electronic device 100 is out of the fourth holder state, the electronic device 100 stops displaying the user interface 11 on the screen A.

In some embodiments, as shown in FIG. 13E and FIG. 13F, after the screen A of the electronic device 100 that meets the second preset condition in the sixth holder state is controlled to display the user interface 11, when the electronic device 100 detects that the included angle α between the screen A and the screen B exceeds [d11, d12], or detects that the electronic device 100 is out of the sixth holder state, the electronic device 100 stops displaying the user interface 11 on the screen A.

In some embodiments, the second preset condition includes that a face (or a face of the preset user) is detected by using the front-facing low-power-consumption camera. After the screen A of the electronic device 100 that meets the second preset condition is controlled to display the user interface 11, when no face is detected by using the front-facing low-power-consumption camera within a third preset time, the electronic device 100 stops displaying the user interface 11 on the screen A, and disables the face detection service of the front-facing low-power-consumption camera.

In some embodiments, the electronic device 100 detects a preset gesture 2 of the user by using the low-power-consumption camera corresponding to the screen A, and in response to the preset gesture 2, the electronic device 100 stops displaying the user interface 11 on the screen A.

In some embodiments, that the electronic device 100 stops displaying the user interface 11 on the screen A specifically includes: The electronic device 100 controls the screen A to be turned off; or the electronic device 100 controls the screen A to display another preset interface, for example, a part or all of a home screen corresponding to the inward screen, for example, a user interface recently displayed on the screen A before the user interface 11 is displayed.

Figure 14A:
FIG. 14A and FIG. 14B show a display interface of an inward screen according to an embodiment of this disclosure.
Figure 14B:
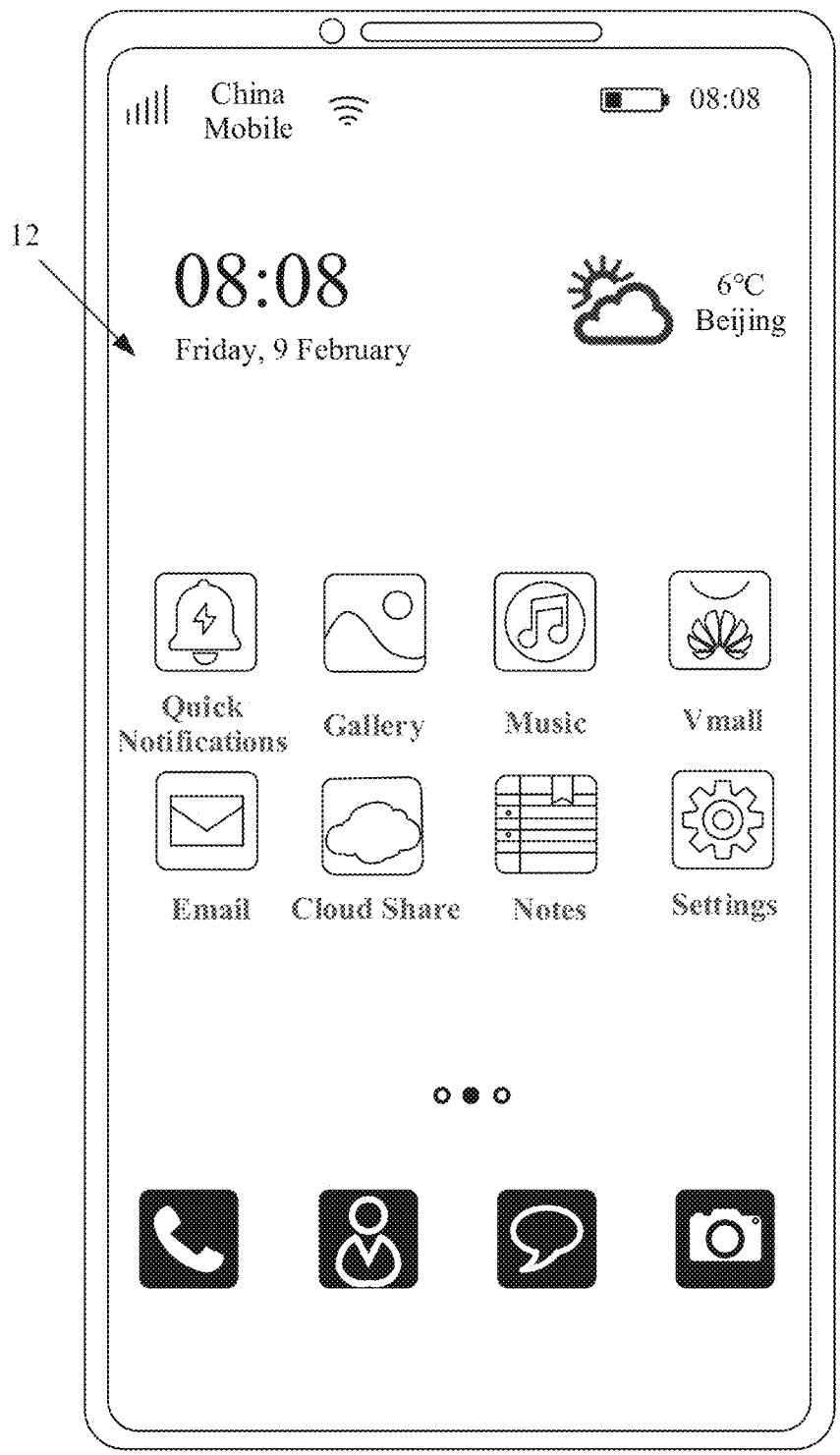

In some embodiments, as shown in FIG. 13A to FIG. 13F, after the user interface 11 is displayed on the screen A of the electronic device 100 that meets the second preset condition, when it is detected that the electronic device 100 is directly folded to the unfolded form, the electronic device 100 controls the inward screen (the screen A and the screen B) to display a preset interface in full screen, for example, display a user interface 11 shown in FIG. 14A or a home screen 12 shown in FIG. 14B in full screen.

It should be noted that the user interface 11 displayed on the screen A may be the user interface 11 described in the related embodiments of FIG. 11A to FIG. 12N. A difference lies in that the image in the preview display area of the user interface 11 displayed on the screen A is captured by the electronic device 100 by using the front-facing camera corresponding to the screen A. For details, refer to the related descriptions of the foregoing embodiments. Details are not described herein again. In addition, in this embodiment of this disclosure, sizes of the screen A, the screen C, and the inward screen may be different, interface elements included on a same user interface (for example, the user interface 11) displayed on the screen A, the screen C, and the inward screen are the same, sizes of user interfaces 11 displayed on the three types of displays may be different, and layouts (namely, positions and sizes) of the interface elements of the user interfaces 11 displayed on the three types of displays may be different. The layout of the interface elements of the user interface 11 displayed on each display (for example, the screen C, the screen A, or the inward screen) is associated with the size of the display.

In some embodiments, refer to the user interface 11 shown in FIG. 12B to FIG. 12H. If the user chooses to switch, to the rear-facing camera (namely, the first camera), the front-facing camera (namely, the second camera) that corresponds to the screen A and that is configured to capture an image, the electronic device 100 further displays prompt information in response to an input operation of the user. The prompt information is used to prompt the user to fold the electronic device 100, so that the electronic device 100 can capture an image by using the rear-facing camera. For example, the user is prompted to fold the electronic device 100 into the unfold form (or the first holder state, the third holder state, or the fifth holder state).

The following describes the display method provided in embodiments of this disclosure by using an example in which the display 1 is the screen A (namely, the second screen) and the screen B (namely, the third screen).

Figure 15A:
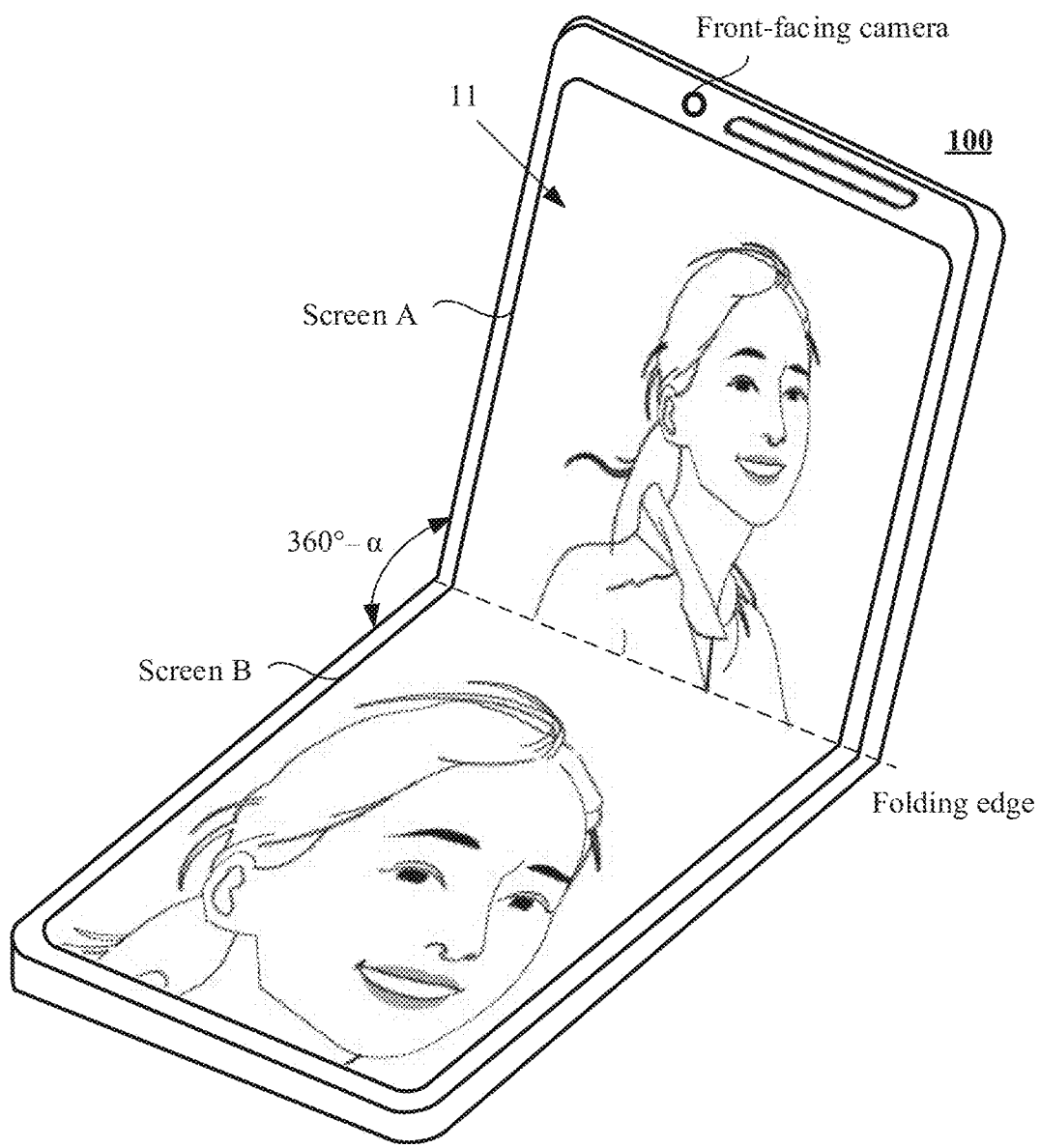
FIG. 15A to FIG. 15F are display interfaces of an inward screen in a specific holder state according to an embodiment of this disclosure.

In some embodiments, as shown in FIG. 15A, when the electronic device 100 detects that the electronic device 100 is in a third preset posture and the electronic device 100 meets a third preset condition, the electronic device 100 starts the front-facing camera (namely, the second camera) corresponding to the screen A to capture an image, displays a user interface 11 on the screen A, and displays a partially enlarged image of the image captured by the front-facing camera (namely, the second camera) on the screen B. A preview display area of the user interface 11 is used to display the image captured by the front-facing camera. The partially enlarged image is an enlarged image of a preset local feature in the image captured by the front-facing camera, for example, an enlarged image of a face shown in FIG. 15A.

Figure 15B:
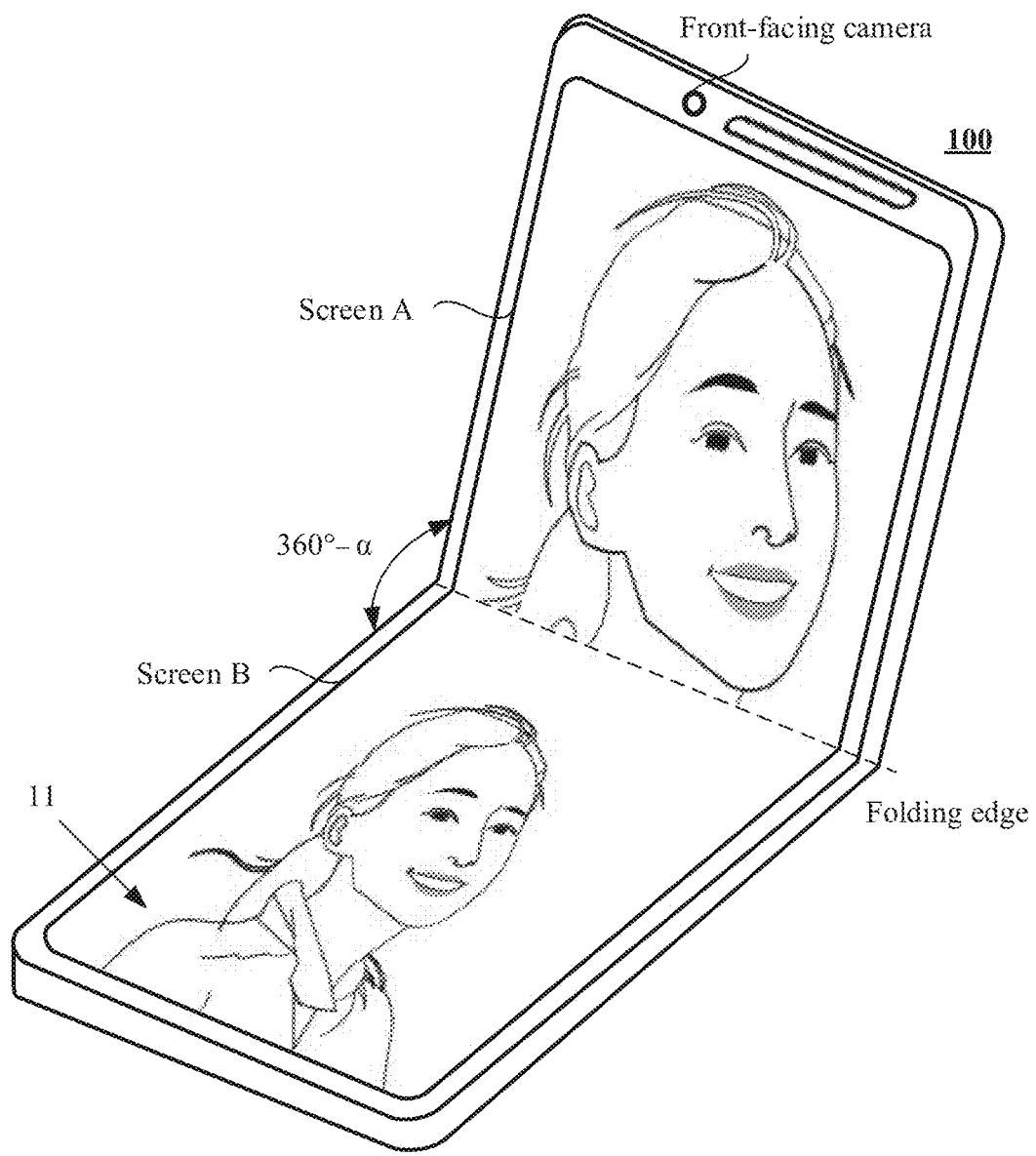

In some embodiments, as shown in FIG. 15B, when the electronic device 100 detects that the electronic device 100 is in a third preset posture and the electronic device 100 meets a third preset condition, the electronic device 100 starts the front-facing camera (namely, the second camera) corresponding to the screen A to capture an image, displays a user interface 11 on the screen B, and displays a partially enlarged image of the image captured by the front-facing camera (namely, the second camera) on the screen A. A preview display area of the user interface 11 includes the image captured by the front-facing camera. The partially enlarged image is an enlarged image of a preset local feature in the image captured by the front-facing camera.

As shown in FIG. 15A and FIG. 15B, in the second holder state, the user may preview, on one screen (for example, the screen A) of the inward screen in real time, the image captured by the camera, and view, on the other screen (for example, the screen B) of the inward screen, the enlarged image (for example, an enlarged face image) of the preset local feature in the image captured by the camera, so that the user clearly views facial details while previewing an overall shooting effect, thereby effectively improving user experience.

In some embodiments, as shown in FIG. 15B, when the electronic device 100 detects that the electronic device 100 is in a third preset posture and the electronic device 100 meets a third preset condition, the electronic device 100 starts the front-facing camera (namely, the second camera) corresponding to the screen A to separately capture images at a shooting angle 1 and a shooting angle 2, displays, on the screen A, the image captured at the shooting angle 1, and displays, on the screen B, the image captured at the shooting angle 2. Optionally, as shown in FIG. 12G, the screen A and/or the screen B may also display another interface element other than the image captured by the camera. In this way, the user can simultaneously view shooting effects at different shooting angles.

Figure 15C:
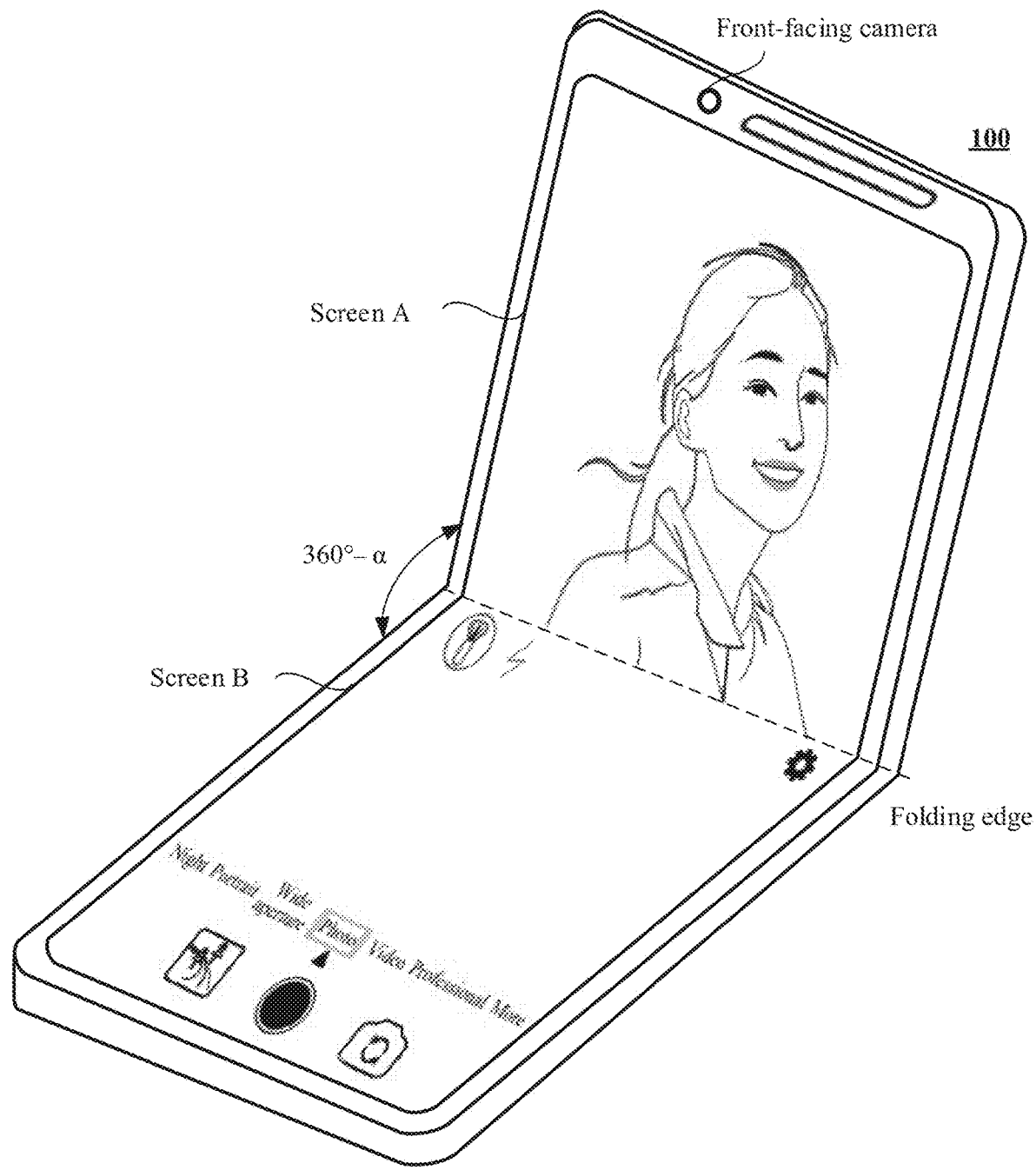

In some embodiments, as shown in FIG. 15C, when the electronic device 100 detects that the electronic device 100 is in a third preset posture and the electronic device 100 meets a third preset condition, the front-facing camera corresponding to the screen A is started to capture an image, and the user interface 11 is displayed on the screen A and the screen B in a split-screen manner. To be specific, a first part of the user interface 11 is displayed on the screen A, and a second part of the user interface 11 is displayed on the screen B. The first part of the user interface 11 includes the preview display area of the user interface 11, and the preview display area is configured to display the image captured by the front-facing camera in real time. The second part of the user interface 11 includes one or more interface elements on the user interface 11 other than displayed content on the screen A. The third preset posture includes that the included angle α between the screen A and the screen B is within a third preset range. Optionally, the electronic device 100 further controls the screen C to be turned off.

It should be noted that, in this embodiment of this disclosure, the user interface 11 displayed on the screen A and the screen B in the split-screen manner may be referred to as a third user interface, and a preview display area of the third user interface may be referred to as a third preview display area.

In some embodiments, as shown in FIG. 15A to FIG. 15C, after controlling the screen A and the screen B to perform split-screen display, the electronic device 100 may detect an air gesture operation of the user in real time by using a gesture detection service of a low-power-consumption camera corresponding to the screen A. In response to the detected air gesture operation, the electronic device 100 may execute a response event corresponding to the air gesture operation. In this way, after the electronic device 100 controls the screen A and the screen B to perform split-screen display, hands of the user can continue to be freed, to further implement contactless air interaction.

The following describes the third preset condition.

In some embodiments, the third preset condition includes that a pause time of the electronic device 100 at a current included angle value reaches a first preset time. For example, the first preset time is 3 s.

In some embodiments, when the screen A and the screen B are in an on state, the third preset condition further includes that the electronic device 100 does not receive, within a second preset time, an input operation performed by the user on the screen A and the screen B. For example, the second preset time is 2 s.

In some embodiments, the third preset condition further includes that the electronic device 100 detects a face (or a face of a preset user) by using the front-facing low-power-consumption camera corresponding to the screen A.

In some embodiments, the third preset condition further includes that the electronic device 100 detects a third preset gesture by using the front-facing low-power-consumption camera corresponding to the screen A. The third preset gesture is used to trigger the screen A and the screen B to perform split-screen display when the electronic device 100 is in the third preset gesture.

The following describes the third preset posture.

In some embodiments, the third preset posture specifically includes: the included angle α between the screen A and the screen B decreases to (and/or increases to) α3, where α3 is within the third preset range.

In some embodiments, in the third preset posture, the third preset range does not include 0° and 180°.

In some embodiments, the third preset posture further includes that the electronic device 100 is in the second holder state. In the third preset posture, the third preset range is [d7, d8], and [d7, d8] is within the preset range 17. In other words, f4≤d7≤d8≤f5. For example, as shown in FIG. 15C, the included angle α between the screen A and the screen B is within [d7, d8]. The electronic device 100 controls the screen A to display the image captured by the front-facing camera in real time, the screen B to display another interface element of the user interface 11, and the screen C to be turned off. Optionally, an angle in the third preset range is greater than 60° and less than 180°.

It should be noted that the user interface 11 displayed on the screen A and the screen B in the split-screen manner may be the user interface 11 described in the related embodiments of FIG. 11A to FIG. 12N. A difference lies in that the image in the preview display area of the user interface 11 displayed on the screen A and the screen B in the split-screen manner is captured by the electronic device 100 by using the front-facing camera corresponding to the screen A. For details, refer to the related descriptions of the foregoing embodiments. Details are not described herein again. The following uses the user interface 11 shown in FIG. 12G as an example for description.

The following describes the user interface 11 displayed on the screen A and the screen B in the split-screen manner.

Figure 15D:
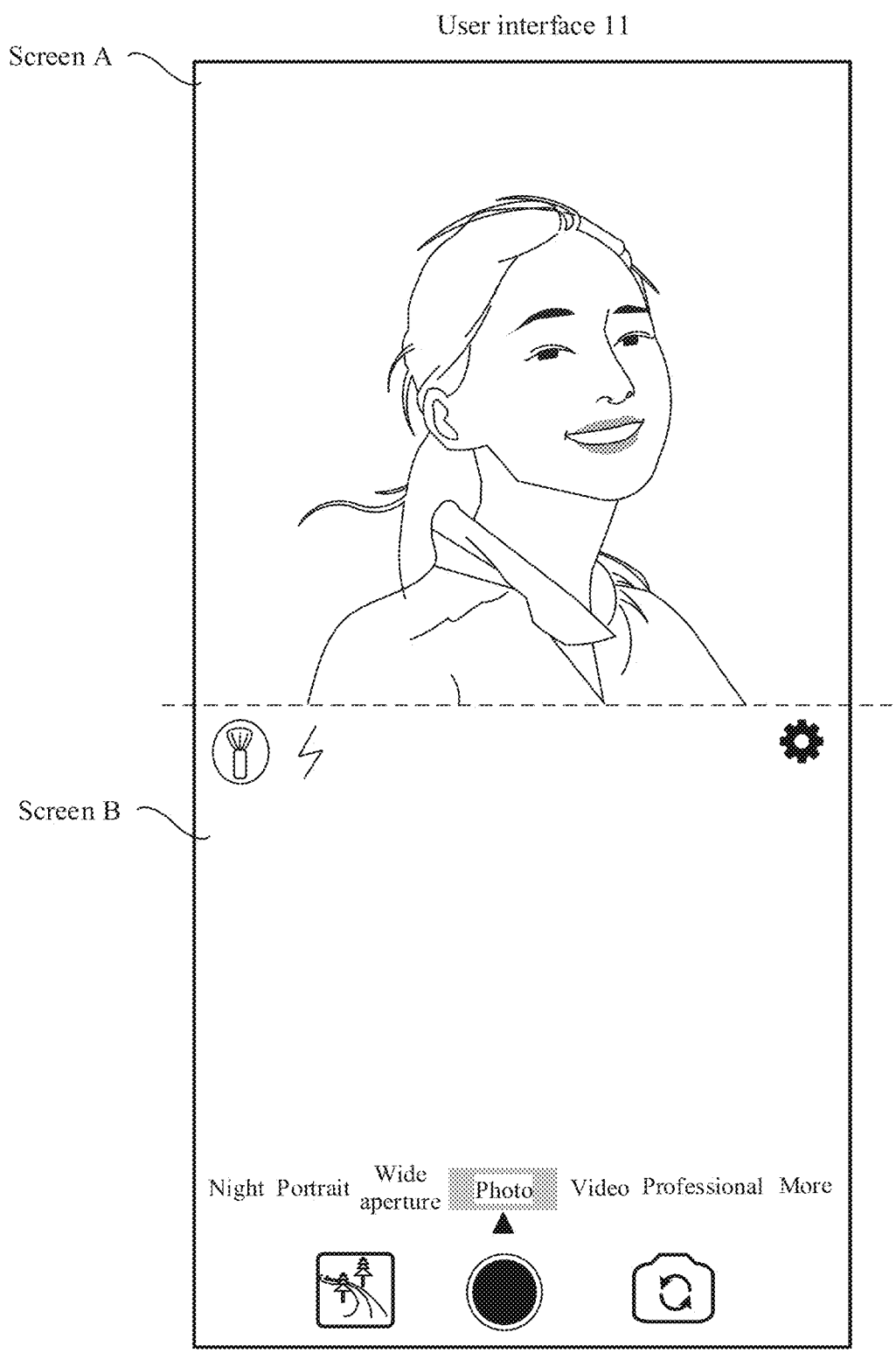

In some embodiments, as shown in FIG. 15D, the first part that is of the user interface 11 and that is displayed on the screen A includes only the image captured by the front-facing camera in real time, the second part that is of the user interface 11 and that is displayed on the screen B includes all interface elements other than the image on the user interface 11, and a layout of the interface elements displayed on the screen B is associated with an interface layout of the user interface 11 shown in FIG. 12G. The electronic device 100 stores the interface layout of the user interface 11 shown in FIG. 12G.

Figure 15E:
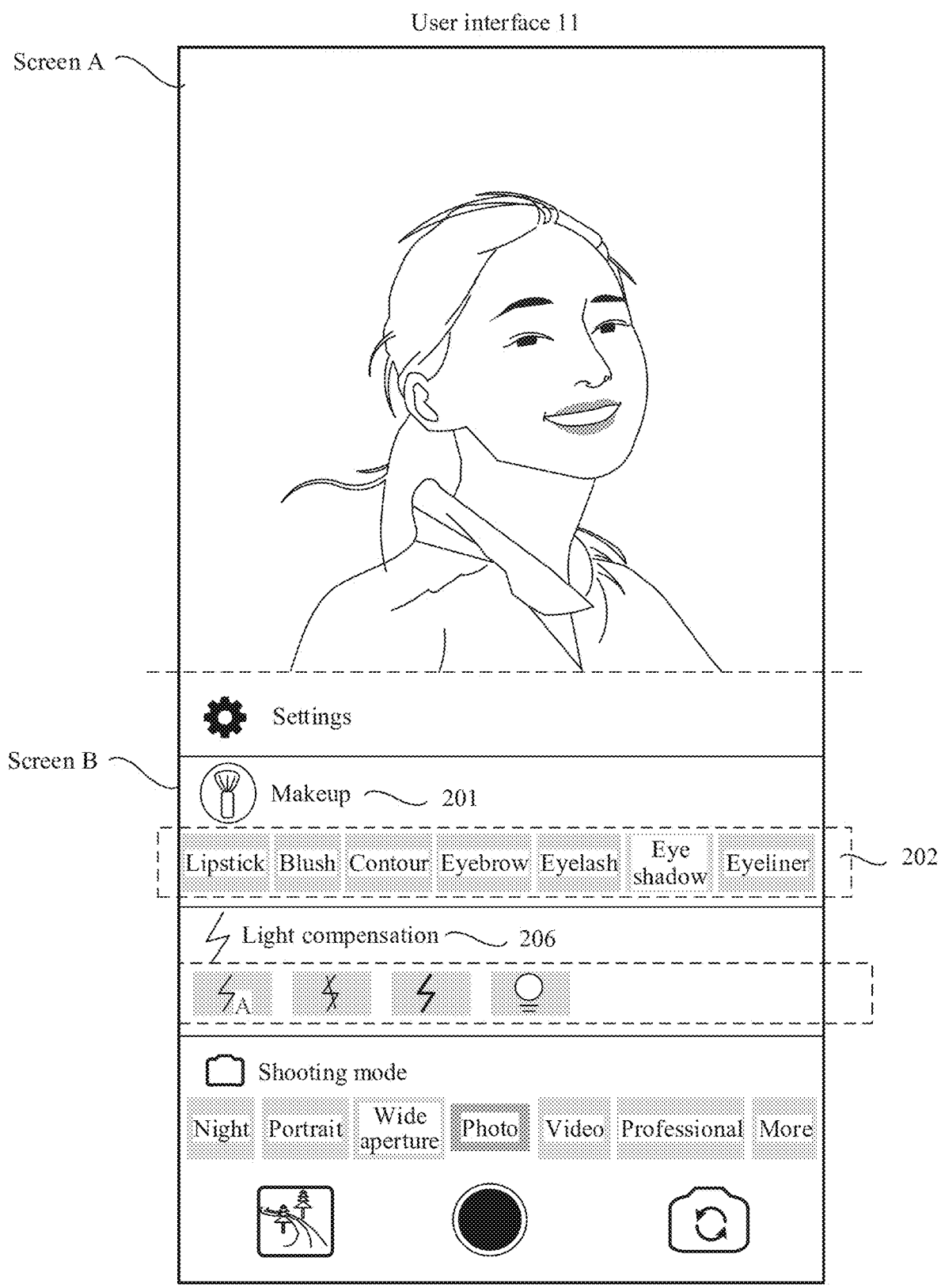

In some embodiments, the second part that is of the user interface 11 and that is displayed on the screen B includes all the other interface elements and level-2 interface elements of one or more interface elements among all the other interface elements. For example, as shown in FIG. 15E, the second part that is of the user interface 11 and that is displayed on the screen B includes a makeup control 201 and a light compensation control 206 of the user interface 11, includes level-2 interface elements corresponding to the makeup control 201, namely, one or more makeup options 202, and further includes level-2 interface elements corresponding to the light compensation control 206, namely, one or more light compensation options. An interface layout shown in 15E is different from the interface layout of the user interface 11 shown in FIG. 12G, where the electronic device 100 may re-arrange the interface elements that are of the user interface 11 and that are displayed on the screen B, to adapt to a size of the screen B and improve user experience.

Figure 15F:
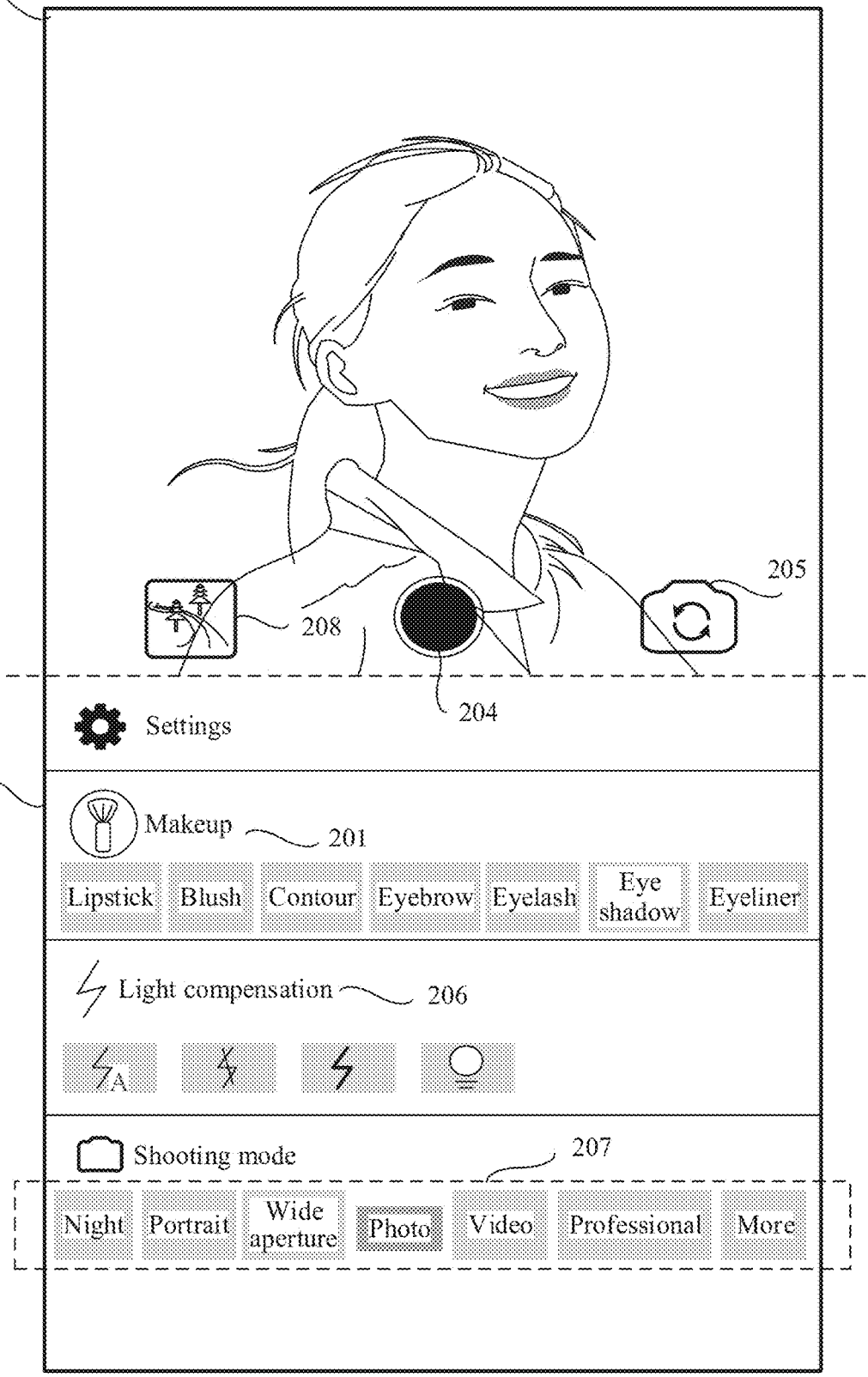

In some embodiments, the first part that is of the user interface 11 and that is displayed on the screen A includes the image collected by the front-facing camera in real time and at least one other interface element of the user interface 11, and the second part that is of the user interface 11 and that is displayed on the screen B includes an interface element on the user interface 11 other than displayed content on the screen A. For example, as shown in FIG. 15F, the displayed content of the screen A includes the image collected by the front-facing camera in real time, a shooting control 204, a camera switching control 205, and an album control 208. Displayed content on the screen B includes the makeup control 201 and the level-2 interface elements corresponding to the makeup control 201, the light compensation control 206 and level-2 interface elements corresponding to the light compensation control 206, and a shooting mode 207.

As shown in FIG. 15D to FIG. 15F, in the second holder state, the user may preview, on the screen A in real time, the image captured by the camera, and control, on the screen B, a shooting parameter of the camera and a display effect of the image captured by the camera. For example, in the second holder state, the user may view a facial state of the user in real time by using the screen A, modify a light compensation parameter by using the light compensation option displayed on the screen B, and modify, by using the makeup option displayed on the screen B, a makeup effect of the face displayed on the screen A, thereby effectively improving user experience.

The following describes several cases in which after preset content (for example, the user interface 11) is displayed on the screen A and the screen B in the split-screen manner, the preset content is stopped displaying on the screen A and the screen B in the split-screen manner.

In some embodiments, as shown in FIG. 15A to FIG. 15F, after the inward screen of the electronic device 100 that meets the third preset condition in the second holder state is controlled to display the preset content in the split-screen manner, when the electronic device 100 detects that the included angle α between the screen A and the screen B exceeds [d7, d8], or detects that the electronic device 100 is out of the second holder state, the electronic device 100 stops displaying the preset content on the screen A and the screen B in the split-screen manner.

In some embodiments, the third preset condition includes that a face (or a face of the preset user) is detected by using the front-facing low-power-consumption camera. After the electronic device 100 that meets the third preset condition is controlled to display the preset content in the split-screen manner, when no face is detected by using the front-facing low-power-consumption camera within a third preset time, the electronic device 100 stops displaying the preset content on the screen A and the screen B in the split-screen manner, and disables the face detection service of the front-facing low-power-consumption camera.

In some embodiments, the electronic device 100 detects a preset gesture 3 of the user by using the low-power-consumption camera corresponding to the screen A, and in response to the preset gesture 3, the electronic device 100 stops displaying the preset content on the screen A and the screen B in the split-screen manner.

In some embodiments, that the electronic device 100 stops displaying the preset content on the screen A and the screen B in the split-screen manner specifically includes: The electronic device 100 controls the inward screen to be turned off; or the electronic device 100 controls the screen A and the screen B to display another preset interface in the split-screen manlier, for example, a home screen corresponding to the inward screen.

In some embodiments, as shown in FIG. 15A to FIG. 15F, after the preset content (for example, the user interface 11) is displayed, in the split-screen manner, on the screen A and the screen B of the electronic device 100 that meets the third preset condition, when it is detected that the electronic device 100 is directly folded to the unfolded form, the electronic device 100 controls the inward screen (the screen A and the screen B) to display a preset interface in full screen, for example, display a user interface 11 shown in FIG. 14A or a home screen 12 shown in FIG. 14B in full screen.

The following describes a software structure of the electronic device 100 by using an example.

A software system of the electronic device 100 may use a layered architecture, an event-driven architecture, a microkernel architecture, a micro service architecture, or a cloud architecture. In this embodiment of the present disclosure, an Android system of a layered architecture is used as an example to illustrate the software structure of the electronic device 100.

Figure 16:
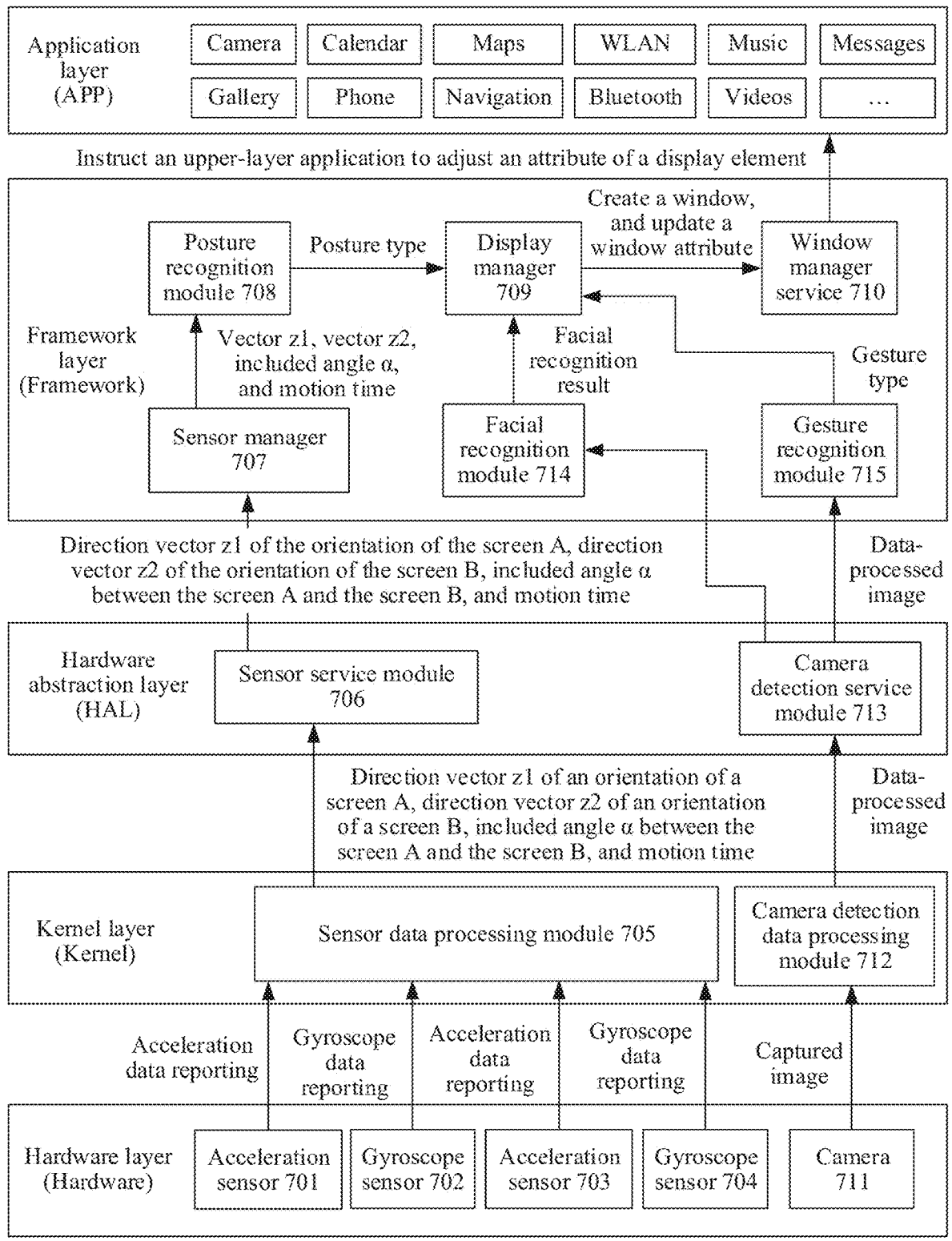
FIG. 16 is a schematic diagram of a software architecture of an electronic device according to an embodiment of this disclosure.

FIG. 16 is a block diagram of the software structure of the electronic device 100 according to an embodiment of this disclosure.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application (application, APP) layer may include a series of application packages. As shown in FIG. 16, the application packages may include applications such as "camera", "gallery", "calendar", "phone", "maps", "navigation", "WLAN", "Bluetooth", "music", "videos", and "messages".

The application framework (Framework) layer provides an application programming interface (application programming interface, API) and a programming framework for an application at the application layer. The application framework layer includes some predefined functions. As shown in FIG. 16, the framework layer may include a sensor manager (sensor manager) 707, a posture recognition (posture recognition) module 708, a display manager (display manager) 709, and a window manager service (window manager service, WMS) 710. Optionally, the framework layer may further include an activity manager service (activity manager service, AMS), a content provider, a view system, a phone manager, a resource manager, a notification manager, and the like (not shown in the accompanying drawing).

The window manager is configured to manage a window program. The window manager may obtain a size of the display, determine whether there is a status bar, perform screen locking, take a screenshot, and the like.

The hardware abstraction layer (hardware abstraction layer, HAL) includes a sensor service (sensor service) module 706. The sensor service module 706 may be configured to report a processing result of a sensor data processing module 705 at the kernel layer to the sensor manager 707 at the framework layer. In some embodiments, the hardware abstraction layer further includes a camera detection service module 713. The camera detection service module 713 may be configured to report an image processing result of a camera detection data processing module 712 at the kernel layer to a facial recognition module 714 and gesture recognition 715 at the framework layer.

The kernel (Kernel) layer is a layer between hardware and software. The kernel layer may include the sensor data processing module 705. The sensor data processing module 705 may be configured to: obtain data reported by one or more sensors at a hardware (Hardware) layer, perform data processing, and report a data processing result to the sensor service module 706. In some embodiments, the kernel layer may further include the camera detection data processing module 712. The camera detection data processing module 712 may be configured to obtain an image reported by a camera 711 at the hardware layer, perform image processing, and report an image processing result to the camera detection service module 713.

The hardware layer may include an acceleration sensor 701, a gyroscope sensor 702, an acceleration sensor 703, a gyroscope sensor 704, and the like. The acceleration sensor 701 and the gyroscope sensor 702 may be disposed on a screen A of the electronic device 100, and the acceleration sensor 703 and the gyroscope sensor 704 may be disposed on a screen B of the electronic device 100. The acceleration sensor 701 may be configured to: measure acceleration data of the screen A, and report the acceleration data to the sensor data processing module 705. The acceleration sensor 703 may be configured to: measure acceleration data of the screen B, and report the acceleration data to the sensor data processing module 705. The gyroscope sensor 702 may be configured to: measure gyroscope data of the screen A, and report the gyroscope data to the sensor data processing module 705. The gyroscope sensor 704 may be configured to: measure gyroscope data of the screen B, and report the gyroscope data to the sensor data processing module 705.

When the user folds the electronic device 100, the acceleration sensor 701, the gyroscope sensor 702, the acceleration sensor 703, and the gyroscope sensor 704 at the hardware layer each may report measured sensor data to the sensor data processing module 705 at the kernel layer. The sensor data processing module 705 may calculate, based on sensor data reported by a plurality of sensors at the hardware layer, a vector $\vec{z1}$ corresponding to an orientation of the screen A and a vector $\vec{z2}$ corresponding to an orientation of the screen B, to farther calculate an included angle α between the screen A and the screen B. Then, the sensor data processing module 705 may report the direction vector $\vec{z1}$ of the orientation of the screen A, the direction vector $\vec{z2}$ of the orientation of the screen B, and the included angle α between the screen A and the screen B to the sensor manager 707 at the framework layer by using the sensor service module 706 at the hardware abstraction layer. The sensor manager 707 may be configured to send the vector $\vec{z1}$, the vector $\vec{z2}$, and the included angle A α to the posture recognition module 708. The posture recognition module 708 may determine a holder state of the electronic device 100 based on the vector $\vec{z1}$, the vector $\vec{z2}$, and the included angle α, further recognize a posture type of the electronic device 100 based on the included angle α and the holder state of the electronic device 100, and send the posture type to the display manager 709. The display manager 709 may determine a display state of each display (the screen A, the screen B, and a screen C) based on the posture type, and display a user interface 11 on a display 1. The display state of the display includes an on state and an off state. The display manager 709 may indicate the window manager service 710 to create a window corresponding to the user interface 11, and update a window attribute (for example, a size and a position). The window manager service 710 may refresh a window system, redraw a window, and notify an upper-layer application to adjust an attribute (for example, a size or a position) of a display element in the window.

In some embodiments, when the posture type is a preset posture, the electronic device 100 enables a face detection service of the camera 711 corresponding to the preset posture. The electronic device 100 captures an image by using the camera 711, and reports the captured image to the camera detection data processing module 712. The camera detection service module 713 performs image processing on the image, and uploads an image obtained after image processing to the facial recognition module 714 through the camera detection service module 713. The facial recognition module 714 recognizes whether the image includes a face (or a face of a preset user), and the display manager 709 may determine a display state, displayed content, and the like of each screen based on the posture type and a facial recognition result. For example, the first preset posture corresponds to a rear-facing camera, and the second preset posture corresponds to a front-facing camera.

In some embodiments, after determining, based on the posture type, that the user interface 11 is displayed on the display 1 (for example, the screen C), the display manager 709 enables a gesture detection service of the camera 711 corresponding to the display 1. The camera detection service module 713 uploads an image obtained after image processing to the gesture recognition module 715 through the camera detection service module 713. The gesture recognition module 715 recognizes a gesture type in the image, and the display manager 709 may update a display state, displayed content, and the like of the display 1 based on the gesture type.

This disclosure further provides an electronic device 100. The electronic device 100 includes a first screen, a foldable screen, and a first camera, the foldable screen may be folded into a second screen and a third screen along a folding edge, orientations of the first screen and the second screen are opposite, the orientation of the first screen is consistent with a shooting direction of the first camera, and the orientation of the second screen is consistent with a shooting direction of a second camera.

Figure 17:
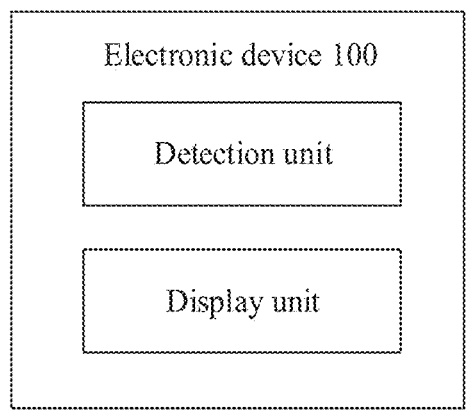
FIG. 17 is a schematic diagram of a structure of another electronic device according to an embodiment of this disclosure.

FIG. 17 is a schematic diagram of a structure of another terminal device according to an embodiment of the present disclosure. As shown in FIG. 17, the electronic device 100 may include a detection unit and a display unit.

The detection unit is configured to determine, based on a detected first included angle between the second screen and the third screen, that the electronic device is in a first preset posture.

The display unit is configured to display a first user interface on the first screen based on the first preset posture of the electronic device, where a first preview display area of the first user interface is used to display an image captured by the first camera, and in the first preset posture, the first included angle does not include 0° and 180°.

The detection unit is further configured to determine, based on the detected first included angle, that the electronic device is in a second preset posture.

The display unit is further configured to display a second user interface on the second screen based on the second preset posture of the electronic device, where a second preview display area of the second user interface is used to display an image captured by the second camera, and in the second preset posture, the first included angle does not include 0° and 180°.

In some embodiments, the detection unit is further configured to determine, based on the detected first included angle, that the electronic device is in a third preset posture; and the display unit is further configured to perform split-screen display on the second screen and the third screen based on the third preset posture of the electronic device, where displayed content on the second screen includes a third preview display area, the third preview display area is used to display the image captured by the second camera, and in the third preset posture, the first included angle does not include 0° and 180°.

In some embodiments, displaying the first user interface on the first screen based on the first preset posture of the electronic device includes: when it is detected that the electronic device is in the first preset posture and the electronic device meets a first preset condition, starting the first camera to capture an image, and displaying the first user interface on the first screen. The first preset posture includes that the first included angle is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

In some embodiments, displaying the second user interface on the second screen based on the second preset posture of the electronic device includes: when it is detected that the electronic device is in the second preset posture and the electronic device meets a second preset condition, starting the second camera to capture an image, and displaying the second user interface on the second screen. The second preset posture includes that the first included angle is within a second preset range, and the second preset condition includes one or more of the following: a pause time of the first included angle at a current included angle value reaches a first preset time; when the second screen is in an on state, the electronic device does not receive, within a second preset time, an input operation performed on the second screen; a face or a face of a preset user is detected in an image captured by a camera corresponding to the second screen; and a second preset gesture is detected in the image captured by the camera corresponding to the second screen.

In some embodiments, performing split-screen display on the second screen and the third screen based on the third preset posture of the electronic device includes: when it is detected that the electronic device is in the third preset posture and the electronic device meets a third preset condition, starting the second camera to capture an image, and performing split-screen display on the second screen and the third screen. The third preset posture includes that the first included angle is within a third preset range, and the third preset condition includes one or more of the following: a pause time of the first included angle at a current included angle value reaches a first preset time; when the second screen and/or the third screen are/is in an on state, the electronic device does not receive, within a second preset time, an input operation performed on the second screen or the third screen; a face or a face of a preset user is detected in an image captured by a camera corresponding to the second screen; and a third preset gesture is detected in the image captured by the camera corresponding to the second screen.

This disclosure further provides an electronic device 100. The electronic device 100 includes a first screen, a foldable screen, and a first camera, the foldable screen may be folded into a second screen and a third screen along a folding edge, orientations of the first screen and the second screen are opposite, and the orientation of the first screen is consistent with a shooting direction of the first camera. The electronic device may include a plurality of function modules or units, for example, a display unit.

The display unit is configured to: when it is detected that the electronic device is in a first preset posture and the electronic device meets a first preset condition, start the first camera to capture an image, and display a first user interface on the first screen, where a first preview display area of the first user interface is used to display the image captured by the first camera. The first preset posture includes that a first included angle between the second screen and the third screen is within a first preset range, and the first preset condition includes one or more of the following: a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; and a first preset gesture is detected in the image captured by the camera corresponding to the first screen.

In this embodiment of this disclosure, the camera corresponding to the first screen and the first camera may be a same camera, or may be different cameras. Optionally, the camera corresponding to the first screen is a low-power-consumption camera.

In some embodiments, the electronic device further includes a second camera, the orientation of the second screen is consistent with a shooting direction of the second camera, and when the foldable screen is folded into the second screen and the third screen along the folding edge, the third screen and the second camera are located on different sides of the fielding edge. The display unit is further configured to: when it is detected that the electronic device is in a second preset posture and the electronic device meets a second preset condition, start the second camera to capture an image, and display a second user interface on the second screen, where a second preview display area of the second user interface is used to display the image captured by the second camera. The second preset posture includes that a first included angle is within a second preset range, and the second preset condition includes one or more of the following: the pause time of the first included angle at the current included angle value reaches the first preset time; when the second screen is in an on state, the electronic device does not receive, within the second preset time, an input operation performed on the second screen; a face or a face of the preset user is detected in an image captured by a camera corresponding to the second screen; and a second preset gesture is detected in the image captured by the camera corresponding to the second screen.

In this embodiment of this disclosure, the camera corresponding to the second screen and the second camera may be a same camera, or may be different cameras. Optionally, the camera corresponding to the second screen is a low-power-consumption camera.

In some embodiments, the electronic device further includes a second camera, the orientation of the second screen is consistent with a shooting direction of the second camera, and when the foldable screen is folded into the second screen and the third screen along the folding edge, the third screen and the second camera are located on different sides of the folding edge. The display unit is further configured to: when it is detected that the electronic device is in a third preset posture and the electronic device meets a third preset condition, start the second camera to capture an image, and perform split-screen display on the second screen and the third screen, where displayed content on the second screen includes a third preview display area, and the third preview display area is used to display the image captured by the second camera. The third preset posture includes that the first included angle is within a third preset range, and the third preset condition includes one or more of the following: the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; and a third preset gesture is detected in the image captured by the camera corresponding to the second screen.

In some embodiments, the first preset posture further includes: a second included angle between the third screen and a horizontal plane is within a fourth preset range, an included angle between an orientation of the third screen and a Z-axis of a geographic coordinate system is less than 90°, and an angle within the first preset range is greater than 0° and less than 120°. Alternatively, the first preset posture further includes: a second included angle is within a fourth preset range, an included angle between an orientation of the third screen and a Z axis of a geographic coordinate system is greater than 90°, and an angle within the first preset range is greater than 180° and less than 300°. Alternatively, the first preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the first preset range is greater than 0° and less than 180°.

In some embodiments, the first preset posture further includes: a second included angle between the third screen and a horizontal plane is within a fourth preset range, an included angle between an orientation of the third screen and a Z axis of a geographic coordinate system is less than 90°, and an angle within the first preset range is less than 120°. That the display unit displays a first user interface on the first screen includes: The display unit displays the first user interface rotated by 180° on the first screen.

In some embodiments, the electronic device further includes a recognition unit. Before the display unit displays the first user interface on the first screen, the recognition unit is configured to recognize a first area in which a preset local feature is located in the image captured by the first camera, where the first preview display area is used to display an enlarged image of an image in the first area.

In some embodiments, the electronic device further includes a receiving unit. After the display unit displays the first user interface on the first screen, the receiving unit is configured to receive a first input operation of the user, and the display unit is further configured to: in response to the first input operation, display one or more of the following interface elements on the first user interface: a makeup control, a shooting control, a camera switching control, a light compensation control, an album control, and a display box. The makeup control is configured to add a preset makeup effect to a face in the image displayed in the first preview display area; the shooting control is configured to trigger the electronic device to store the image displayed in the first preview display area; the camera switching control is configured to switch between cameras for image capturing; the light compensation control is configured to supplement ambient light; the album control is configured to trigger the electronic device to display a user interface of an album application; and the display box is configured to display an enlarged image of the preset local feature in the image captured by the first camera.

In some embodiments, the first camera is an ultraviolet camera, and the image captured by the first camera is used to highlight an area to which sunscreen is applied.

In some embodiments, the display unit is further configured to: when it is detected that the electronic device is in the first preset posture and the electronic device meets the first preset condition, control the second screen and the third screen to be turned off.

In some embodiments, the second preset posture further includes: a second included angle between the third screen and a horizontal plane is within a fourth preset range, an included angle between an orientation of the third screen and a Z-axis of a geographic coordinate system is less than 90°, and an angle within the second preset range is greater than 60° and less than 180°. Alternatively, the second preset posture further includes: a second included angle is within a fourth preset range, an included angle between an orientation of the third screen and a Z axis of a geographic coordinate system is greater than 90°, and an angle within the second preset range is greater than 240° and less than 360°. Alternatively, the second preset posture further includes: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the second preset range is greater than 180° and less than 360°.

In some embodiments, in the first preset posture and the second preset posture, the first included angle does not include 0° and 180°.

In some embodiments, the display unit is further configured to: when it is detected that the electronic device is in the second preset posture and the electronic device meets the second preset condition, control the first screen to be turned off.

In some embodiments, the third preset posture further includes: a second included angle between the third screen and a horizontal plane is within a fourth preset range, an included angle between an orientation of the third screen and a Z axis of a geographic coordinate system is less than 90°, and an angle within the third preset range is greater than 60° and less than 180°.

In some embodiments, displayed content on the third screen includes an enlarged image of a preset local feature in the image captured by the second camera.

In some embodiments, that the display unit performs split-screen display the second screen and the third screen includes: The display unit displays a third user interface on the second screen and the third screen in a split-screen manner. The displayed content on the second screen includes the third preview display area of the third user interface and zero, one, or more interface elements on the third user interface other than the third preview display area, and displayed content on the third screen includes one or more interface elements on the third user interface other than the displayed content on the second screen. The third user interface further includes one or more of the following interface elements: a makeup control, a shooting control, a camera switching control, a light compensation control, an album control, and a display box. The makeup control is configured to add a preset makeup effect to a face in the image in the third preview display area of the third user interface; the shooting control is configured to trigger the electronic device to store the image in the third preview display area of the third user interface; the camera switching control is configured to switch between cameras for image capturing; the light compensation control is configured to supplement ambient light; the album control is configured to trigger the electronic device to display a user interface of an album application; and the display box is configured to display an enlarged image of a preset local feature in the image captured by the second camera.

The implementations of this disclosure may be randomly combined to achieve different technical effects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present disclosure, but are not intended to limit the protection scope of the present disclosure. Any modification, equivalent replacement, or improvement made according to the disclosure of the present disclosure shall fall within the protection scope of the present disclosure.

What is claimed is:

1. A display method performed by an electronic device, wherein the electronic device comprises a first screen, a foldable screen, a first camera and a second camera, the foldable screen is able to be folded into a second screen and a third screen along a folding edge, the third screen and the second camera are located on different sides of the folding edge, orientations of the first screen and the second screen are opposite, the orientation of the first screen is consistent with a shooting direction of the first camera, the orientation of the second screen is consistent with a shooting direction of the second camera, and the method comprises:

when it is detected that the electronic device is in a first preset posture and the electronic device meets a first preset condition, starting the first camera to capture an image, and displaying a first user interface on the first screen, wherein a first preview display area of the first user interface is used to display the image captured by the first camera, the first preset posture comprises that a first included angle between the second screen and the third screen is within a first preset range, and the first preset condition comprises one or more of the following:

a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; or a first preset gesture is detected in the image captured by the camera corresponding to the first screen; and when it is detected that the electronic device is in a second preset posture and the electronic device meets a second preset condition, starting the second camera to capture an image, and displaying a second user interface on the second screen, wherein a second preview display area of the second user interface is used to display the image captured by the second camera, the second preset posture comprises that the first included angle is within a second preset range, and the second preset condition comprises one or more of the following:

the pause time of the first included angle at the current included angle value reaches the first preset time; when the second screen is in an on state, the electronic device does not receive, within the second preset time, an input operation performed on the second screen; a face or a face of the preset user is detected in an image captured by a camera corresponding to the second screen; or a second preset gesture is detected in the image captured by the camera corresponding to the second screen;

wherein the first preset range does not include 0 degrees and 180 degrees and the second preset range does not include 0 degrees and 180 degrees.

2. The method according to claim 1, wherein the method further comprises:

when it is detected that the electronic device is in a third preset posture and the electronic device meets a third preset condition, starting the second camera to capture an image, and performing split-screen display on the second screen and the third screen, wherein displayed content on the second screen comprises a third preview display area, and the third preview display area is used to display the image captured by the second camera, and wherein the third preset posture comprises that the first included angle is within a third preset range, and the third preset condition comprises one or more of the following:

the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; or a third preset gesture is detected in the image captured by the camera corresponding to the second screen.

3. The method according to claim 1, wherein the first preset posture further comprises:

a second included angle between the third screen and a horizontal plane is within a fourth preset range, an included angle between an orientation of the third screen and a Z axis of a geographic coordinate system is less than 90°, and an angle within the first preset range is greater than 0° and less than 120°; or the first preset posture further comprises: a second included angle is within a fourth preset range, an included angle between an orientation of the third screen and a Z-axis of a geographic coordinate system is greater than 90°, and an angle within the first preset range is greater than 180° and less than 300°; or the first preset posture further comprises: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the first preset range is greater than 0° and less than 180°.

4. The method according to claim 1, wherein the first preset posture further comprises:

a second included angle between the third screen and a horizontal plane is within a fourth preset range, an included angle between an orientation of the third screen and a Z axis of a geographic coordinate system is less than 90°, and an angle within the first preset range is less than 120°; and the displaying the first user interface on the first screen comprises: displaying the first user interface rotated by 180° on the first screen.

5. The method according to claim 1, wherein the first preset posture comprises a first holder state and a fifth holder state, and the starting the first camera to capture an image, and displaying the first user interface on the first screen when it is detected that the electronic device is in the first preset posture and the electronic device meets the first preset condition comprises:
  when it is detected that the electronic device is in the first holder state and the electronic device meets the first preset condition, starting the first camera to capture an image, and displaying the first user interface on the first screen; and
  after displaying the first user interface on the first screen, the method further comprises:
  when it is detected that the electronic device switches from the first holder state to the fifth holder state, displaying the first user interface rotated by 180° on the first screen.

6. The method according to claim 1, wherein before displaying the first user interface on the first screen, the method further comprises:
  recognizing a first area in which a preset local feature is located in the image captured by the first camera, wherein the first preview display area is used to display an enlarged image of an image in the first area.

7. The method according to claim 1, wherein after displaying the first user interface on the first screen, the method further comprises:
  receiving a first input operation of the user; and
  in response to the first input operation, displaying one or more of the following interface elements on the first user interface: a makeup control, a shooting control, a camera switching control, a light compensation control, an album control, and a display box, wherein
  the makeup control is configured to add a preset makeup effect to a face in the image displayed in the first preview display area; the shooting control is configured to trigger the electronic device to store the image displayed in the first preview display area; the camera switching control is configured to switch between cameras for image capturing; the light compensation control is configured to supplement ambient light;
  the album control is configured to trigger the electronic device to display a user interface of an album application; and the display box is configured to display an enlarged image of the preset local feature in the image captured by the first camera.

8. The method according to claim 1, wherein the first camera is an ultraviolet camera, and the image captured by the first camera is used to highlight an area to which sunscreen is applied.

9. The method according to claim 1, wherein when it is detected that the electronic device is in the first preset posture and the electronic device meets the first preset condition, the method further comprises:
  controlling the second screen and the third screen to be turned off.

10. The method according to claim 1, wherein the second preset posture further comprises:
  a second included angle between the third screen and a horizontal plane is within a fourth preset range, an included angle between an orientation of the third screen and a Z axis of a geographic coordinate system is less than 90°, and an angle within the second preset range is greater than 60° and less than 180°;
  the second preset posture further comprises: a second included angle is within a fourth preset range, an included angle between an orientation of the third screen and a Z-axis of a geographic coordinate system is greater than 90°, and an angle within the second preset range is greater than 240° and less than 360°; or the second preset posture further comprises: a difference between a third included angle and a second included angle is within a fifth preset range, the third included angle is an included angle between the second screen and a horizontal plane, an included angle between an orientation of the third screen and a Z-axis of a geographic coordinate system is greater than 90°, and an angle within the second preset range is greater than 180° and less than 360°.

11. The method according to claim 2, wherein the performing split-screen display on the second screen and the third screen comprises:
  displaying a third user interface on the second screen and the third screen in a split-screen manner, wherein the displayed content on the second screen comprises the third preview display area of the third user interface and zero, one, or more interface elements on the third user interface other than the third preview display area, and displayed content on the third screen comprises one or more interface elements on the third user interface other than the displayed content on the second screen, and wherein
  the third user interface further comprises one or more of the following interface elements: a makeup control, a shooting control, a camera switching control, a light compensation control, an album control, and a display box, wherein the makeup control is configured to add a preset makeup effect to a face in the image in the third preview display area of the third user interface; the shooting control is configured to trigger the electronic device to store the image in the third preview display area of the third user interface; the camera switching control is configured to switch between cameras for image capturing; the light compensation control is configured to supplement ambient light; the album control is configured to trigger the electronic device to display a user interface of an album application; and the display box is configured to display an enlarged image of a preset local feature in the image captured by the second camera.

12. An electronic device, comprising:
  one or more processors,
  a non-transitory memory configured to store one or more programs for execution by the one or more processors,
  a first camera, a second camera, a first screen and a foldable screen,
  wherein when the foldable screen is folded into a second screen and a third screen along the folding edge, the third screen and the second camera are located on different sides of the folding edge, an orientations of the first screen and an orientation of the second screen are opposite, the orientation of the first screen is consistent with a shooting direction of the first camera, the orientation of the second screen is consistent with a shooting direction of the second camera;
  wherein the one or more programs comprise instructions for:
  when it is detected that the electronic device is in a first preset posture and the electronic device meets a first preset condition, starting the first camera to capture an image, and displaying a first user interface on the first screen, wherein a first preview display area of the first user interface is used to display the image captured by the first camera, the first preset posture comprises that a first included angle between the second screen and the third screen is within a first preset range, and the first preset condition comprises one or more of the following:
- a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; or a first preset gesture is detected in the image captured by the camera corresponding to the first screen; and when it is detected that the electronic device is in a second preset posture and the electronic device meets a second preset condition, starting the second camera to capture an image, and displaying a second user interface on the second screen, wherein a second preview display area of the second user interface is used to display the image captured by the second camera, the second preset posture comprises that the first included angle is within a second preset range, and the second preset condition comprises one or more of the following:
- the pause time of the first included angle at the current included angle value reaches the first preset time; when the second screen is in an on state, the electronic device does not receive, within the second preset time, an input operation performed on the second screen; a face or a face of the preset user is detected in an image captured by a camera corresponding to the second screen; or a second preset gesture is detected in the image captured by the camera corresponding to the second screen;

wherein the first preset range does not include 0 degrees and 180 degrees and the second preset range does not include 0 degrees and 180 degrees.

13. The electronic device according to claim 12, wherein the one or more programs further comprise instructions for:
when it is detected that the electronic device is in a third preset posture and the electronic device meets a third preset condition, starting the second camera to capture an image, and performing split-screen display on the second screen and the third screen, wherein displayed content on the second screen comprises a third preview display area, and the third preview display area is used to display the image captured by the second camera, and wherein the third preset posture comprises that the first included angle is within a third preset range, and the third preset condition comprises one or more of the following:
the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; or a third preset gesture is detected in the image captured by the camera corresponding to the second screen.

14. The electronic device according to claim 12, wherein the one or more programs further comprise instructions for:
when it is detected that the electronic device is in the first preset posture and the electronic device meets the first preset condition, controlling the second screen and the third screen to be turned off.

15. A non-transitory computer-readable storage medium, comprising one or more programs for execution by an electronic device,
wherein the electronic device comprises a first camera and a second camera, a first screen and a foldable screen, the foldable screen is folded into a second screen and a third screen along the folding edge, the third screen and the second camera are located on different sides of the folding edge, an orientation of the first screen and an orientation of the second screen are opposite, the orientation of the first screen is consistent with a shooting direction of the first camera, the orientation of the second screen is consistent with a shooting direction of the second camera; and wherein the one or more programs comprise instructions for:
when it is detected that the electronic device is in a first preset posture and the electronic device meets a first preset condition, starting the first camera to capture an image, and displaying a first user interface on the first screen, wherein a first preview display area of the first user interface is used to display the image captured by the first camera, the first preset posture comprises that a first included angle between the second screen and the third screen is within a first preset range, and the first preset condition comprises one or more of the following:
- a pause time of the first included angle at a current included angle value reaches a first preset time; when the first screen is in an on state, the electronic device does not receive, within a second preset time, an input operation performed on the first screen; a face or a face of a preset user is detected in an image captured by a camera corresponding to the first screen; or a first preset gesture is detected in the image captured by the camera corresponding to the first screen; and when it is detected that the electronic device is in a second preset posture and the electronic device meets a second preset condition, starting the second camera to capture an image, and displaying a second user interface on the second screen, wherein a second preview display area of the second user interface is used to display the image captured by the second camera, the second preset posture comprises that the first included angle is within a second preset range, and the second preset condition comprises one or more of the following:
- the pause time of the first included angle at the current included angle value reaches the first preset time; when the second screen is in an on state, the electronic device does not receive, within the second preset time, an input operation performed on the second screen; a face or a face of the preset user is detected in an image captured by a camera corresponding to the second screen; or a second preset gesture is detected in the image captured by the camera corresponding to the second screen;

wherein the first preset range does not include 0 degrees and 180 degrees and the second preset range does not include 0 degrees and 180 degrees.

16. The non-transitory computer-readable storage medium according to claim 15, wherein the one or more programs further comprise instructions for:
when it is detected that the electronic device is in a third preset posture and the electronic device meets a third preset condition, starting the second camera to capture an image, and performing split-screen display on the second screen and the third screen, wherein displayed content on the second screen comprises a third preview display area, and the third preview display area is used to display the image captured by the second camera, and wherein the third preset posture comprises that the first included angle is within a third preset range, and the third preset condition comprises one or more of the following:

the pause time of the first included angle at the current included angle value reaches the first preset time; when the second screen and/or the third screen are/is in an on state, the electronic device does not receive, within the second preset time, an input operation performed on the second screen or the third screen; a face or a face of the preset user is detected in an image captured by a camera corresponding to the second screen; or a third preset gesture is detected in the image captured by the camera corresponding to the second screen.

17. The non-transitory computer-readable storage medium according to claim 15, wherein the one or more programs further comprise instructions for:

when it is detected that the electronic device is in the first preset posture and the electronic device meets the first preset condition, controlling the second screen and the third screen to be turned off.

* * * * *